(12) United States Patent
Elliott

(10) Patent No.: US 7,230,584 B2
(45) Date of Patent: Jun. 12, 2007

(54) PROJECTOR SYSTEMS WITH REDUCED FLICKER

(75) Inventor: Candice Hellen Brown Elliott, Vallejo, CA (US)

(73) Assignee: Clairvoyante, Inc, Sebastopol, CA (US)

( * ) Notice: Subject to any disclaimer, the term of this patent is extended or adjusted under 35 U.S.C. 154(b) by 630 days.

(21) Appl. No.: 10/442,552

(22) Filed: May 20, 2003

(65) Prior Publication Data

US 2004/0233339 A1    Nov. 25, 2004

(51) Int. Cl.
*G09G 3/00*    (2006.01)

(52) U.S. Cl. .......................................... 345/32; 345/63
(58) Field of Classification Search ................. 345/88, 345/103, 589, 596, 605, 694, 30–33, 63; 362/318, 293; 359/234, 618, 722, 891, 885; 348/743; 315/364, 408; 353/84–85; 356/418
See application file for complete search history.

(56) References Cited

U.S. PATENT DOCUMENTS

| | | |
|---|---|---|
| 3,971,065 A | 7/1976 | Bayer |
| 4,353,062 A | 10/1982 | Lorteije et al. |
| 4,439,759 A | 3/1984 | Fleming et al. |
| 4,593,978 A | 6/1986 | Mourey et al. |
| 4,642,619 A | 2/1987 | Togashi |
| 4,651,148 A | 3/1987 | Takeda et al. |
| 4,737,843 A | 4/1988 | Spencer |
| 4,751,535 A | 6/1988 | Myers |
| 4,773,737 A | 9/1988 | Yokono et al. |
| 4,786,964 A | 11/1988 | Plummer et al. |
| 4,792,728 A | 12/1988 | Chang et al. |
| 4,800,375 A | 1/1989 | Silverstein et al. |
| 4,853,592 A | 8/1989 | Stratham |
| 4,874,986 A | 10/1989 | Menn et al. |
| 4,886,343 A | 12/1989 | Johnson |
| 4,908,609 A | 3/1990 | Stroomer |
| 4,920,409 A | 4/1990 | Yamagishi |
| 4,946,259 A | 8/1990 | Matino et al. |
| 4,965,565 A | 10/1990 | Noguchi |
| 4,966,441 A | 10/1990 | Conner |
| 4,967,264 A | 10/1990 | Parulski et al. |
| 5,006,840 A | 4/1991 | Hamada et al. |
| 5,010,413 A | 4/1991 | Bahr |
| 5,052,785 A | 10/1991 | Takimoto et al. |
| 5,062,057 A | 10/1991 | Blacken et al. |
| 5,113,274 A | 5/1992 | Takahashi et al. |

(Continued)

FOREIGN PATENT DOCUMENTS

DE    197 46 329 A1    3/1999

(Continued)

OTHER PUBLICATIONS

Adobe Systems, Inc. website, http://www.adobe.com/products/acrobat/cooltype.html.

(Continued)

*Primary Examiner*—Nitin Patel

(57) ABSTRACT

An image display system is disclosed comprising an output unit and a means for displaying a plurality of color frames on the output unit. Each color frame is subpixelated and displayed over time. One of the color planes is a color plane of a low luminance color, and the low luminance color plane is displayed with greater frequency over time than other displayed color frames.

13 Claims, 42 Drawing Sheets

U.S. PATENT DOCUMENTS

| | | | |
|---|---|---|---|
| 5,132,674 A | 7/1992 | Bottorf | |
| 5,144,288 A | 9/1992 | Hamada et al. | |
| 5,189,404 A | 2/1993 | Masimo et al. | |
| 5,196,924 A | 3/1993 | Lumelsky et al. | |
| 5,233,385 A | 8/1993 | Sampsell | |
| 5,280,347 A * | 1/1994 | Shiraishi et al. | 348/223.1 |
| 5,291,102 A | 3/1994 | Washburn | |
| 5,311,337 A | 5/1994 | McCartney, Jr. | |
| 5,315,418 A | 5/1994 | Sprague et al. | |
| 5,334,996 A | 8/1994 | Tanigaki et al. | |
| 5,341,153 A | 8/1994 | Benzschawel et al. | |
| 5,398,066 A | 3/1995 | Martinez-Uriegas et al. | |
| 5,416,890 A | 5/1995 | Beretta | |
| 5,436,747 A | 7/1995 | Suzuki | |
| 5,438,649 A | 8/1995 | Ruetz | |
| 5,448,652 A | 9/1995 | Vaidyanathan et al. | |
| 5,450,216 A | 9/1995 | Kasson | |
| 5,461,503 A | 10/1995 | Deffontaines et al. | |
| 5,477,240 A | 12/1995 | Huebner et al. | |
| 5,477,381 A * | 12/1995 | Sasaki et al. | 359/497 |
| 5,485,293 A | 1/1996 | Robinder | |
| 5,535,028 A | 7/1996 | Bae et al. | |
| 5,541,653 A | 7/1996 | Peters et al. | |
| 5,561,460 A | 10/1996 | Katoh et al. | |
| 5,563,621 A | 10/1996 | Silsby | |
| 5,579,027 A | 11/1996 | Sakurai et al. | |
| 5,642,176 A | 6/1997 | Abukawa et al. | |
| 5,648,793 A | 7/1997 | Chen | |
| 5,650,832 A * | 7/1997 | Poradish et al. | 348/743 |
| 5,661,371 A | 8/1997 | Salerno et al. | |
| 5,719,639 A | 2/1998 | Imamura | |
| 5,724,442 A | 3/1998 | Ogatsu et al. | |
| 5,731,818 A | 3/1998 | Wan et al. | |
| 5,739,802 A | 4/1998 | Mosier | |
| 5,754,163 A | 5/1998 | Kwon | |
| 5,754,226 A | 5/1998 | Yamada et al. | |
| 5,792,579 A | 8/1998 | Phillips | |
| 5,815,101 A | 9/1998 | Fonte | |
| 5,821,913 A | 10/1998 | Mamiya | |
| 5,880,707 A | 3/1999 | Aratani | |
| 5,899,550 A | 5/1999 | Masaki | |
| 5,917,556 A | 6/1999 | Katayama | |
| 5,929,843 A | 7/1999 | Tanioka | |
| 5,933,253 A | 8/1999 | Ito et al. | |
| 5,949,496 A | 9/1999 | Kim | |
| 5,971,546 A | 10/1999 | Park | |
| 5,973,664 A | 10/1999 | Badger | |
| 5,991,438 A | 11/1999 | Shaked et al. | |
| 6,002,446 A | 12/1999 | Eglit | |
| 6,008,868 A | 12/1999 | Silverbrook | |
| 6,011,640 A * | 1/2000 | Hutton | 359/234 |
| 6,034,666 A | 3/2000 | Kanai et al. | |
| 6,038,031 A | 3/2000 | Murphy | |
| 6,049,626 A | 4/2000 | Kim | |
| 6,054,832 A | 4/2000 | Kunzman et al. | |
| 6,061,533 A | 5/2000 | Kajiwara | |
| 6,064,363 A | 5/2000 | Kwon | |
| 6,069,670 A | 5/2000 | Borer | |
| 6,072,445 A | 6/2000 | Spitzer et al. | |
| 6,097,367 A | 8/2000 | Kuriwaki et al. | |
| 6,108,053 A | 8/2000 | Pettitt et al. | |
| 6,108,122 A | 8/2000 | Ulrich et al. | |
| 6,144,352 A | 11/2000 | Matsuda et al. | |
| 6,151,001 A | 11/2000 | Anderson et al. | |
| 6,160,535 A | 12/2000 | Park | |
| 6,184,903 B1 | 2/2001 | Omori | |
| 6,188,385 B1 | 2/2001 | Hill et al. | |
| 6,198,507 B1 | 3/2001 | Ishigami | |
| 6,219,025 B1 | 4/2001 | Hill et al. | |
| 6,225,967 B1 | 5/2001 | Hebiguchi | |
| 6,225,973 B1 | 5/2001 | Hill et al. | |
| 6,236,390 B1 | 5/2001 | Hitchcock | |
| 6,239,783 B1 | 5/2001 | Hill et al. | |
| 6,243,055 B1 | 6/2001 | Fergason | |
| 6,243,070 B1 | 6/2001 | Hill et al. | |
| 6,256,425 B1 | 7/2001 | Kunzman | |
| 6,262,710 B1 | 7/2001 | Smith | |
| 6,271,891 B1 | 8/2001 | Ogawa et al. | |
| 6,278,434 B1 | 8/2001 | Hill et al. | |
| 6,297,826 B1 | 10/2001 | Semba et al. | |
| 6,299,329 B1 | 10/2001 | Mui et al. | |
| 6,326,981 B1 | 12/2001 | Mori et al. | |
| 6,327,008 B1 | 12/2001 | Fujiyoshi | |
| 6,348,929 B1 | 2/2002 | Acharya et al. | |
| 6,360,008 B1 | 3/2002 | Suzuki et al. | |
| 6,360,023 B1 | 3/2002 | Betrisey et al. | |
| 6,377,262 B1 | 4/2002 | Hitchcock et al. | |
| 6,392,717 B1 | 5/2002 | Kunzman | |
| 6,393,145 B2 | 5/2002 | Betrisey et al. | |
| 6,396,505 B1 | 5/2002 | Lui et al. | |
| 6,407,830 B1 | 6/2002 | Keithley et al. | |
| 6,414,719 B1 | 7/2002 | Parikh | |
| 6,417,863 B1 | 7/2002 | Smith | |
| 6,441,867 B1 | 8/2002 | Daly | |
| 6,445,505 B1 * | 9/2002 | Morgan | 359/618 |
| 6,453,067 B1 | 9/2002 | Morgan et al. | |
| 6,466,618 B1 | 10/2002 | Messing et al. | |
| 6,469,766 B2 | 10/2002 | Waterman et al. | |
| 6,483,518 B1 | 11/2002 | Perry et al. | |
| 6,509,904 B1 | 1/2003 | Lam | |
| 6,536,904 B2 | 3/2003 | Kunzman | |
| 6,538,742 B1 | 3/2003 | Ohsawa | |
| 6,567,134 B1 | 5/2003 | Morgan | |
| 6,570,584 B1 | 5/2003 | Cok et al. | |
| 6,600,495 B1 | 7/2003 | Boland et al. | |
| 6,624,828 B1 | 9/2003 | Dresevic et al. | |
| 6,661,429 B1 | 12/2003 | Phan | |
| 6,674,436 B1 | 1/2004 | Dresevic et al. | |
| 6,714,206 B1 | 3/2004 | Martin et al. | |
| 6,738,526 B1 | 5/2004 | Betrisey et al. | |
| 6,750,875 B1 | 6/2004 | Keely, Jr. et al. | |
| 6,781,626 B1 | 8/2004 | Wang | |
| 6,801,220 B2 | 10/2004 | Greier et al. | |
| 6,804,407 B2 | 10/2004 | Weldy | |
| 6,833,890 B2 | 12/2004 | Hong et al. | |
| 6,836,300 B2 | 12/2004 | Choo et al. | |
| 6,850,294 B2 | 2/2005 | Roh et al. | |
| 6,867,549 B2 | 3/2005 | Cok et al. | |
| 6,870,523 B1 | 3/2005 | Ben-David et al. | |
| 6,885,380 B1 | 4/2005 | Primerano et al. | |
| 6,888,604 B2 | 5/2005 | Rho et al. | |
| 6,897,876 B2 | 5/2005 | Murdoch et al. | |
| 6,903,378 B2 | 6/2005 | Cok | |
| 6,989,876 B2 | 1/2006 | Song et al. | |
| 6,856,704 B1 | 2/2006 | Gallagher et al. | |
| 2001/0017515 A1 | 8/2001 | Kusunoki et al. | |
| 2001/0040645 A1 | 11/2001 | Yamazaki | |
| 2001/0048764 A1 | 12/2001 | Betrisey et al. | |
| 2001/0052897 A1 | 12/2001 | Nakano et al. | |
| 2002/0012071 A1 | 1/2002 | Sun | |
| 2002/0017645 A1 | 2/2002 | Yamazaki et al. | |
| 2002/0093476 A1 | 7/2002 | Hill et al. | |
| 2002/0122160 A1 | 9/2002 | Kunzman | |
| 2002/0135598 A1 * | 9/2002 | Tezuka et al. | 345/613 |
| 2002/0140831 A1 | 10/2002 | Hayashi | |
| 2002/0149598 A1 | 10/2002 | Greier et al. | |
| 2002/0190648 A1 | 12/2002 | Bechtel et al. | |
| 2002/0191130 A1 | 12/2002 | Liang et al. | |
| 2003/0011613 A1 | 1/2003 | Booth, Jr. | |
| 2003/0035290 A1 * | 2/2003 | Bornhorst | 362/318 |
| 2003/0043567 A1 | 3/2003 | Hoelen et al. | |
| 2003/0071775 A1 | 4/2003 | Ohashi et al. | |
| 2003/0071826 A1 | 4/2003 | Goertzen | |
| 2003/0071943 A1 | 4/2003 | Choo et al. | |

| | | | |
|---|---|---|---|
| 2003/0085906 A1 | 5/2003 | Elliott et al. | |
| 2003/0103058 A1 | 6/2003 | Elliott et al. | |
| 2003/0128000 A1* | 7/2003 | Nakanishi | 315/408 |
| 2003/0214499 A1 | 11/2003 | Ohsawa et al. | |
| 2003/0218618 A1 | 11/2003 | Phan | |
| 2004/0008208 A1 | 1/2004 | Dresevic et al. | |
| 2004/0021804 A1 | 2/2004 | Hong et al. | |
| 2004/0061710 A1 | 4/2004 | Messing et al. | |
| 2004/0085495 A1 | 5/2004 | Roh et al. | |
| 2004/0095521 A1 | 5/2004 | Song et al. | |
| 2004/0108818 A1 | 6/2004 | Cok et al. | |
| 2004/0114046 A1 | 6/2004 | Lee et al. | |
| 2004/0150651 A1 | 8/2004 | Phan | |
| 2004/0155895 A1 | 8/2004 | Lai | |
| 2004/0169807 A1 | 9/2004 | Rho et al. | |
| 2004/0179160 A1 | 9/2004 | Rhee et al. | |
| 2004/0189662 A1 | 9/2004 | Frisken et al. | |
| 2004/0189664 A1 | 9/2004 | Frisken et al. | |
| 2004/0232844 A1 | 11/2004 | Brown | |
| 2004/0233308 A1 | 11/2004 | Elliott et al. | |
| 2004/0239813 A1 | 12/2004 | Klompenhouwer | |
| 2004/0239837 A1 | 12/2004 | Hong et al. | |
| 2004/0263528 A1 | 12/2004 | Murdoch et al. | |
| 2005/0007539 A1 | 1/2005 | Taguchi et al. | |
| 2005/0024380 A1 | 2/2005 | Lin et al. | |
| 2005/0031199 A1 | 2/2005 | Ben-Chorin et al. | |
| 2005/0040760 A1 | 2/2005 | Taguchi et al. | |
| 2005/0068477 A1 | 3/2005 | Shin et al. | |
| 2005/0082990 A1 | 4/2005 | Elliott | |
| 2005/0083356 A1 | 4/2005 | Roh et al. | |
| 2005/0094871 A1 | 5/2005 | Berns et al. | |
| 2005/0099426 A1 | 5/2005 | Primerano et al. | |
| 2005/0104908 A1 | 5/2005 | Brown | |
| 2005/0140634 A1 | 6/2005 | Takatori | |
| 2005/0151752 A1 | 7/2005 | Phan | |
| 2005/0162600 A1 | 7/2005 | Rho et al. | |
| 2005/0169551 A1 | 8/2005 | Messing et al. | |

FOREIGN PATENT DOCUMENTS

| | | |
|---|---|---|
| DE | 299 09 537 U1 | 10/1999 |
| DE | 199 23 527 | 11/2000 |
| DE | 201 09 354 U1 | 9/2001 |
| EP | 0 158 366 A2 | 10/1985 |
| EP | 0 203 005 A1 | 11/1986 |
| EP | 0 322 106 A2 | 6/1989 |
| EP | 0 671 650 A2 | 9/1995 |
| EP | 0 793 214 A1 | 2/1996 |
| EP | 0 812 114 A1 | 12/1997 |
| EP | 0 878 969 A3 | 11/1998 |
| EP | 1 083 539 A2 | 3/2001 |
| EP | 1 261 014 A2 | 11/2002 |
| EP | 1 381 020 A2 | 1/2004 |
| GB | 2 133 912 A | 8/1984 |
| GB | 2 146 478 A | 4/1985 |
| JP | 60-107022 | 6/1985 |
| JP | 02-000826 A | 1/1990 |
| JP | 02-983027 B2 | 4/1991 |
| JP | 03-78390 | 4/1991 |
| JP | 03-036239 | 5/1991 |
| JP | 06-102503 | 4/1994 |
| JP | 06-214250 | 8/1994 |
| JP | 2002215082 A | 7/2002 |
| JP | 2004-004822 | 1/2004 |
| WO | WO 00/42564 | 7/2000 |
| WO | WO 00/42762 | 7/2000 |
| WO | WO 00/45365 | 8/2000 |
| WO | WO 00/65432 | 11/2000 |
| WO | WO 00/67196 | 11/2000 |
| WO | WO 01/10112 A2 | 2/2001 |
| WO | WO 01/29817 A1 | 4/2001 |
| WO | WO 01/52546 A2 | 7/2001 |
| WO | WO 02/059685 A2 | 8/2002 |
| WO | WO 03/014819 A1 | 2/2003 |
| WO | WO 2004/021323 A2 | 3/2004 |
| WO | WO 2004/027503 A1 | 4/2004 |
| WO | WO 2004/040548 | 5/2004 |
| WO | WO 2004/086128 A1 | 10/2004 |
| WO | WO 2005/050296 A1 | 6/2005 |

OTHER PUBLICATIONS

Betrisey, C., et al., Displaced Filtering for Patterned Displays, SID Symp. Digest, 296-299, 1999.

Brown Elliott, C., "Active Matrix Display . . . ", IDMC 2000, 185-189, Aug. 2000.

Brown Elliott, C., "Color Subpixel Rendering Projectors and Flat Panel Displays," SMPTE, Feb. 27-Mar. 1, 2003, Seattle, WA pp. 1-4.

Brown Elliott, C, "Co-Optimization of Color AMLCD Subpixel Architecture and Rendering Algorithms," SID 2002 Proceedings Paper, May 30, 2002 pp. 172-175.

Brown Elliott, C, "Development of the Pen Tile Matrix™ Color AMLCD Subpixel Architecture and Rendering Algorithms", SID 2003, Journal Article.

Brown Elliott, C, "New Pixel Layout for Pen Tile Matrix™ Architecture", IDMC 2002, pp. 115-117.

Brown Elliott, C, "Pentile Matrix™ Displays and Drivers" ADEAC Proceedings Paper, Portland OR., Oct. 2005.

Brown Elliott, C, "Reducing Pixel Count Without Reducing Image Quality", Information Display Dec. 1999, vol. 1, pp. 22-25.

Carvajal, D., "Big Publishers Looking Into Digital Books," The NY Times, Apr. 3, 2000, Business/Financial Desk.

"Clear Type magnified", Wired Magazine, Nov. 8, 1999, Microsoft Typography, article posted Nov. 8, 1999, last updated Jan. 27, 1999 1 page.

Credelle, Thomas, "P-00: MTF of High-Resolution PenTile Matrix Displays", Eurodisplay 02 Digest, 2002 pp. 1-4.

Daly, Scott, "Analysis of Subtriad Addressing Algorithms by Visual System Models",SID Symp. Digest, Jun. 2001 pp. 1200-1203.

Felgenblatt, R.I., Full-color imaging on amplitude-quantized color mosaic displays, SPIE, 1989, pp. 199-204.

Feigenblatt, Ron, "Remarks on Microsoft ClearType™", http://www.geocities.com/SiliconValley/Ridge/6664/ClearType.html, Dec. 5, 1998, Dec. 7, 1998, Dec. 12, 1999, Dec. 26, 1999, Dec. 30, 1999 and Jun. 16, 2000, 30 pages.

Gibson, S., "Sub-Pixel Rendering; How it works," Gibson Research Corp., http://www.grc.com/ctwhat.html.

Johnston, Stuart, "An Easy Read: Microsoft's Clear Type," InformationWeek Online, Redmond WA, Nov. 23, 1998. 3 pages.

Johnston, Stuart, "Clarifying ClearType," InformationWeek Online, Redmond WA, Jan. 4, 1999, 4 pages.

Just Outta Beta, Wired Magazine, Dec. 1999 Issue 7-12, 3 pages.

Klompenhouwer, Michiel, Subpixel Image Scaling for Color Matrix Displays, SID Symp. Digest, May 2002, pp. 176-179.

Krantz, John et al., Color Matrix Display Image Quality: The Effects of Luminance . . . SID 90 Digest, pp. 29-32.

Lee, Baek-woon et al., 40.5L: Late-News Paper:TFT-LCD with RGBW Color system, SID 03 Digest, 2003, pp. 1212-1215.

Markoff, John, Microsoft's Cleartype Sets Off Debate on Originality, NY Times, Dec. 7, 1998, 5 pages.

Martin, R., et al., "Detectability of Reduced Blue-Pixel Count in Projection Displays," SID Symp. Digest, May 1993, pp. 606-609.

Messing, Dean et al., Improved Display Resolution of Subsampled Colour Images Using Subpixel Addressing, IEEE ICIP 2002, vol. 1, pp. 625-628.

Messing, Dean et al., Subpixel Rendering on Non-Striped Colour Matrix Displays, 2003 International Conf on Image Processing, Sep. 2003, Barcelona, Spain, 4 pages.

"Microsoft ClearType," website, Mar. 26, 2003, 4 pages.

Microsoft Corp. website, http://www.microsoft.com/typography/cleartype, 7 pages.

Microsoft press release, Microsoft Research Announces Screen Display Breakthrough at COMDEX/Fall '98; . . . Nov. 15, 1998.

Murch, M., "Visual Perception Basics," SID Seminar, 1987, Tektronix Inc, Beaverton Oregon.

Okumura et al., "A New Flicker-Reduction Drive Method for High Resolution LCTVs", SID Digest, pp. 551-554, 2001.

Platt, John, Optimal Filtering for Patterned Displays, IEEE Signal Processing Letters, 2000, 4 pages.

Wandell, Brian A., Stanford University, "Fundamentals of Vision: Behavior...," Jun. 12, 1994, Society for Information Display (SID) Short Course S-2, Fairmont Hotel, San Jose, California.

Felici, James, "Clear Type, CoolType: The Eyes Have It," The Seybold Report on Internet Publishing, vol. 4, No. 8, Apr. 2000, available at http://www.syboldreports.com/SRIP/free/0408/cooltype.html.

Dipert, Brian, "Display technology's results are compelling, but legacy is un'clear', " EDN Magazine, Oct. 26, 2000, pp. 63-72.

Berry, John D., "Fuzzy Fonts," *Print*, May 2000 vol. 54, Issue 3, p. 38.

USPTO, Non-Final Office Action, dated Feb. 7, 2005 in US Patent Publication No. 2003/0034992 (U.S. Appl. No. 10/051,612).

Clairvoyante Inc, Response to Non-Final Office, dated Jul. 7, 2005 in US Patent Publication No. 2003/0034992 (U.S. Appl. No. 10/051,612).

USPTO, Final Office Action dated, Aug. 31, 2005 in US Patent Publication No. 2003/0034992 (U.S. Appl. No. 10/051, 612).

Clairvoyante Inc, Response to Final Office, dated Sep. 19, 2005 in US Patent Publication No. 2003/0034992 (U.S. Appl. No. 10/051,612).

USPTO, Non-Final Office Action dated, Dec. 15, 2005 in US Patent Publication No. 2003/0034992 (U.S. Appl. No. 10/051,612).

Clairvoyante Inc, Response to Non-Final Office, dated Feb. 8, 2006 in US Patent Publication No. 2003/0034992 (U.S. Appl. No. 10/051,612).

USPTO, Notice of Allowance, dated May 4, 2006 in US Patent Publication No. 2003/0034992 (U.S. Appl. No. 10/051,612).

USPTO, Non-Final Office Action dated, Mar. 10, 2005 in US Patent Publication No. 2005/0104908 (U.S. Appl. No. 10/047,995).

Clairvoyante Inc, Response to Non-Final Office, dated Jul. 7, 2005 in US Patent Publication No. 2005/0104908 (U.S. Appl. No. 10/047,995).

USPTO, Non-Final Office Action dated, Nov. 10, 2005 in US Patent Publication No. 2005/0104908 (U.S. Appl. No. 10/047,995).

Clairvoyante Inc, Response to Non-Final Office, dated May 10, 2006 in US Patent Publication No. 2005/0104908 (U.S. Appl. No. 10/047,995).

USPTO, Non-Final Office Action, dated Feb. 22, 2006 in US Patent Publication No. 2004/0232844 (U.S. Appl. No. 10/442,320).

Clairvoyante Inc, Response to Non-Final Office Action, dated Jun. 22, 2006 in US Patent Publication No. 2004/0232844 (U.S. Appl. No. 10/442,320).

USPTO, Final Office Action, dated Sep. 7, 2006 in US Patent Publication No. 2004/0232844 (U.S. Appl. No. 10/442,320).

* cited by examiner

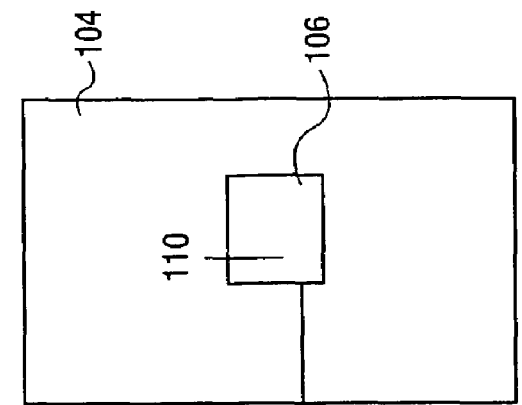
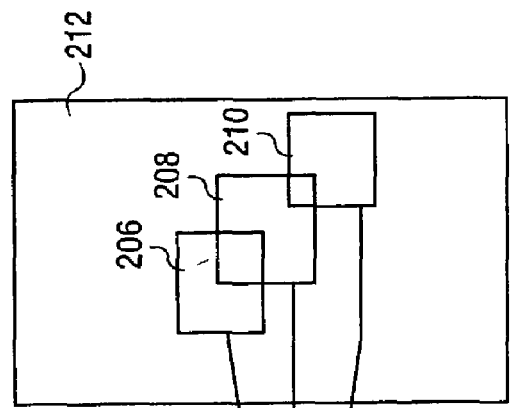
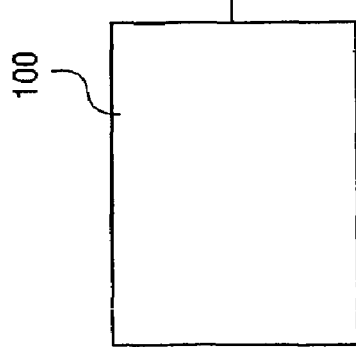
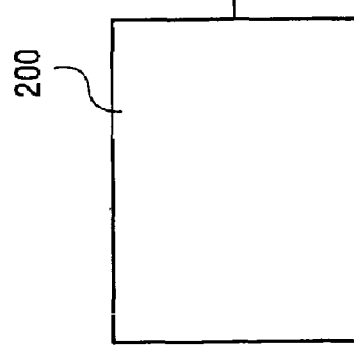
FIG. 1 (PRIOR ART)
FIG. 2

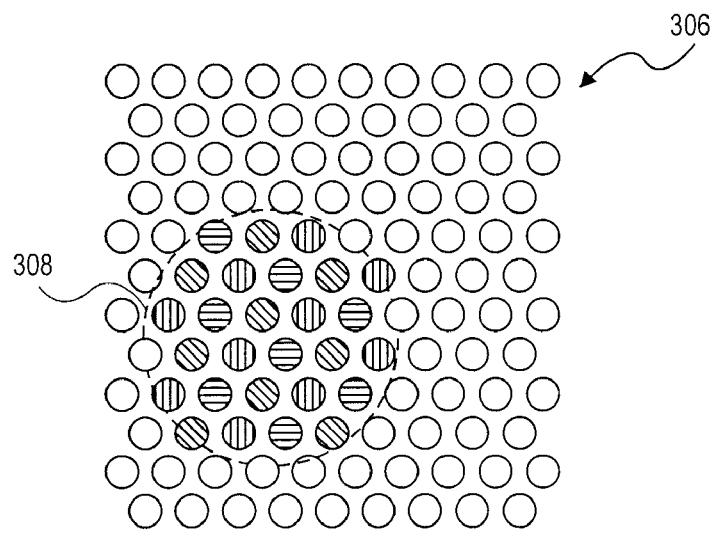
FIG. 3B
(PRIOR ART)
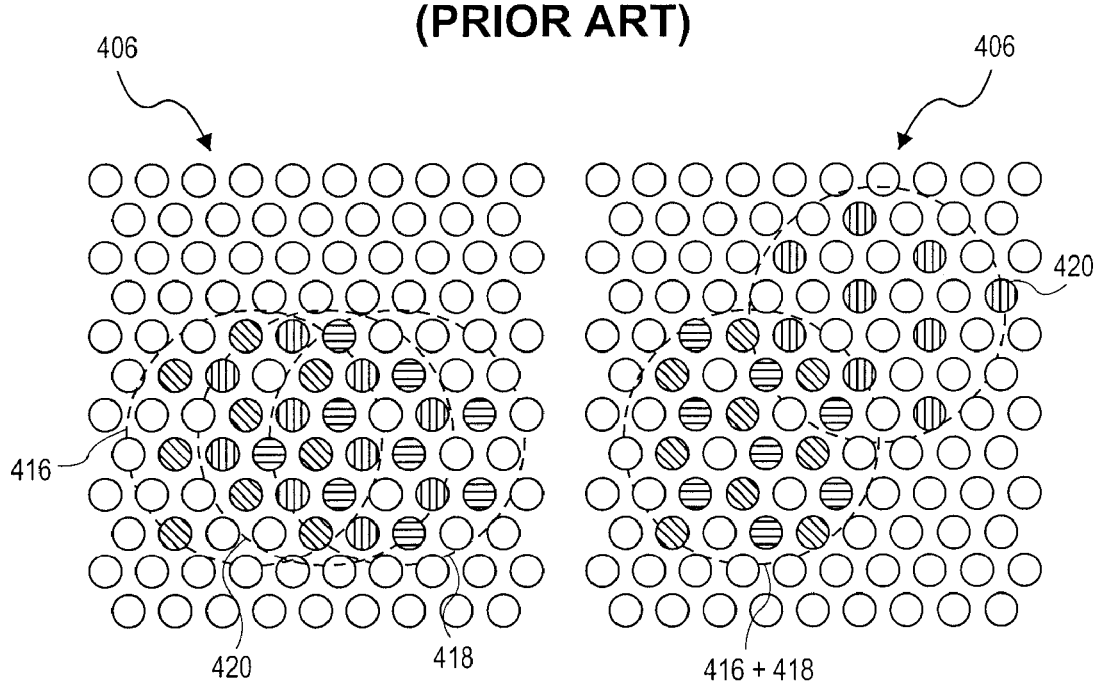
FIG. 4B    FIG. 4C

PROJECTOR SYSTEMS WITH REDUCED FLICKER

BACKGROUND

In commonly owned U.S. patent applications: (1) Ser. No. 09/916,232 ("the '232 application"), now issued as U.S. Pat. No. 6,903,754, entitled "ARRANGEMENT OF COLOR PIXELS FOR FULL COLOR IMAGING DEVICES WITH SIMPLIFIED ADDRESSING," filed Jul. 25, 2001; (2) Ser. No. 10/278,353 ("the '353 application"), published as US Patent Publication No. 2003/0128225, entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed Oct. 22, 2002; (3) Ser. No. 10/278,352 ("the '352 application") published as US Patent Publication No. 2003/0128179, entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUBPIXELS," filed Oct. 22, 2002; (4) Ser. No. 10/243,094 ("the '094 application), published as US Patent No. 2004/0051724, entitled "IMPROVED FOUR COLOR ARRANGEMENTS AND EMITTERS FOR SUBPIXEL RENDERING," filed Sep. 13, 2002; (5) Ser. No. 10/278,328 ("the '328 application"), published as US Patent Publication No. 2003/0090581, entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed Oct. 22, 2002; (6) Ser. No. 10/278,393 ("the '393 application"), published as US Patent Publication No. 2003/0090581, entitled "COLOR DISPLAY HAVING HORIZONTAL SUB-PIXEL ARRANGEMENTS AND LAYOUTS," filed Oct. 22, 2002, novel subpixel arrangements are therein disclosed for improving the cost/performance curves for image display devices and herein incorporated by reference.

These improvements are particularly pronounced when coupled with subpixel rendering (SPR) systems and methods further disclosed in those applications and in commonly owned U.S. patent applications: (1) Ser. No. 10/051,612 ("the '612 application"), published as US Patent Publication No. 2003/0034992, entitled "CONVERSION OF A SUB-PIXEL FORMAT DATA TO ANOTHER SUB-PIXEL DATA FORMAT," filed Jan. 16, 2002; (2) Ser. No. 10/150,355 ("the '355 application"), published as US Patent Publication No. 2003/0103058, entitled "METHODS AND SYSTEMS FOR SUB-PIXEL RENDERING WITH GAMMA ADJUSTMENT," filed May 17, 2002; (3) Ser. No. 10/215,843 ("the '843 application"), published as US Patent Publication No. 2003/0085906, entitled "METHODS AND SYSTEMS FOR SUB-PIXEL RENDERING WITH ADAPTIVE FILTERING," filed May 17, 2002; (4) Ser. No. 10/409,413 ("the '413 application) published as US Patent Publication No. 2004/0196297 entitled "IMAGE DATA SET WITH EMBEDDED PRE-SUBPIXEL RENDERED IMAGE", filed Apr. 7, 2003.

Additionally, the present application is also related to commonly owned: (1) Ser. No. 10/047,995 ("the '995 application") published as US Patent Publication No. 2005/0104908 entitled "COLOR DISPLAY PIXEL ARRANGEMENTS AND ADDRESSING MEANS" filed Jan. 14, 2002; (2) Ser. No. 10/442,356 ("356 application") published as US Patent Publication No. 2005/0082990 entitled "IMPROVED PROJECTOR SYSTEMS" filed May 20, 2003; (3) Ser. No. 10/442,555 ("555 application") published as US Patent Publication No. 2004/0233308 entitled "IMPROVED IMAGE CAPTURE DEVICE AND CAMERA" filed May 20, 2003; and (4) Ser. No. 10/442,552 ("552 application") published as US Patent Publication No. 2004/0233339, entitled "IMPROVED PROJECTOR SYSTEMS WITH REDUCED FLICKER" filed May 20, 2003.

The above-referenced and commonly owned applications are hereby incorporated herein by reference.

BRIEF DESCRIPTION OF THE DRAWINGS

The accompanying drawings, which are incorporated in, and constitute a part of the specification, illustrate exemplary implementations and embodiments of the invention, and, with the detailed description, serve to explain principles of the invention.

FIG. 1 illustrates a side view of a prior art projector projecting images, in a frontal view, to a central point on an imaging screen.

FIG. 2 illustrates a side view of a projector, projecting images, in a frontal view, to a central point on an imaging screen in which the three colors are offset from each other.

FIG. 3B illustrates a portion of the phosphor screen of the prior art CRT illustrated in FIG. 3A, focusing Gaussian spots to a single point on an imaging screen.

FIG. 4B illustrates a portion of the CRT illustrated in FIG. 4A focusing Gaussian spot to a phosphor screen in which the three color spots are offset in the horizontal direction.

FIG. 4C illustrates a portion of the CRT illustrated in FIG. 4A focusing Gaussian spot to a phosphor screen in which the green color spots are offset in the diagonal direction.

FIG. 10 illustrates the overlaid image of FIG. 9 with one full color logical pixel turned on.

FIGS. 11 and 12 illustrates the green and red image planes, respectively, with a single column of logical pixels turned on.

FIGS. 14A–14B and 15A–15B illustrate the green and red image planes, respectively, with two columns of logical pixels turned on.

FIG. 23 illustrates an overlay of FIG. 8 for three colors in which the colors are offset by one-third pixel each, with one full color logical pixel turned on.

DETAILED DESCRIPTION

Figure 3A:
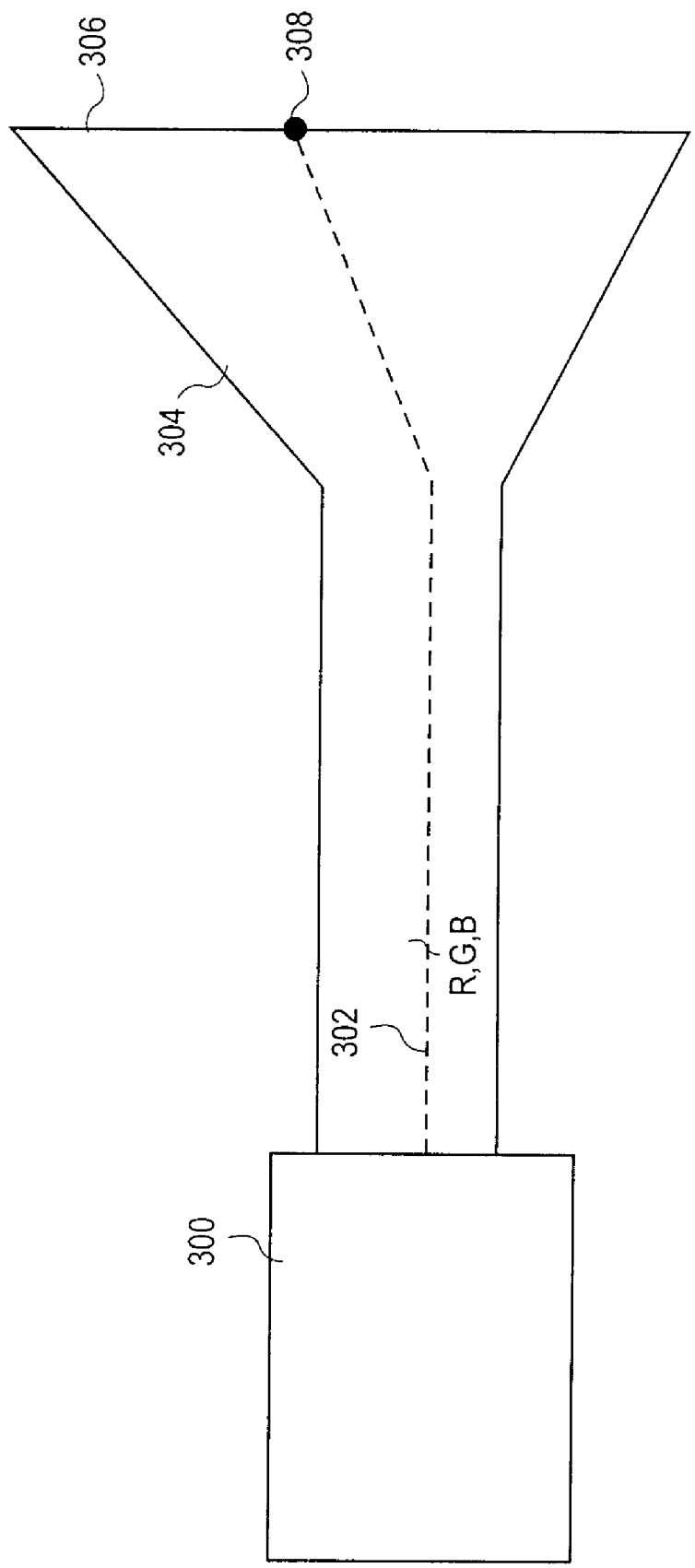
FIG. 3A illustrates a side view of a prior art CRT projecting images to a central point on an imaging screen.

Reference will now be made in detail to exemplary implementations and embodiments of the invention, examples of which are illustrated in the accompanying drawings. Wherever possible, the same reference numbers will be used throughout the drawings to refer to the same or like parts. Furthermore, the following description is illustrative only and not in any way intended to be limiting.

Prior art projectors typically overlaps the three-color images (e.g. RGB) exactly coincidentally, with the same spatial resolution. As taught in the '995 application, the color imaging planes are overlaid upon each other with an offset of about one-half pixel. By offsetting the color imaging planes, an electronic image capture, processing, and display having higher resolution images is created by increasing the resolution of the system.

Cathode Ray Tube Displays, Projector Displays, and Subtractive Flat Panel Displays FIG. 1 is schematic of a prior art projector 100 having a light beam 102 that projects red (R), blue (B), and green (G) images 106 on to an imaging (or projection) screen 104. Prior art practices converge the red, the blue, and the green images to a point 110 on the projection screen 104. In contrast, FIG. 2 illustrates schematic of a projector 200 having a light beam 202 that projects through an optical element (or lens) 204 red 206, blue 208, and green images 210 on to an imaging (or projection) screen 212. As illustrated in this example, such a projector will separate and differentially shift the red, green, and blue images. Thus, the image is again formed, but the image is shifted optically to separate the red, blue, and green color planes by about one-half pixel.

A similar procedure is used with a Cathode Ray Tube (CRT) video display, as illustrated in prior art FIG. 3A. An electron gun 300 projects an electron beam 302 inside the CRT 304 onto a phosphor surface 306 with an array of color primary emitting phosphor dots. Prior art practices converge the red, the blue, and the green image pixel to a circular Gaussian spot 308 on the phosphor surface 306. The CRT 304 can direct the electron beam 302 towards the phosphor surface 306 electrostatically or magnetically. FIG. 3B illustrates a portion of the phosphor screen 306 in which the CRT focuses Gaussian spot 308 to a single point on the phosphor screen 306.

Figure 4A:
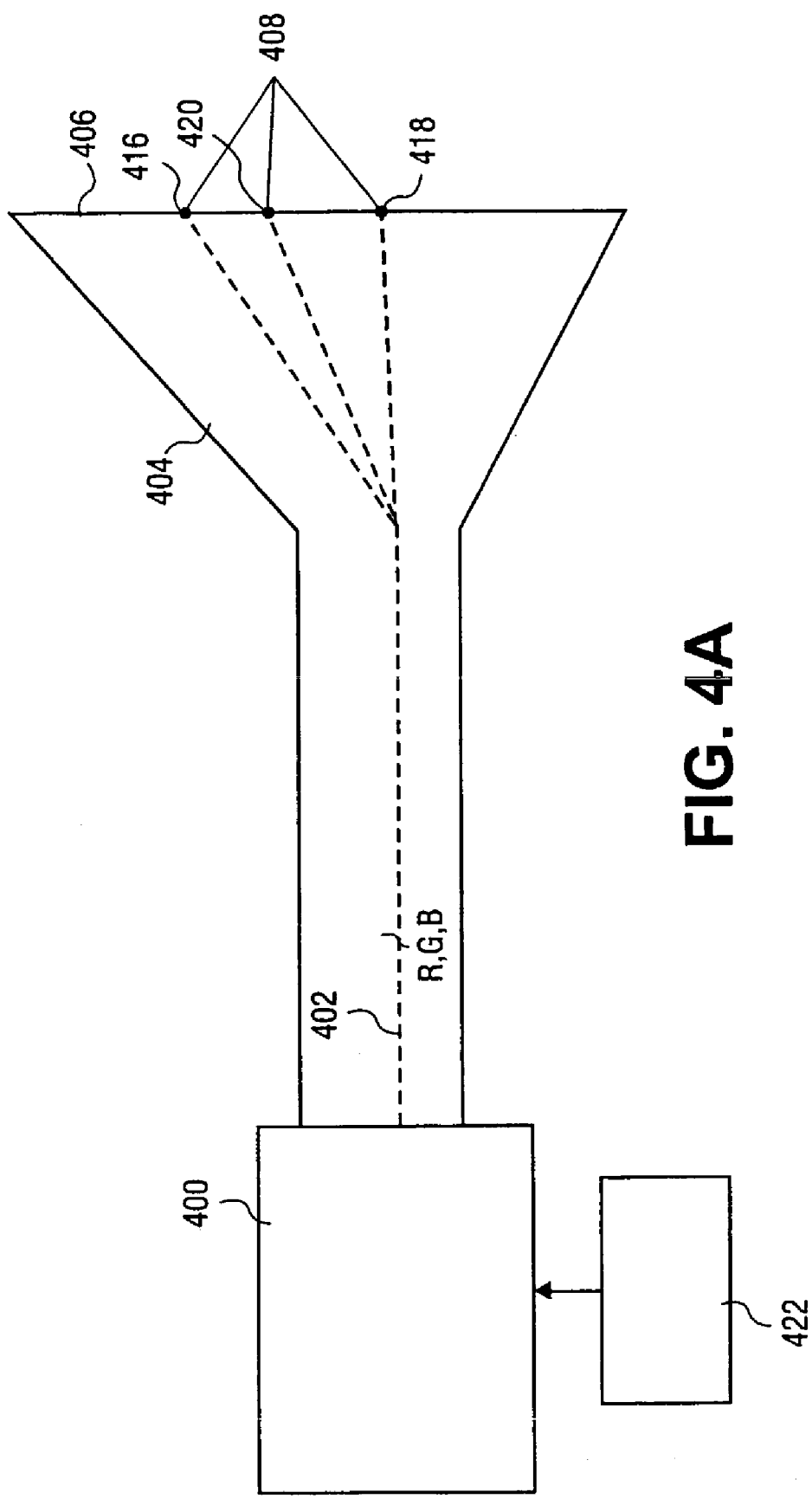
FIG. 4A illustrates a side view of a CRT projecting images to an imaging screen in which the three colors are offset from each other.

In contrast, FIG. 4A shows a diagrammatic illustration of a CRT video display having electron guns 400 that project electron beams 402 inside the CRT 404 onto a phosphor surface 406. As illustrated in this example, CRT 404 will separate and differentially shift the red 416, green 420, and blue 418 color spots that form pixel color spot 408. This can be accomplished by misconverging the electron beams with steering electronics, such as yoke coils, electrostatic deflection plates, or by appropriately displacing the electron guns. Thus, the pixel color spot 408 is formed, but is shifted to separate the red 416, blue 418, and green 420 color spots relative to each other by about one-third pixel or by shifting just the green 420 color spot by one-half pixel pixel from the red 416 and blue 418 color spots. FIG. 4B illustrates the portion of the phosphor screen 406 on which the CRT focuses so that pixel color spot 408 (FIG. 4A) consists of red 416, green 420, and blue 418 color spots that are offset by one-third pixel in the horizontal direction. This modification allows CRTs so adjusted to use the very same subpixel rendering techniques utilized in the art on conventional RGB stripe architecture liquid crystal display (LCD) panels. FIG. 4C illustrates a portion of the phosphor screen 406 in which the CRT focuses the Gaussian spots that form pixel color spot 408 (FIG. 4A) so that the green 420 color spot is offset by one-half pixel in the diagonal direction from the converged red 416 and blue 418 color spots.

Subpixel rendering can also be supported on conventional CRTs without major modification to the CRT. Instead, the timing of the data going to the CRT is modified. This could be accomplished by a modification of the video graphics card on a computer.

In one embodiment, one dimensional subpixel rendering could be supported. For example, the red data would lead, the green delayed by one third (⅓) of a pixel clock, the blue delayed by two thirds (⅔) of a pixel clock. This can be accomplished by using a "subpixel clock" (shown schematically as element 422 in FIG. 4A) at three times the usual pixel clock for the data D/A converters. The result will be that a single "pixel" will paint displaced red 416, green 420, and blue 418 spots as shown in FIG. 4B. This modification could be made to the video graphics card and would make a CRT look like an RGB stripe LCD and compatible with commercial subpixel rendered text such as that disclosed in Hill, et al., U.S. Pat. No. 6,188,385. It might be advantageous to use a system to turn on and off the new mode, either globally or locally by detecting the presence of the subpixel rendered text using a suitable method, as disclosed in the '413 application noted above.

It is also possible to simulate a two dimensionally subpixelated flat panel display. For example, the timing of the color data could be switched every row. The odds rows will have the red data lead with the green data delayed by one half (½) of a pixel clock. On the even rows, the green data will lead while the red data is delayed by one half (½) pixel clock. The blue data is always delayed by one third (⅓) of a pixel clock. The pixel clock is half the frequency of a "normal" pixel clock.

The above system will allow presubpixel rendered images to be displayed on the CRT with minimal processing. Further, the CRT can support higher resolution than ordinarily possible by doubling the number of rows, doubling the horizontal frequency, while using the same bandwidth amplifiers, cables, and memory.

Contrary to prior art projectors, subtractive flat panels, or CRT displays which are not subpixelated, the projectors, subtractive flat panel displays, or CRT displays discussed herein are subpixelated and may thus take advantage of subpixel rendering techniques.

Multi-image plane color projectors often use a single white light source that is broken into narrower spectral regions and separate beam paths through the use of dichroic beam splitting filters. The separated colors illuminate separate spatial light modulators. The modulated light is bought back together and focused onto an imaging screen to be viewed as a full color image.

Figure 5:
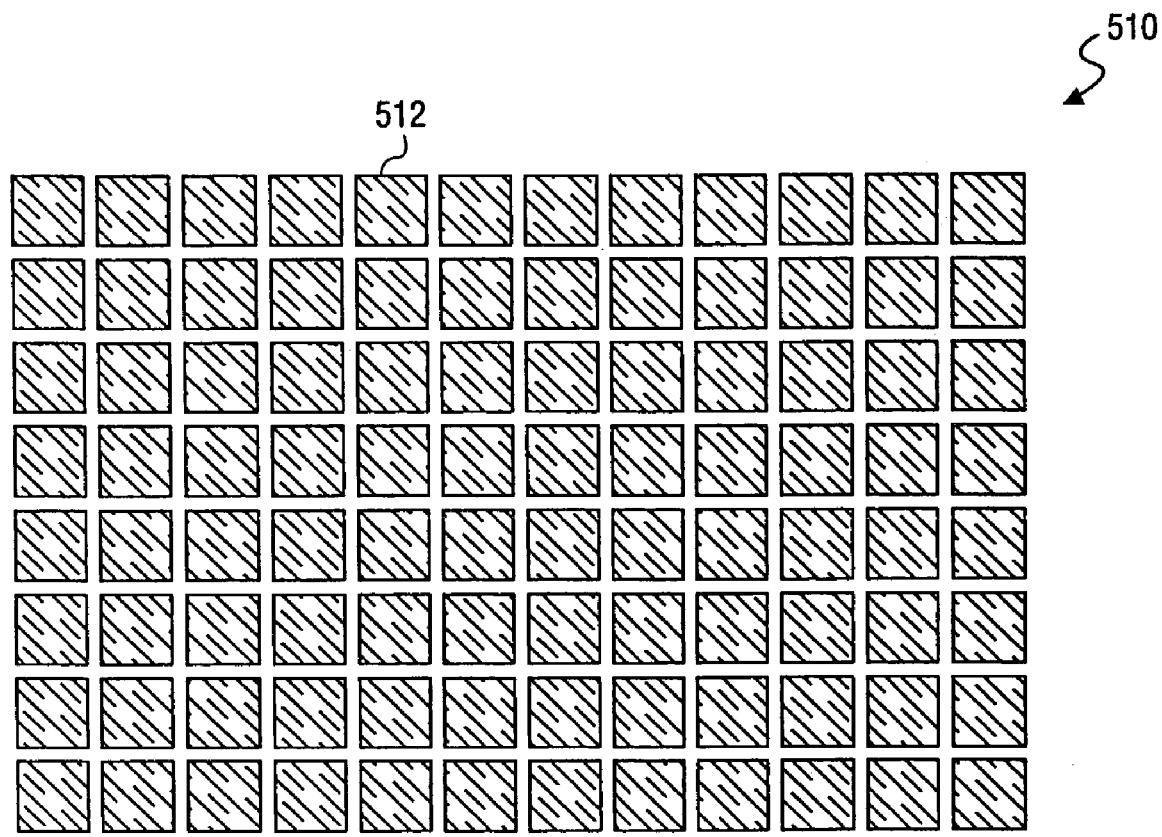
FIG. 5 illustrates a prior art arrangement of pixels for electronic information display projectors.

FIG. 5 illustrates a prior art arrangement 510 of square pixels 512, and in this example, forming an array of 12×8 pixels. For prior art projection or subtraction displays, three planes of 12×8 pixels would be overlaid to create a set of 12×8 logical pixels. This is a total of ninety-six (96) pixels comprising two-hundred-eighty-eight (288) color elements.

Figure 6:
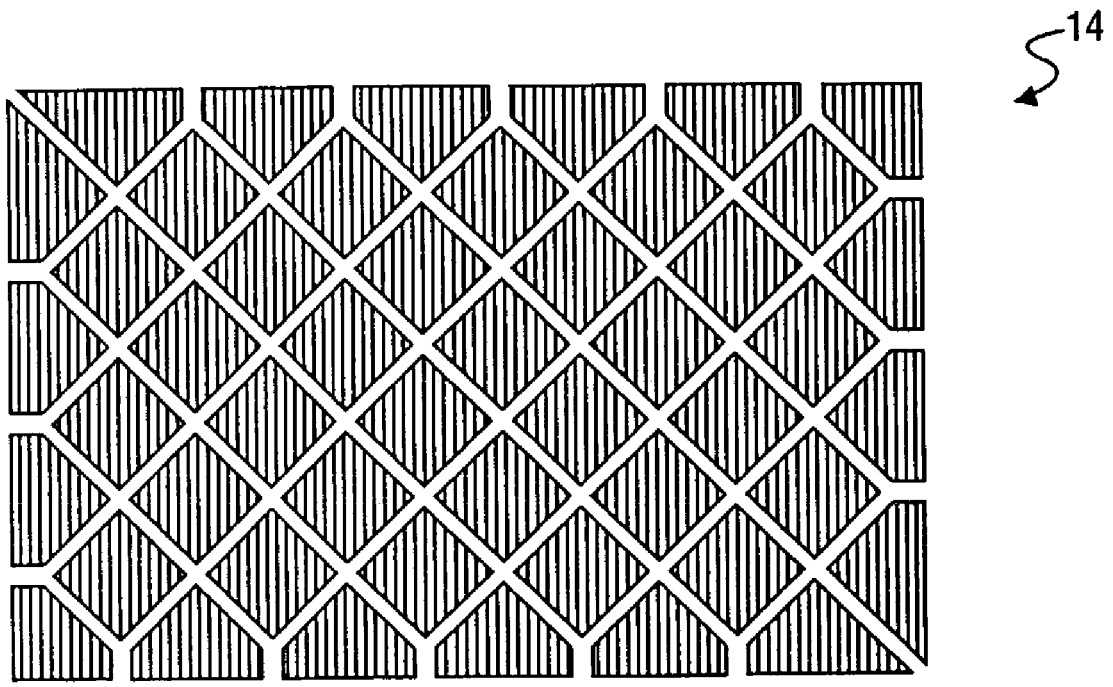
FIGS. 6, 7, and 8 illustrates an arrangement of pixels for each of the colors green, red, and blue, respectively.
Figure 7:
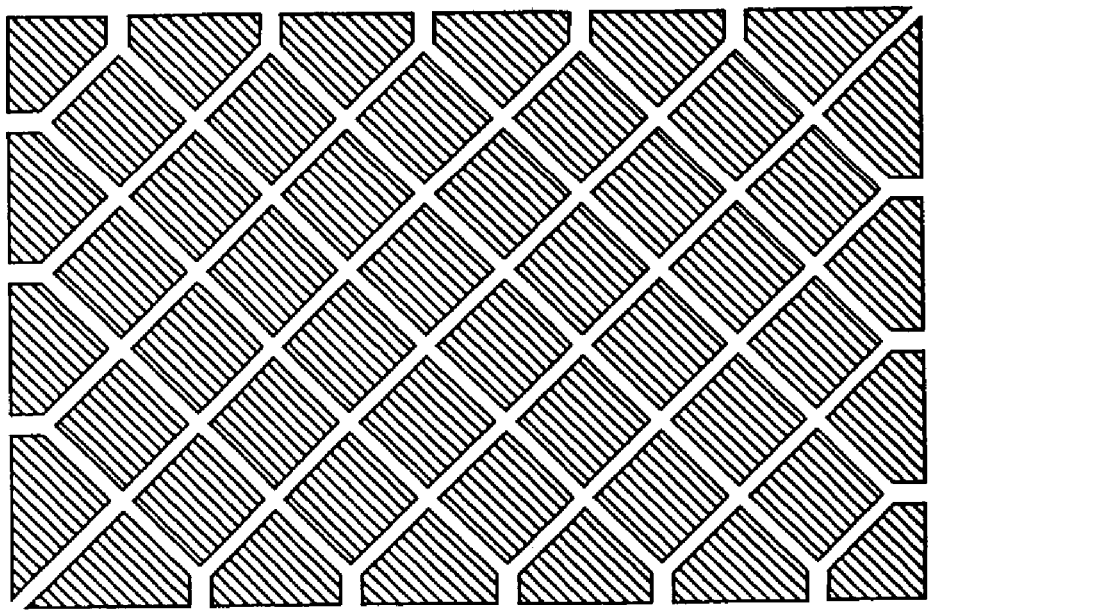
Figure 8:
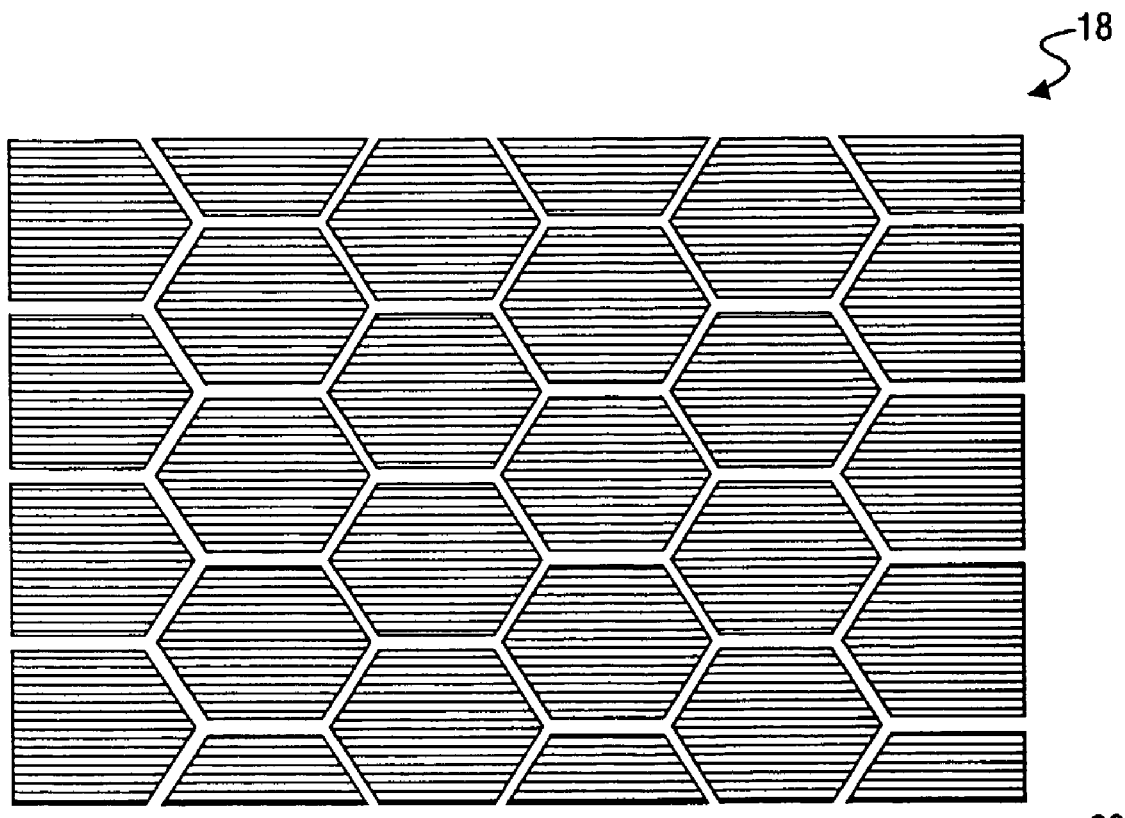

FIGS. 6, 7, and 8 illustrate an arrangement of pixel images for each color of green, red, and blue, respectively, for projectors. The same FIGS. 6, 7, and 8 are also illustrations of an arrangement of subpixels for each color of magenta, cyan, and yellow, respectively, for subtractive color flat panel displays. Magenta is equivalent to subtracting green from white. Cyan is equivalent to subtracting red from white. While yellow is equivalent to subtracting blue from white. For example, a multispectral light source is illuminated, illuminating panels of magenta, cyan, and yellow that are offset from one another in x and y by substantially less than 100%. In the following discussions regarding the theory of operation of the arrangement of subpixel elements, the additive color projector is used as an example. However, for subtractive flat panel display, the same theory of operation applies if one applies additive to subtractive color transforms well known in the art.

Figure 9:
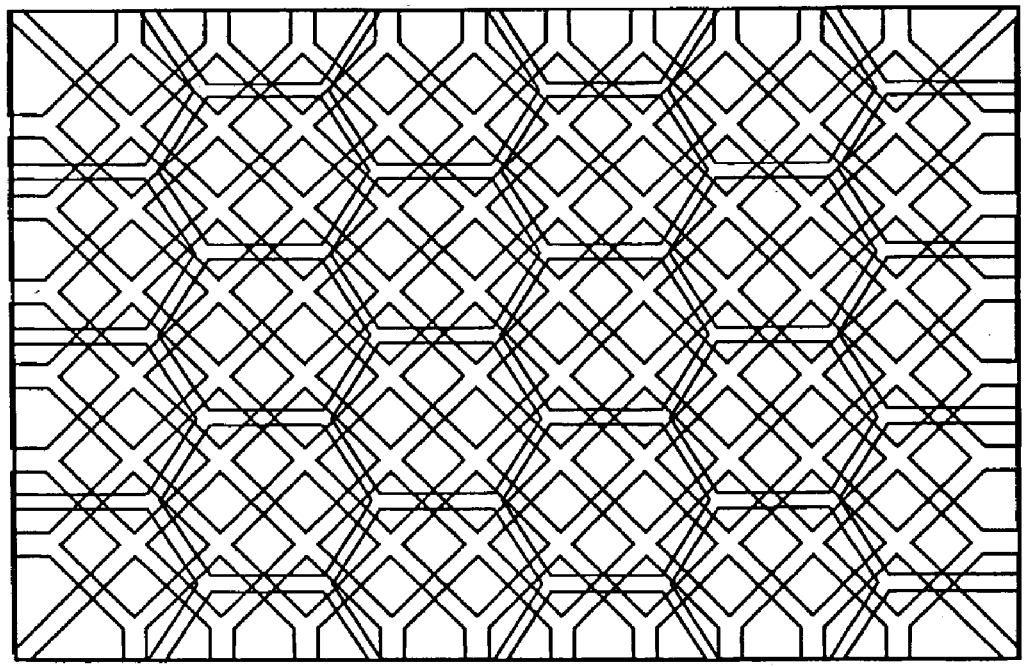
FIG. 9 illustrates the arrangements of FIGS. 6, 7, and 8 overlaid on one another to show how a full color image is constructed.
Figure 10:
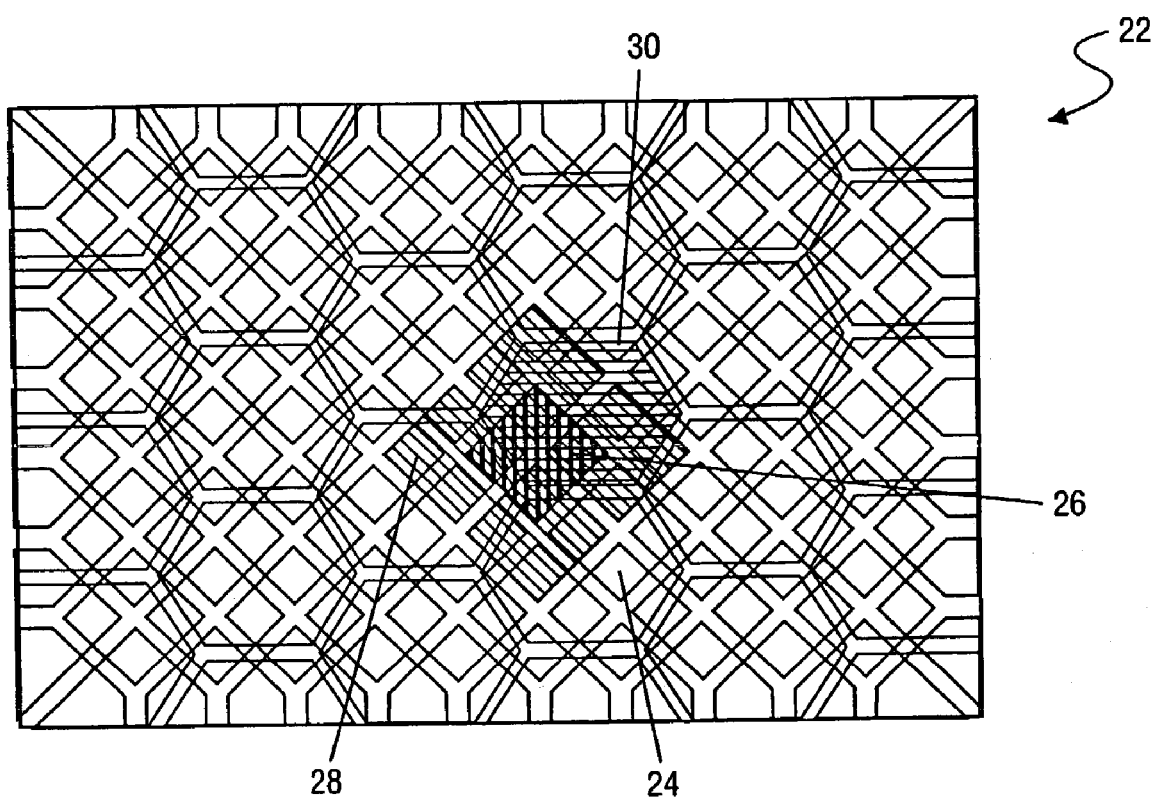

FIG. 9 illustrates the resulting multipixel image 20 of overlaying the images 14, 16, and 18 of FIGS. 6, 7, and 8, respectively, for a three-color plane projector or subtractive flat panel display. The resulting multipixel image 20 of FIG. 9 has the same number of logical pixels 24 as illustrated in FIG. 10 and the same addressability and MTF as the image formed by the arrangement of prior art FIG. 5. However, the same image quality is achieved with only one-hundred-twenty-three (123) color elements, less than half of the number required by the prior art arrangement illustrated in FIG. 5. As the costs increase with the number of elements, the reduction in the number of elements offers the same image quality at a significantly lower cost, significantly higher image quality at the same cost, or a higher image quality at lower cost, when compared to the prior art arrangement illustrated in FIG. 5.

In each of the imaging devices discussed above, the beams (or panels) are convergent by substantially less than about 100%, with less than about 75% preferred, and with about 50% more preferred.

One advantage of the three-color plane array disclosed here is improved resolution of color displays. This occurs since only the red and green pixels (or emitters) contribute significantly to the perception of high resolution in the luminance channel. Offsetting the pixels allows higher perceived resolution in the luminance channel. The blue pixel can be reduced without affecting the perceived resolution. Thus, reducing the number of blue pixels reduces costs by more closely matching human vision.

The multipixel image 22 of FIG. 10 illustrates a logical pixel 24 showing a central pixel 26 of either the red or the green color plane (in this case it is green) that is set at 50% of the input value associated with that logical pixel 24. Surrounding and overlapping this central pixel 26 are four pixels 28 of the opposite color of the red/green opposition channel (in this case it is red) that is set at 12.5% of the input value associated with that logical pixel 24. Partially overlapping and offset is a blue pixel 30, which is set at about 25% of the input value associated with that logical pixel 24.

The logical pixel 24 of FIG. 10 illustrates that the central area defined by the central pixel 26 is the brightest area, at 31.25%, while the surrounding area, defined by the surrounding pixels 28 of the "opposite" color (not overlapping with the central pixel 24) remains at 6.25% brightness. This approximates a Gaussian spot, similar to those formed by the electron gun spot of a CRT.

Figure 13:
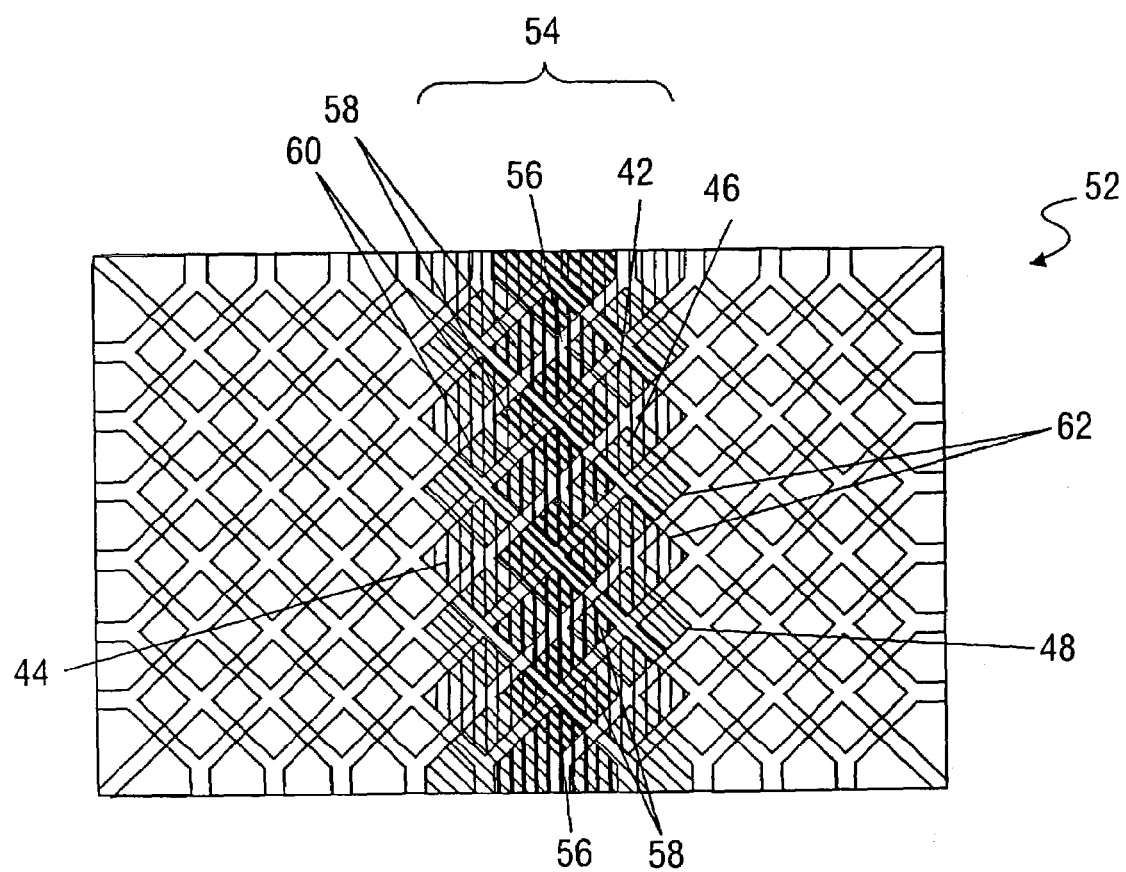
FIG. 13 illustrates the red and green image planes of FIGS. 11 and 12 overlaid.

Images 52 and 68 are built up by overlapping logical pixels as shown in FIGS. 13 and 16, respectively. For ease of illustration, the blue plane in each figure has not been shown for clarity. The arrangement of the pixels of each color plane 14, 16, and 18 illustrated in FIGS. 6, 7, and 8, respectively, are essentially identical to some of the effective sample area arrangements found in many of the above-referenced applications that are incorporated by reference. Further, the arrangement of this present embodiment use the same reconstruction points of the pixel arrangements disclosed in the above-referenced applications.

Figure 11:
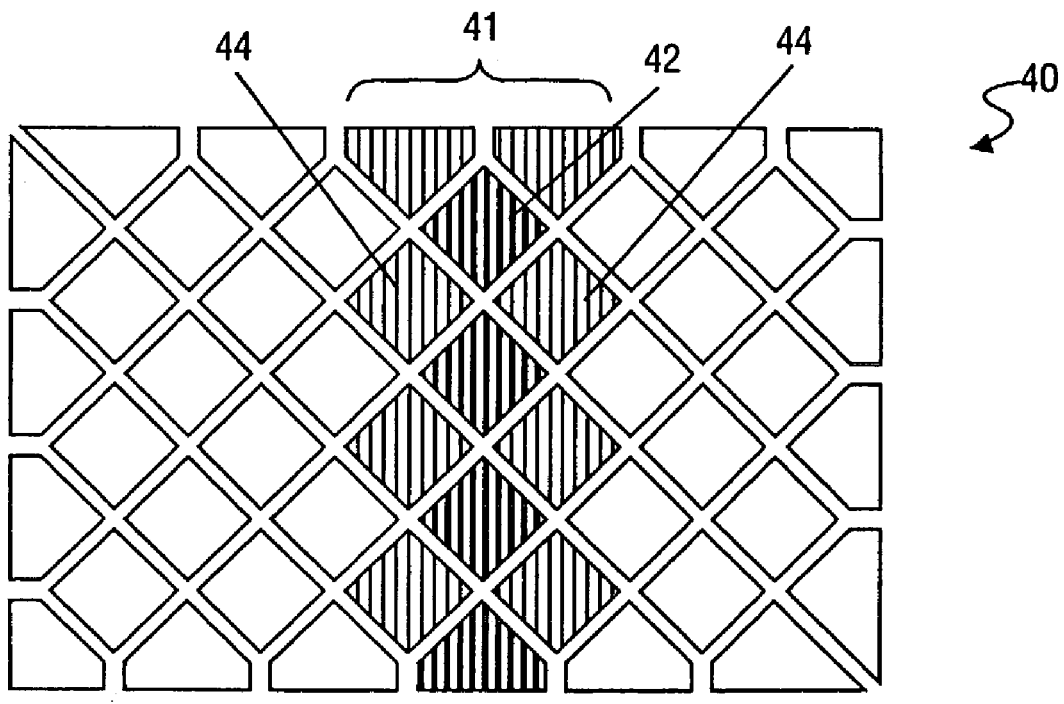
Figure 12:
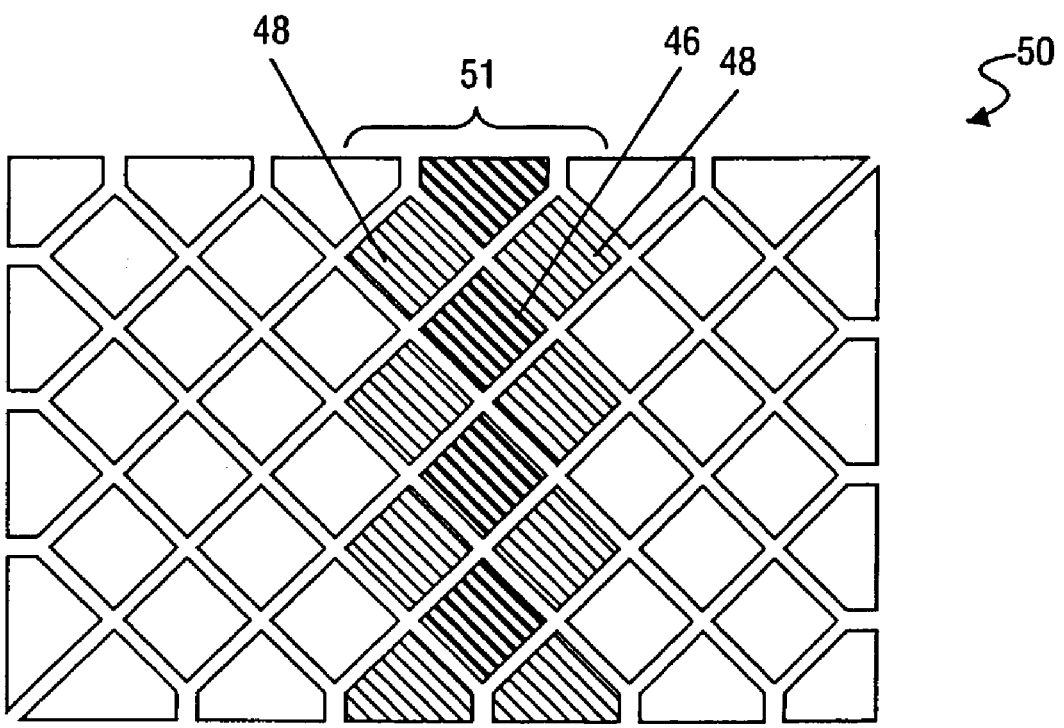

For projected image or subtractive color flat panel displays, the present application discloses using the same pixel rendering techniques and human vision optimized image reconstruction layout. However, a smoother image construction is created in the present application due to the overlapping nature of the pixels. For an example of a multipixel image 52 having the smoother image construction, FIG. 13 illustrates a vertical line 54 comprising the green component image 40 and the red component image 50 of FIGS. 11 and 12, respectively. As illustrated in the multipixel image 40 in FIG. 11, a vertical line 41 comprises central green pixels 42 and outer green pixels 44. As illustrated in the multipixel image 50 in FIG. 12, a vertical line 51 comprises central red pixels 46 and outer red pixels 48. For clarity, the blue color plane is not shown in FIG. 13. This example assumes that the vertical line 54 displayed at about 100% of the input value and is surrounded on both sides by a field at 0% of the input value.

FIG. 13 illustrates that the central red pixels 46 of the vertical line are offset from the central green pixels 42 when superimposed onto each other. These central pixels 42 and 46 are each set at 75%. The outer pixels 44 and 48 are each set at 12.5%. The areas of overlap of the central pixels 42 and 46 form a central series of smaller diamonds 56 that are at 75% brightness. The overlap of pixels 44 and pixels 46, and the overlap of pixels 48 and pixels 42, respectfully, form two series, just outside of the said central series, of smaller diamonds 58 that are at 43.75% brightness. The overlap of the outer pixels 44 and 48 form two series of smaller diamonds 60 that are at 12.5% brightness. While the areas of the outer pixels 44 and 48 that do not overlap form an outermost series of smaller diamonds 62 that are at 6.25% brightness. This series of brightness levels, 6.25%, 12.5%, 43.75%, 75%, 43.75%, 12.5%, and 6.25% exhibits a Gaussian distribution. Further, if one were to imagine an infinitely narrow vertical line segment, at least several pixels long, moving across the displayed vertical line 54, integrating the brightness, the resulting function would be a series of smooth segments joining the brightness levels, from zero to 75% to zero. Thus, the resulting cross-sectional brightness function, integrated over several pixels tall, along the displayed line, closely approximates a smooth Gaussian curve. This displayed vertical line can be moved over by about one-half pixel, such that the addressability would be about one-half pixel.

In moving the vertical line, the amount of improvement is proportional to the amount that the red and green planes are out of phase. Having the image planes out of phase at a value of substantially less than about 100% is preferred, with less than about 75% more preferred, and with the images being exactly out of phase by about one-half pixel, or about 50%, is ideal.

Figure 14A:
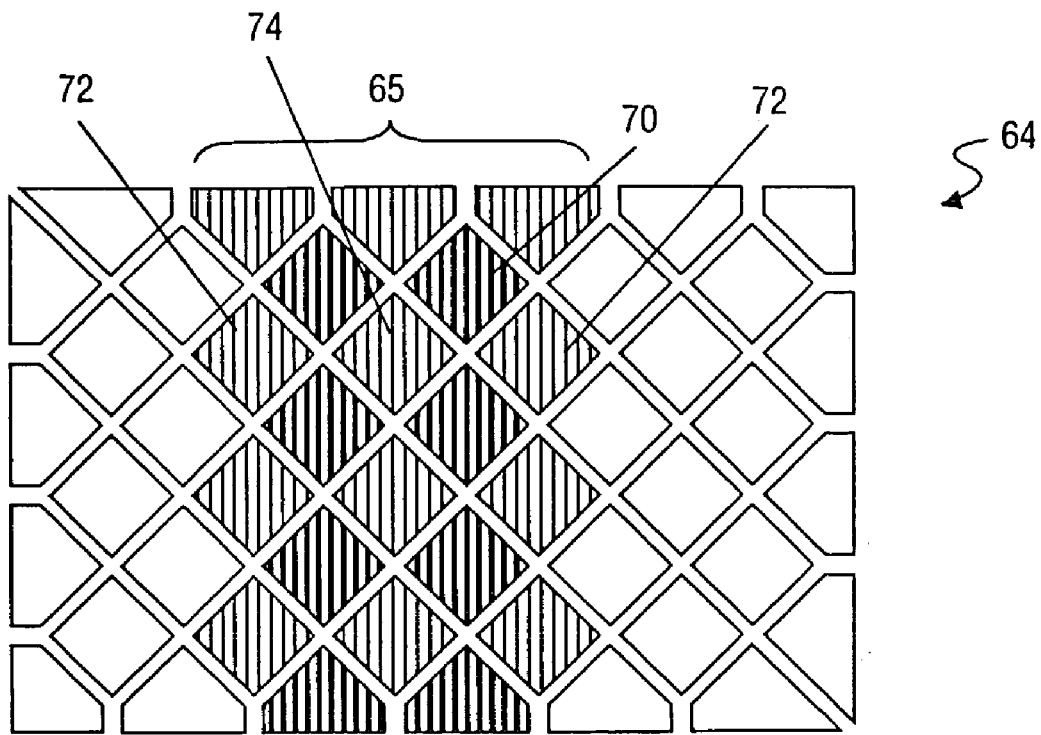
Figure 15A:
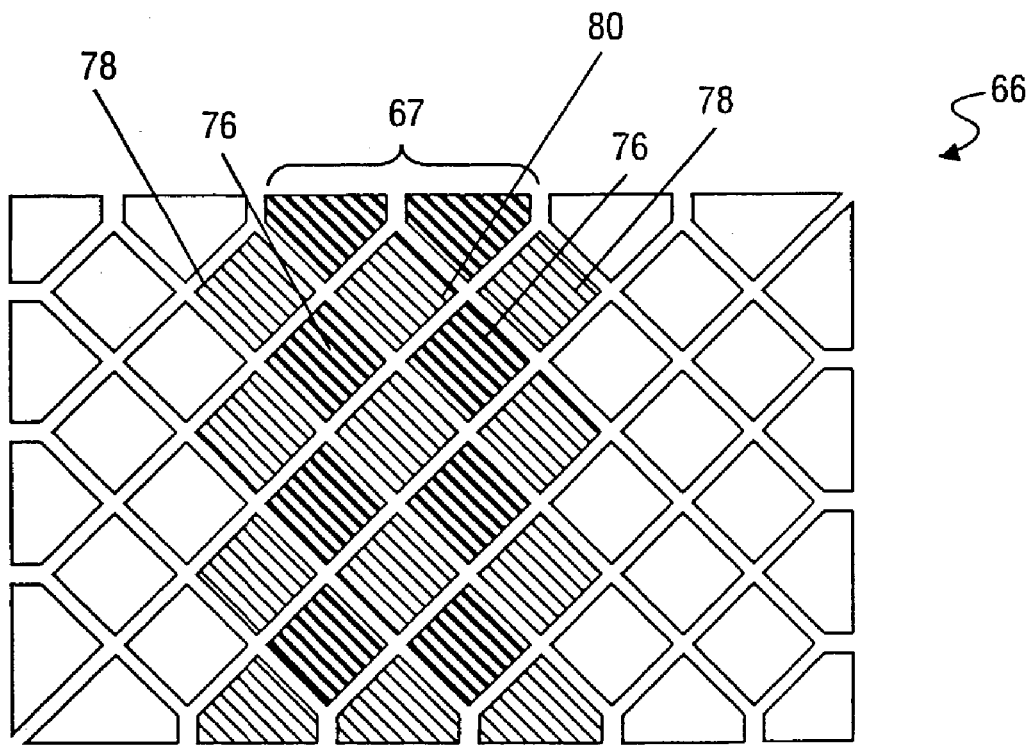
Figure 16A:
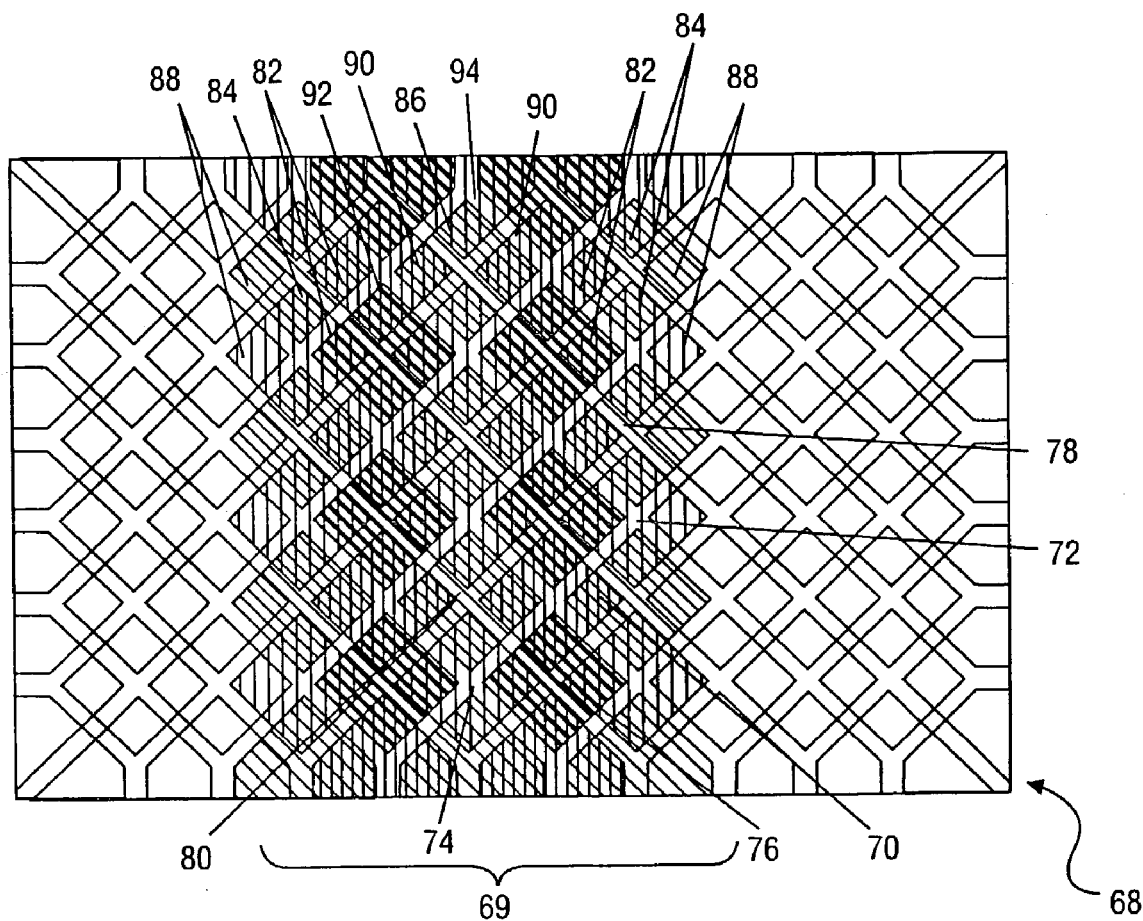
FIGS. 16A and 16B illustrate the green and red image planes of FIGS. 14A–14B and 15A–15B overlaid, respectively.
Figure 16B:
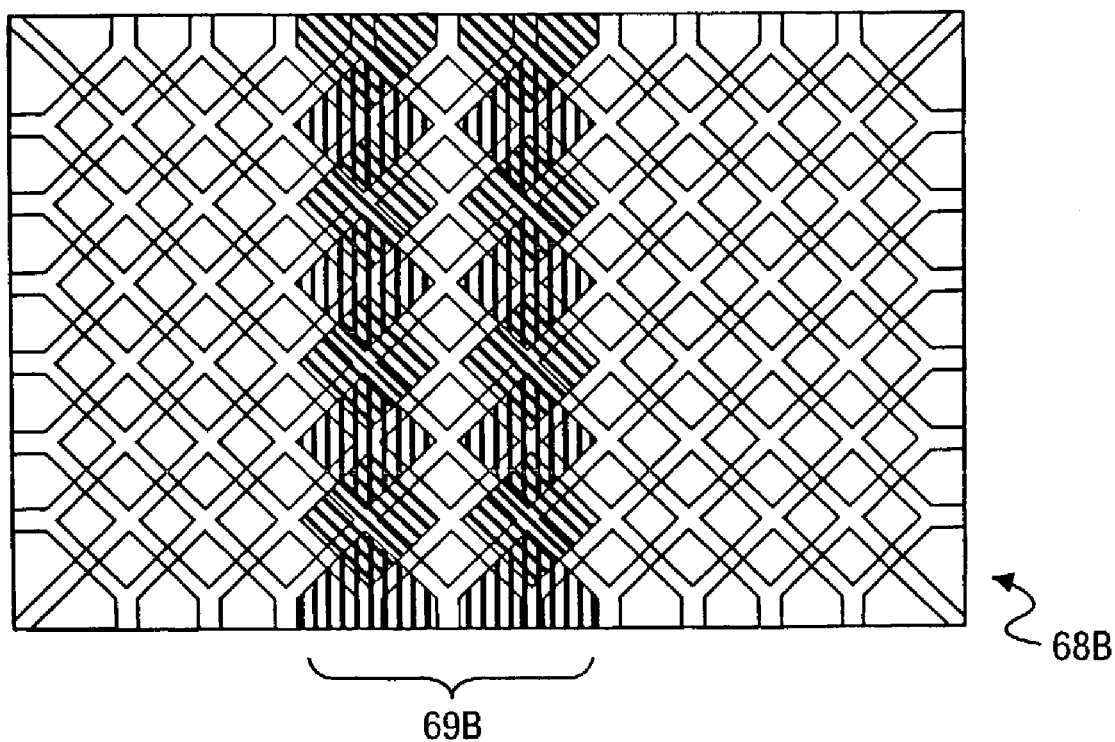

FIGS. 16A and 16B illustrate two multipixel images 68 and 68b of two vertical lines 69 and 69b, respectively, displayed to demonstrate that the MTF is about one-half of the addressability, which is the theoretical limit for subpixelated displays. FIG. 16A illustrates the two vertical lines 69 comprising the green component image 64 and the red component image 66 of FIGS. 14A and 15A, respectively. As illustrated in the multipixel image 64 in FIG. 14A, the central green pixels 70 and outer green pixels 72 comprise two vertical lines 65. As illustrated in the multipixel image 66 in FIG. 15A, the central red pixels 76 and outer red pixels 78 comprise two vertical lines 67. For clarity, the blue color plane is not shown in FIG. 16A. This example assumes that the vertical line 69 is displayed at about 100% of the input value and is surrounded on both sides by a field at 0% of the input value.

The central red pixels 76 of the two vertical lines 69 are offset from the central green pixels 70 when superimposed as in FIG. 16A. These central line pixels 70 and 76 are each set at 75%. The outer pixels 72 and 78 are each set at 12.5%. The pixels 74 and 80 between the two central lines of pixels 76 and 70 are set at 25%.

The outer edges, those not adjoining the other line, have the same sequence of brightness levels as described for the case of FIG. 13. That is, the areas of the outer pixels 72 and 78 that do not overlap form an outermost series of smaller diamonds 88 at 6.25% brightness. The overlap of the outer pixels 72 and 78 form two series of smaller diamonds 84 that are at 12.5% brightness. The overlap of pixels 72 and pixels 76, and the overlap of pixels 78 and pixels 70, respectfully, form two series, just outside of the central line series 86, of smaller diamonds 82 that are at 43.75% brightness. The areas of overlap of the central line pixels 70 and 76 form a central series of smaller diamonds 92 that are at 75% brightness.

The space between the two central vertical lines 69 has three series of smaller diamonds 90 and 94. The overlap of red central line pixels 76 and green interstitial pixels 74, and the overlap of green central line pixels 70 and red interstitial pixels 80, respectively, form a series of smaller diamonds 90 at 50% brightness. The overlap of interstitial pixels 74 and 80 form a series of smaller diamonds 94 at 25% brightness. Theoretically, this represents samples of a sine wave at the Nyquist limit, exactly in phase with the samples. However, when integrating over an imaginary vertical line segment as it moves across from peak to trough to peak, the function is that of a triangle wave. Yet, with the MTF of the projection lens limiting the bandpass of the projected image, the function is that of a smooth sine wave. The display effectively removes all Fourier wave components above the reconstruction point Nyquist limit. Here, the modulation depth is 50%. As long as this is within the human viewer's Contrast Sensitivity Function (CSF) for a given display's contrast and resolution, this modulation depth is visible.

Figure 14B:
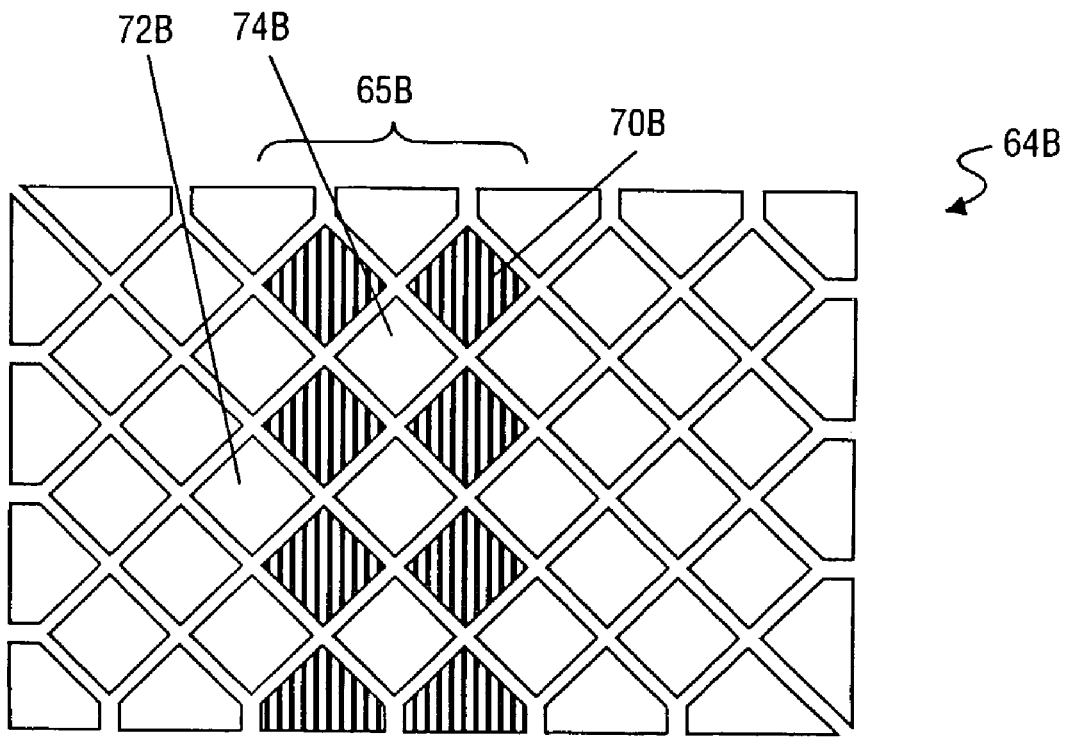
Figure 15B:
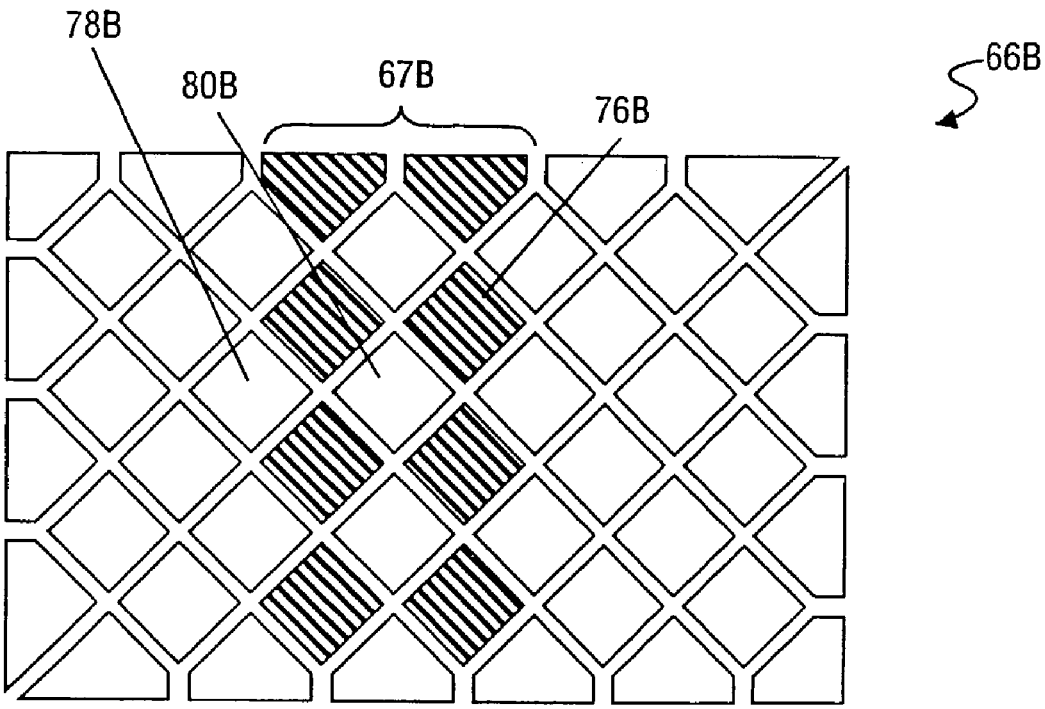

FIG. 16B illustrates the two vertical lines 69b comprising the green component image 64b and the red component image 66b of FIGS. 14B and 15B, respectively. These images are designed to be 'sharper' than those of FIGS. 16A, 14A, and 15A. As illustrated in the multipixel image 64b in FIG. 14B, the green pixels 70b comprise two vertical lines 65b. As illustrated in the multipixel image 66b in FIG. 15B, the red pixels 76b comprise two vertical lines 67b. For clarity, the blue color plane is not shown in FIG. 16B. This example assumes that the vertical lines 69b are displayed at about 100% of the input value and is surrounded on both sides by a field at 0% of the input value. Here, the values of both the red pixels 76b and the green pixels 70b are set at 100% output value, while the pixels, 74b and 80b, between the double lines 67b and 65b are set at 0% output value. Likewise the pixels, 72b and 78b, outside the double lines 67b and 65b are set at 0% output value. These values are generated by using sharpening coefficients in the filter matrix used in the subpixel rendering operation.

Figure 17:
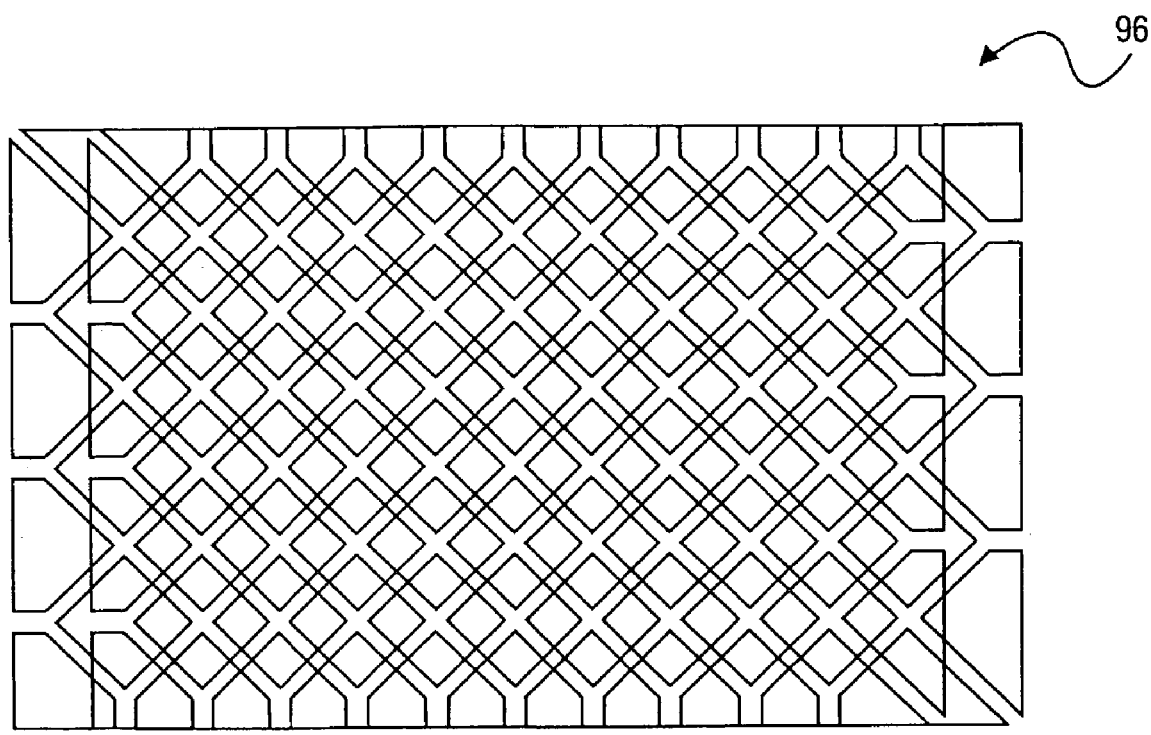
FIG. 17 illustrates two images of the pixel arrangement of FIG. 6 overlaid, offset by one-half pixel, to demonstrate how a single imaging plane can build up a higher resolution image using field sequential color, or to demonstrate how two imaging planes of a multi-panel may be offset to build up a higher resolution image.
Figure 18:
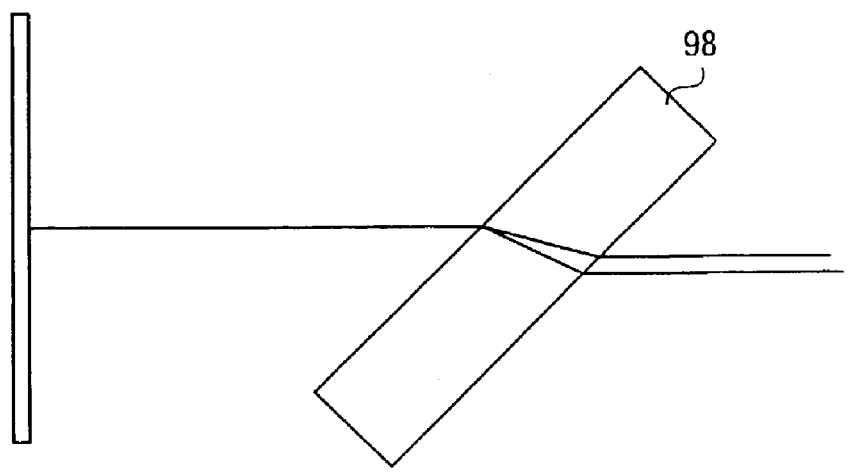
FIG. 18 illustrates splitting of an image path into two different paths for different colors through an inclined plate made of a chromodispersive material.

FIG. 17 illustrates an overlay 96 of the image 14 of FIG. 6 offset 50% with itself. This represents an alternative embodiment of a single panel projector, using field or frame sequential color that is well known in the art. In this embodiment, the array is again formed from diamonds, but the image 14 is shifted optically to separate the red and green color planes by about one-half pixel. This color shift may be accomplished as shown in FIG. 18 by an inclined plane lens 98 of a suitable chromodispersive transparent material. Such an arrangement will separate and differentially shift the red, green, and blue images due to the different index of refraction for each wavelength. This lens element may be a separate flat plane lens, or may be an inclined curved element that is an integral part of the projection lens assembly. Such modifications to the lens assembly may be designed using techniques well known in the art.

Figure 19:
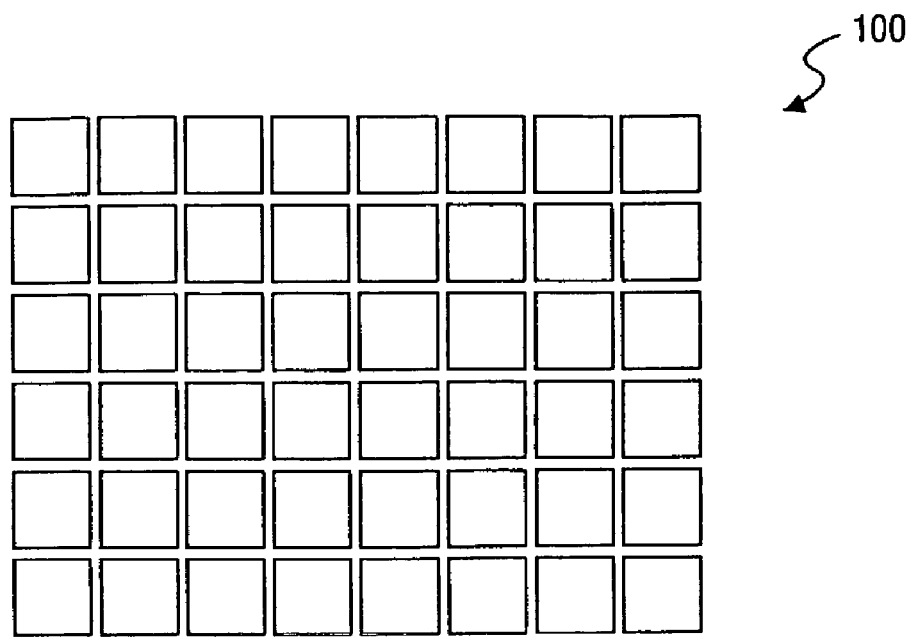
FIG. 19 illustrates a prior art arrangement of pixels.
Figure 20:
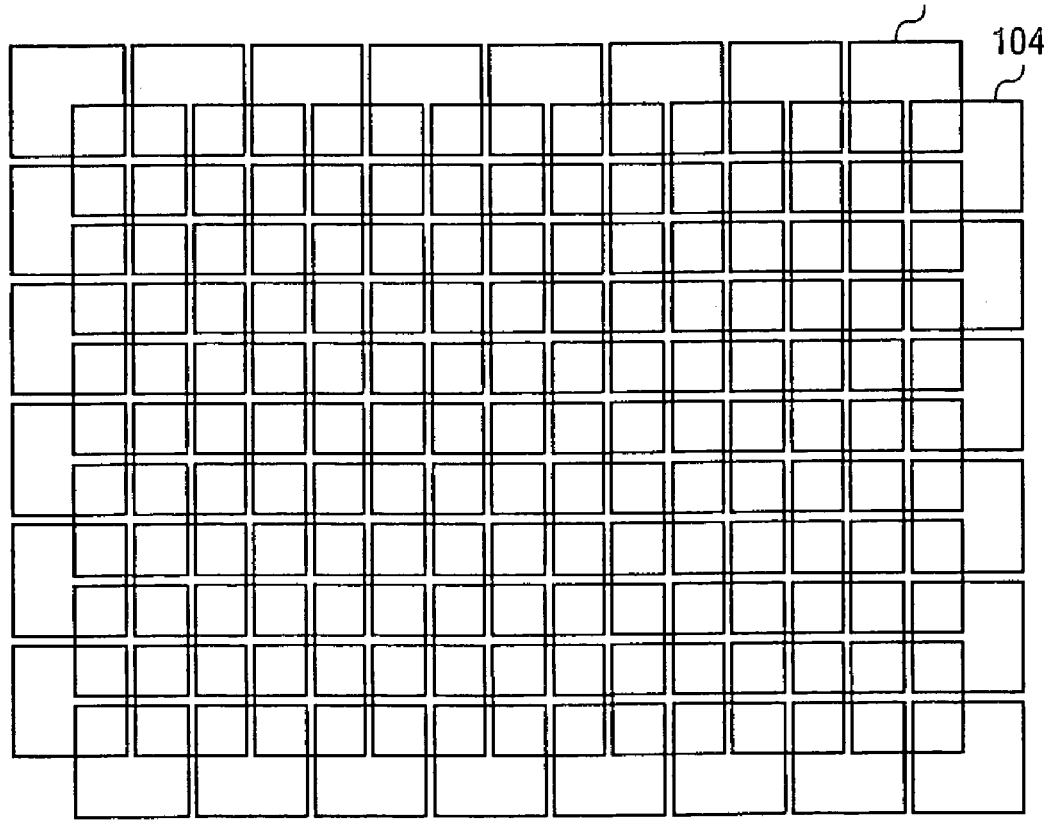
FIG. 20 illustrates an overlay of the arrangement of prior art FIG. 19 in which the two colors are offset by one-half pixel in the diagonal direction.
Figure 21:
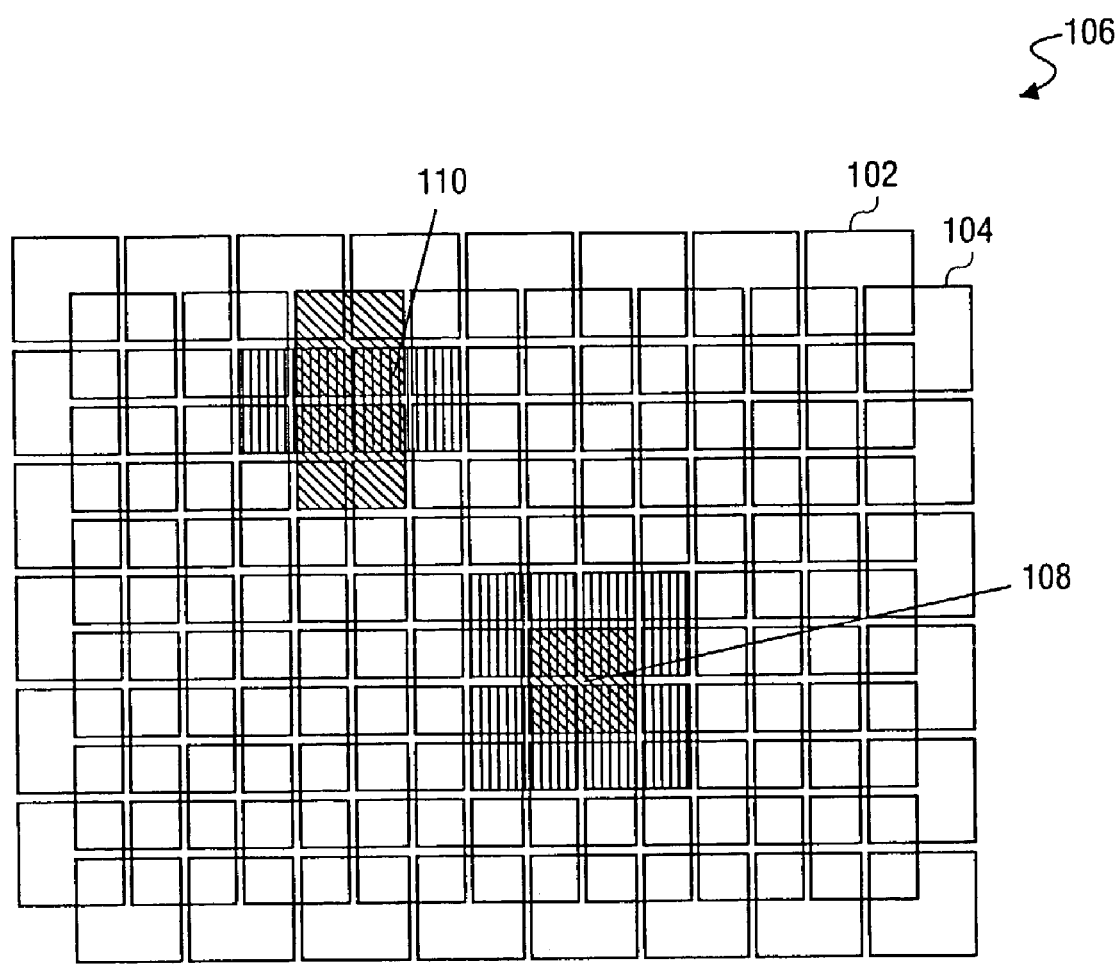
FIG. 21 illustrates the overlaid arrangement of FIG. 20 with two color logical pixels at different addressable points.
Figure 22:
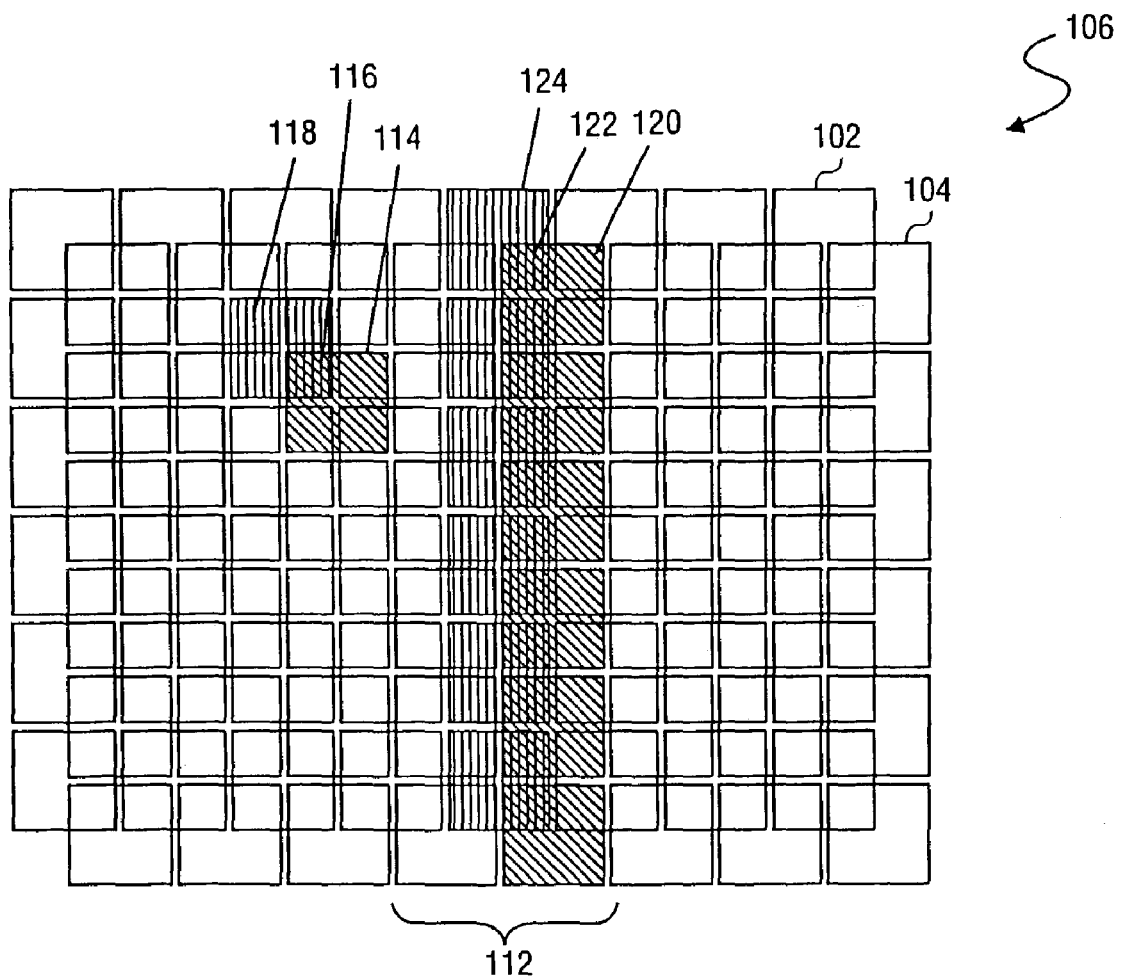
FIG. 22 illustrates the overlaid arrangement of FIG. 20 with an alternative color logical pixel and a column line of logical pixels.

These optical and mechanical means for shifting the color image planes can be used to improve display systems that use prior art arrangements 100 of pixels as illustrated in FIG. 19. The green image 102 may be shifted from the red image 104 by about one-half pixel in the diagonal direction as illustrated in the arrangement 106 in FIG. 20. This allows subpixel rendering to be applied to the resulting system. FIG. 21 illustrates two logical pixels centered on a square grid that lies on corner interstitial 108 and edge interstitial 110 points in the arrangement 106 of FIG. 20. FIG. 22 illustrates arrangement 106 with a logical pixel and a column line 112 of overlapping logical pixels centered on pixel quadrants defined by the pixel overlaps.

In examining the example of a logical pixel 114, 116, and 118 shown in FIG. 22, the output value of each pixel is determined by a simple displaced box filter in which four input pixels are averaged for each output pixel. Each input pixel uniquely maps to one red output pixel 114 and one green output pixel 118 that overlaps by one quadrant 116. Thus, the addressability of the display has been increased four fold, twice in each axis. With one input pixel at about 100% value surrounded by a field at 0% value, the red output pixel 114 and the green output pixel 118 are set at 25% output. The area of overlap 116 is at 25% brightness while the areas of the output pixels 114 and 118 not overlapping are at 12.5% brightness. Thus, the peak brightness is in the overlapping quadrant.

In examining the vertical line 112 displayed in FIG. 22, it is displaying a line at about 100% input value surrounded on both sides by a field at 0% input value. The overlapping logical pixels are additive. Thus, the red output pixels 120 and the green output pixels 124 are set at 50%. The area of overlap 122 is at 50% brightness while the areas of the output pixels 120 and 124 that are not overlapping are at 25% brightness. Thus, the area of peak brightness corresponds with location of the displayed line 112.

In examining and evaluating the display system, it can be noted that while the addressability of the display has been doubled in each axis, the MTF has been increased by a lesser degree. The highest spatial frequency that may be displayed on the modified system is about one-half octave higher than the prior art system. Thus, the system may display 2.25 times more information on four times as many addressable points.

In the above systems the blue information has been ignored for clarity. This is possible due to the poor blue resolving power of human vision. However, in so far as the blue filter or other blue illumination system is less than perfect and allows green light that will be sensed by the green sensing cones of human vision, the blue image will be sensed by the green cones and add to the perception of brightness in the luminance channel. This may be used as an advantage by keeping the blue pixels in registration with the red pixels to add to the red brightness and to offset the slight brightness advantage that green light has in the luminance channel. Thus, the red output pixels may be, in fact, a magenta color to achieve this balance of brightness.

Figure 23:
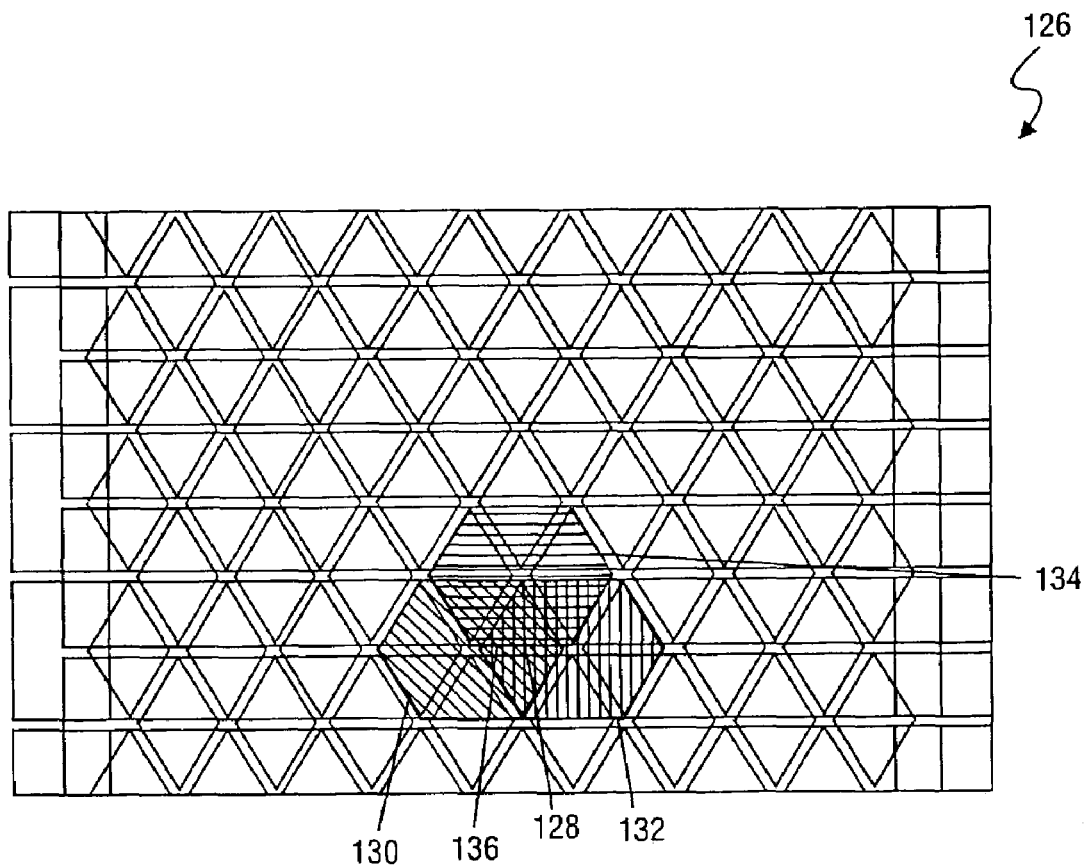

If a system were designed in which the "blue" image has significant leakage of green, and possibly yellow or even red, the "blue" image may be used to further increase the effective resolution of a display. The "blue" color may be closer to a pale pastel blue, a cyan, a purple, or even a magenta color. An example of such a display 126 is illustrated in FIG. 23. FIG. 23 illustrates three images of the array of pixels shown in FIG. 8 overlaid with a shift of one third of a pixel each. A logical pixel 128 is illustrated on the resulting image 126 in FIG. 23. The red pixel 130, green pixel 132, and "blue" pixel 134 overlap to form a smaller triangular area 136 that is at the center of the logical pixel. This overlap area is brightest, followed by the three areas where there are only two pixels overlapping, while the areas with no overlap have the lowest brightness. The manner of calculating the values of the pixels follows in a similar manner as outlined above.

Figure 35A:
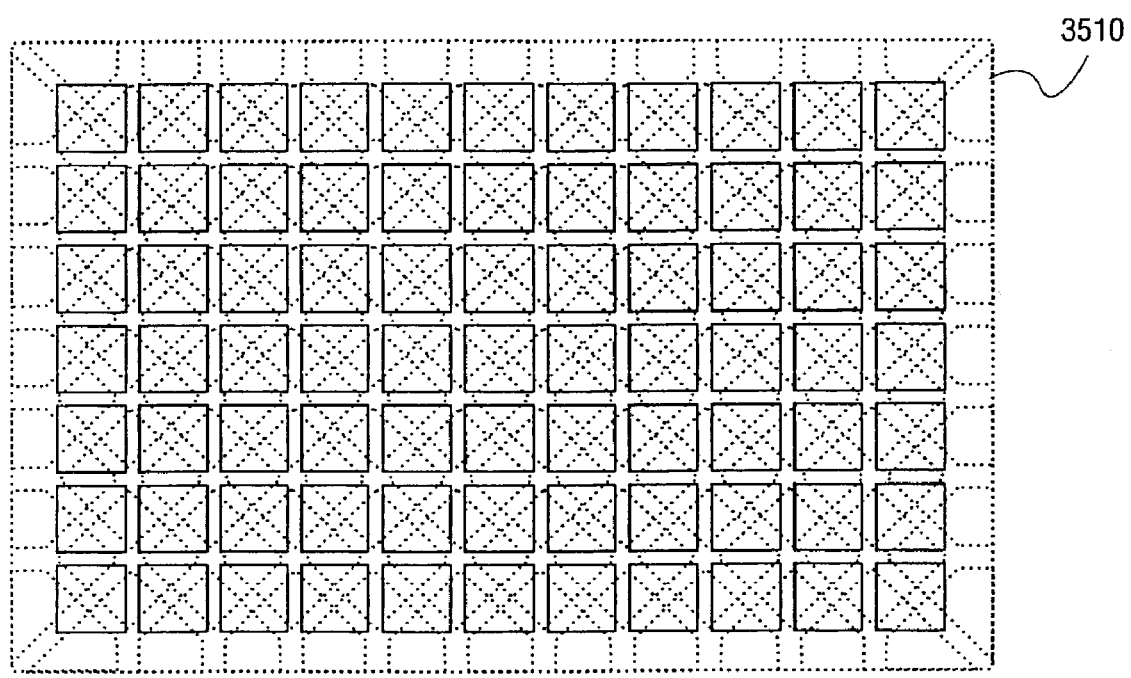
FIG. 35A illustrates a novel display arrangement of the color planes on a display.
Figure 35B:
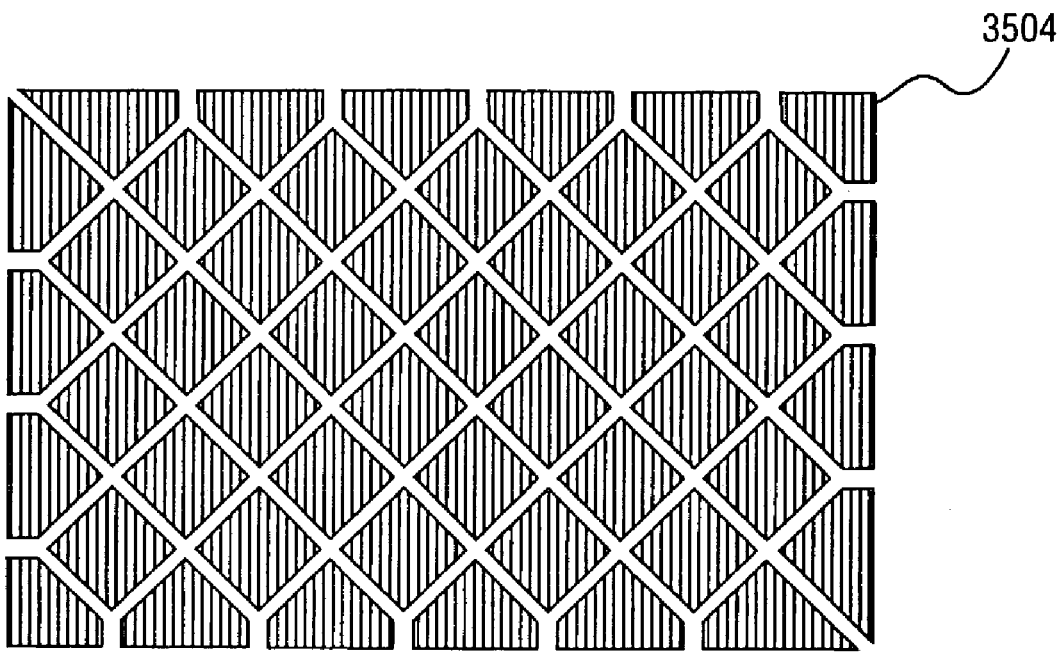
FIGS. 35B, 35C, and 35D illustrate the color planes overlaid on each other to create a full color image as shown in FIG. 35A.
Figure 35C:
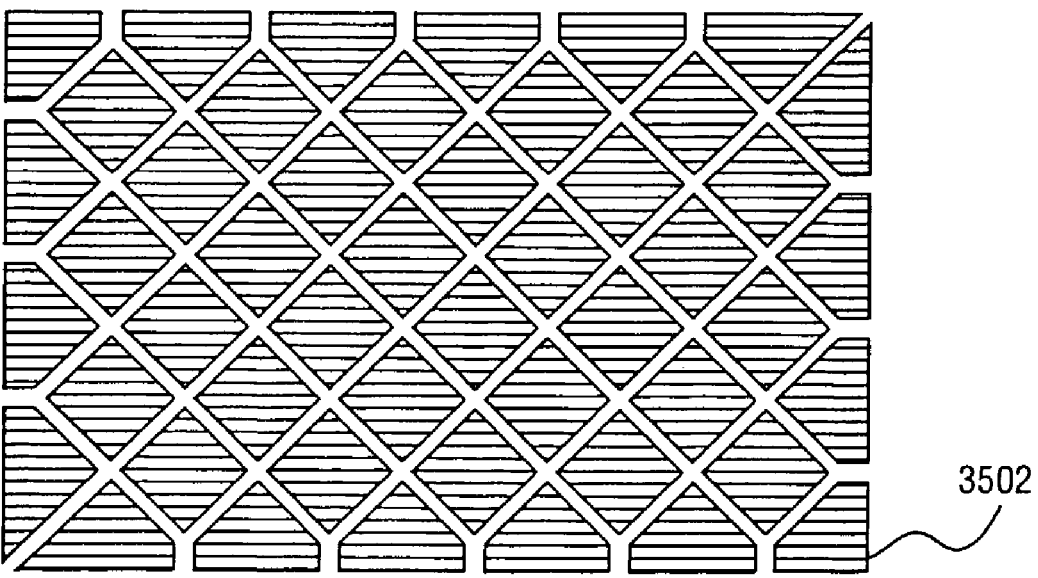
Figure 35D:
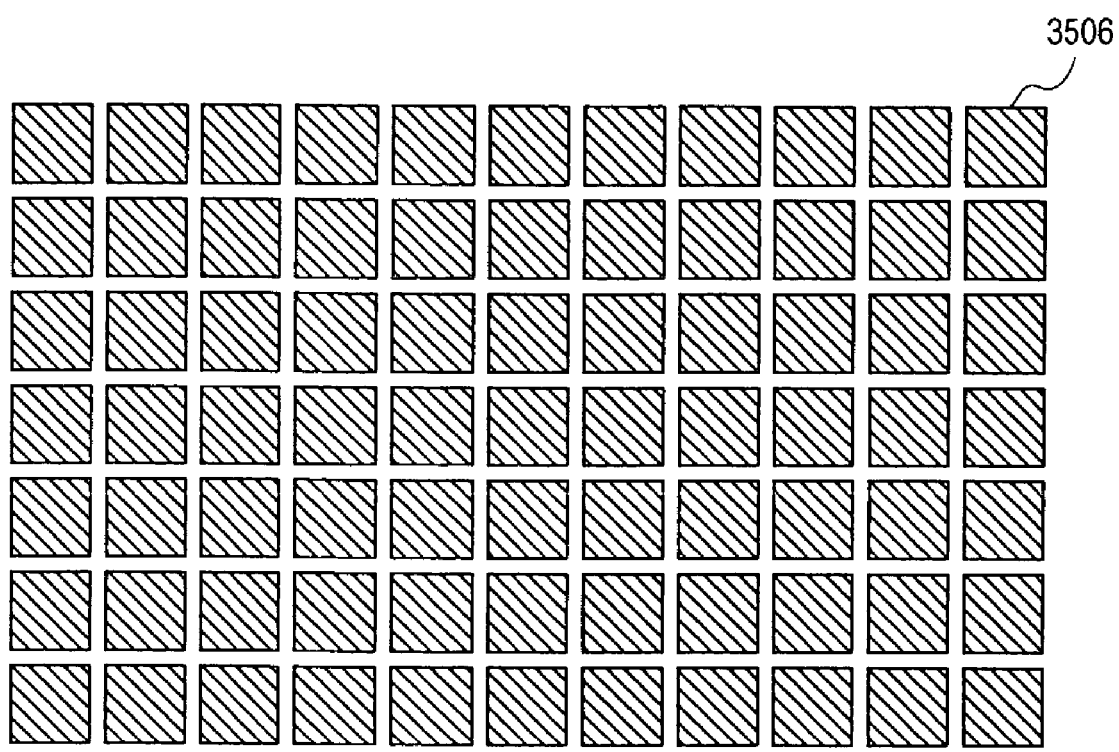

Another embodiment of the present invention is shown in FIG. 35A in which the red 3504, blue 3502, and green 3506 color planes shown in FIGS. 35B, 35C, and 35D respectively are overlaid one another to form the full color arrangement 3510. The color planes are overlaid each other such that they are substantially "out of alignment" as shown in FIG. 35A.

This arrangement is characterized by having a green plane 3506 that is higher resolution than both the red 3504 and blue 3502. In this present arrangement, the red 3504 and blue 3502 have the same resolution, but this need not be the case. It is contemplated that all three of the color planes might be different resolutions. For example, one might use the high resolution green color plane 3506 of FIG. 35D, with the red color plane 3504 of FIG. 35B, and the blue color plane 18 of FIG. 8, overlaying thus such that they are all substantially "out of alignment". Alternatively, the red color plane may be the higher of the three planes. However, in practice, given the luminances found in most projector systems, the green color plane will be found to be the best choice for the highest resolution.

More particularly, if the green luminance is approximately half the total luminance, as is commonly found in projectors, there may be an advantage to the particular arrangement shown in FIG. 35A in which the green color plane 3506 is twice that of the red 3504 and blue 3502 color planes. This is not to say that the resolution ratio is determined by the luminance ratio, rather it is the fact that one can achieve the same resolution from the offset red 3504 and blue 3502 color planes as from the green color plane 3506 alone. These are then set to be substantially offset from one another, the green 3506 from the virtual magenta (combined red 3504 and blue 3502). The advantage found in this arrangement is that moiré distortion when reconstruction a high resolution image may be significantly reduced with a minimal number of color reconstruction points.

Figure 36A:
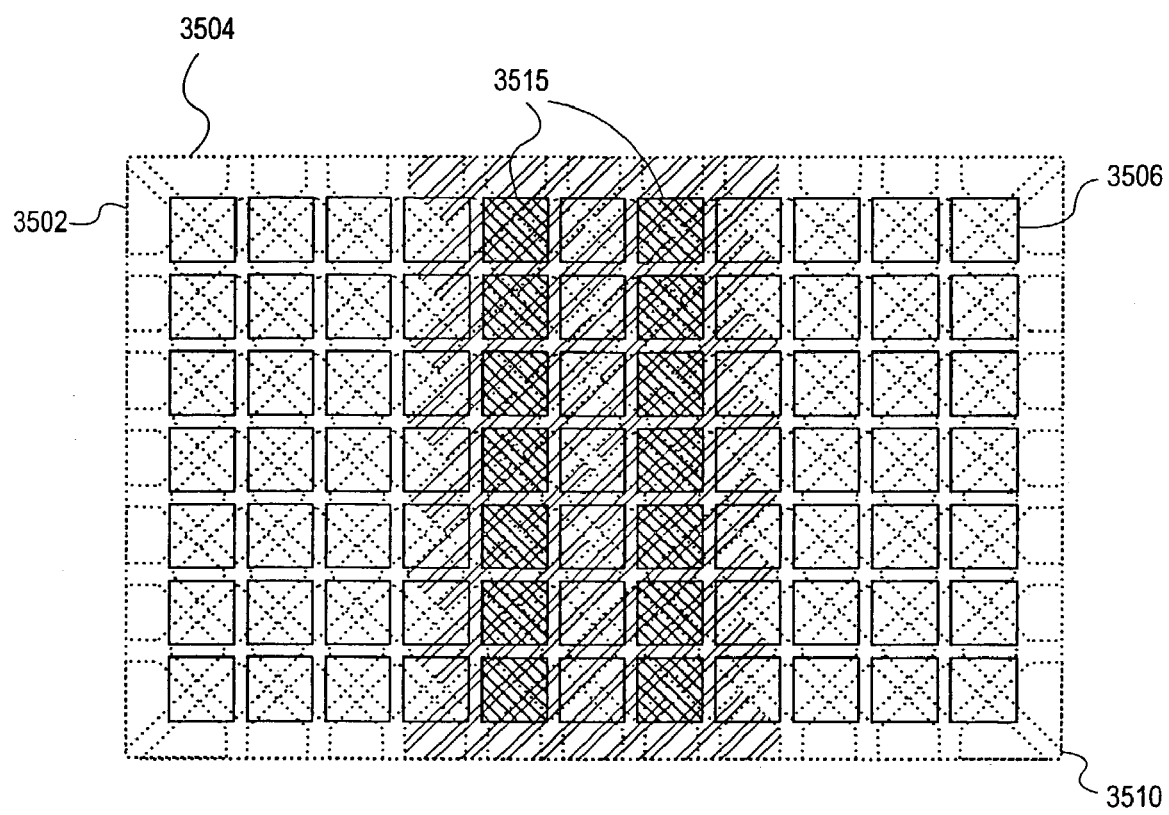
FIGS. 36A and 36B illustrate how this moiré distortion is eliminated by the arrangement of FIG. 35A.
Figure 36B:
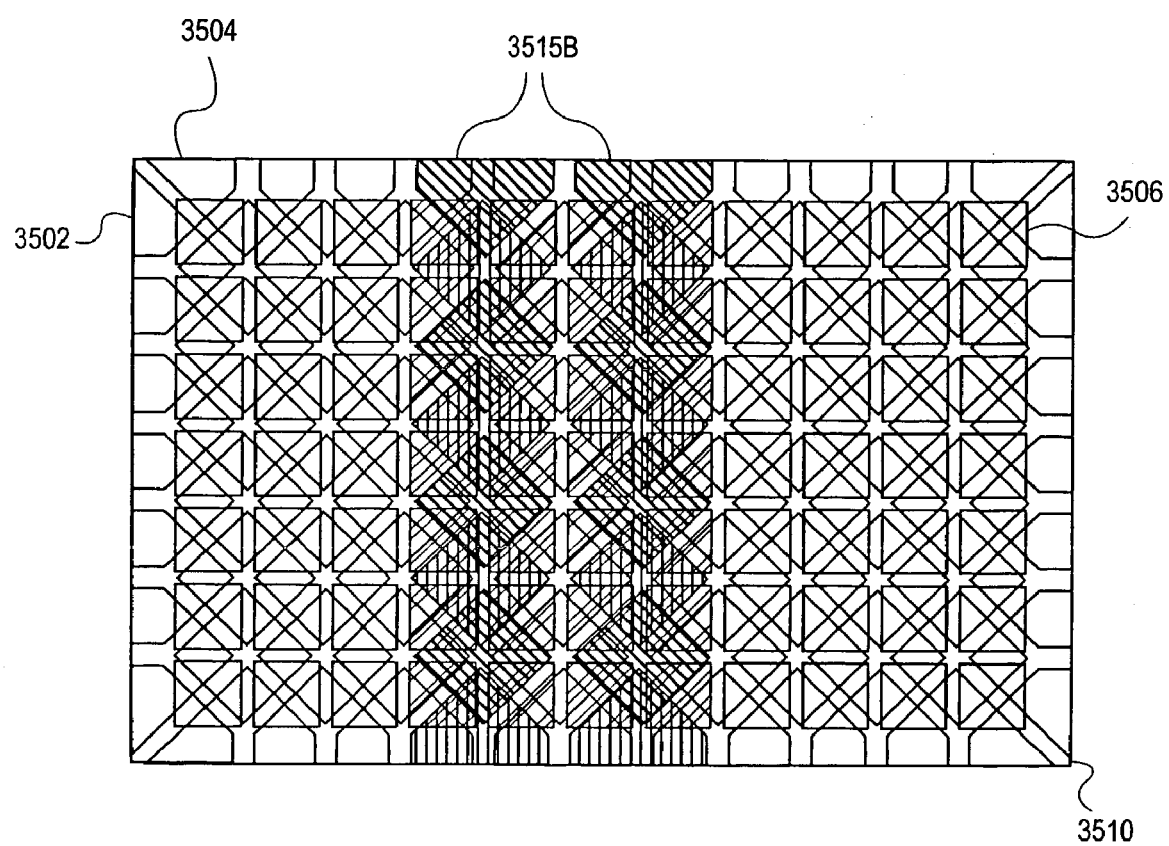

Moiré distortion occurs when the desired signal is 90° out of phase with the reconstruction points of the display. For example, if one is attempting to display a single pixel wide line halfway between two pixels, the two pixels would be set to 50%. One could still see that the total signal strength and position is present, but the image is not as sharp. If two single wide lines were to be displayed with only a single pixel between them, but offset by half a pixel, then the two grey lines would be smeared together, and it would no longer be distinguishable from a wide grey line. FIGS. 36A and 36B illustrate how this moiré distortion is eliminated by the arrangement of FIG. 35A. When narrow lines 3515 are in phase with the pixels of the green color plane 3506, the lines are out of phase by 90° for both the red 3504 and blue 3502 color planes as shown in FIG. 36A. When the narrow lines 3515b are out of phase with the pixels of the green color plane 3506, the lines are in phase with the red 3504 and blue 3502 color planes as shown in FIG. 36B.

Twinned Projectors

Figure 27:
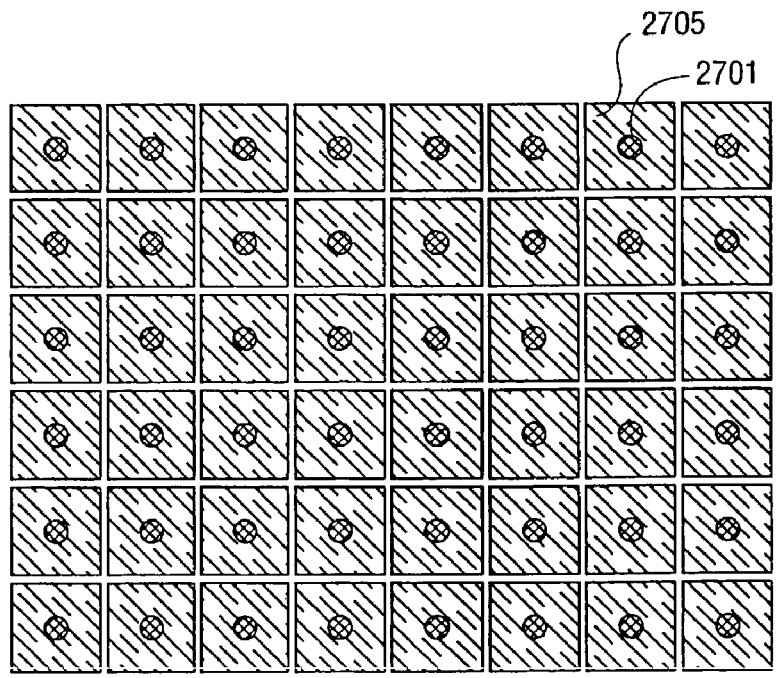
FIG. 27 illustrates the reconstruction points of the prior art display of FIG. 19 overlaid on the appearance of the display.

In the prior art, when brightness is required that is beyond the capability of a single projector to supply, two projectors may be used. The images are conventionally converged 100%, as if the twinned units were in fact one unit. The combined image might be like that shown in FIG. 27, which shows the fully converged pixels 2705 and the associated reconstruction points 2701. The image may have twice the brightness of that from a single projector, but has the same resolution.

Figure 28:
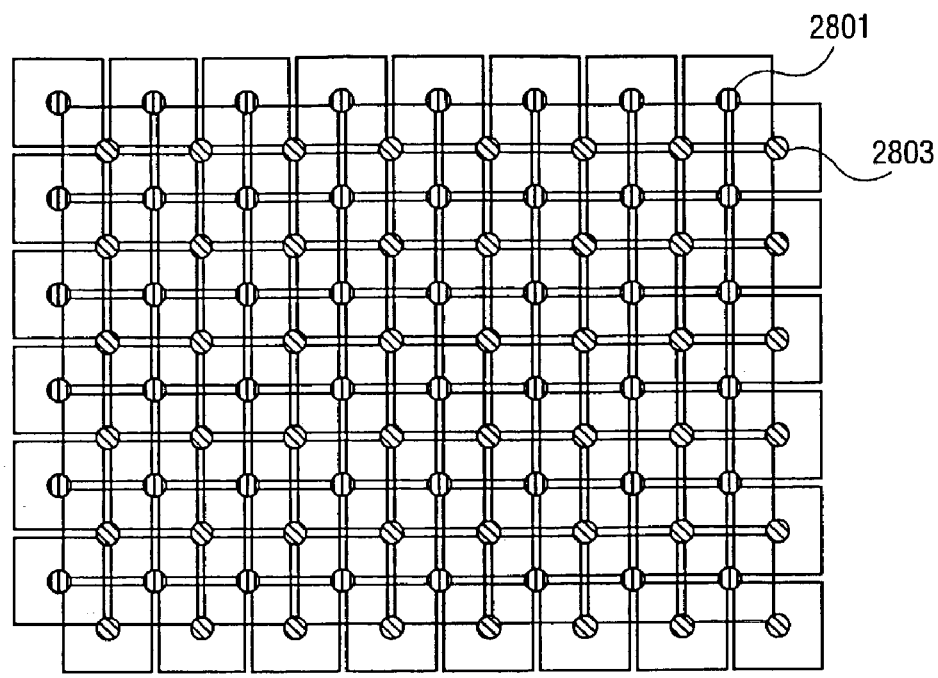
FIG. 28 illustrates the reconstruction points of the novel display shown in FIG. 20.
Figure 29:
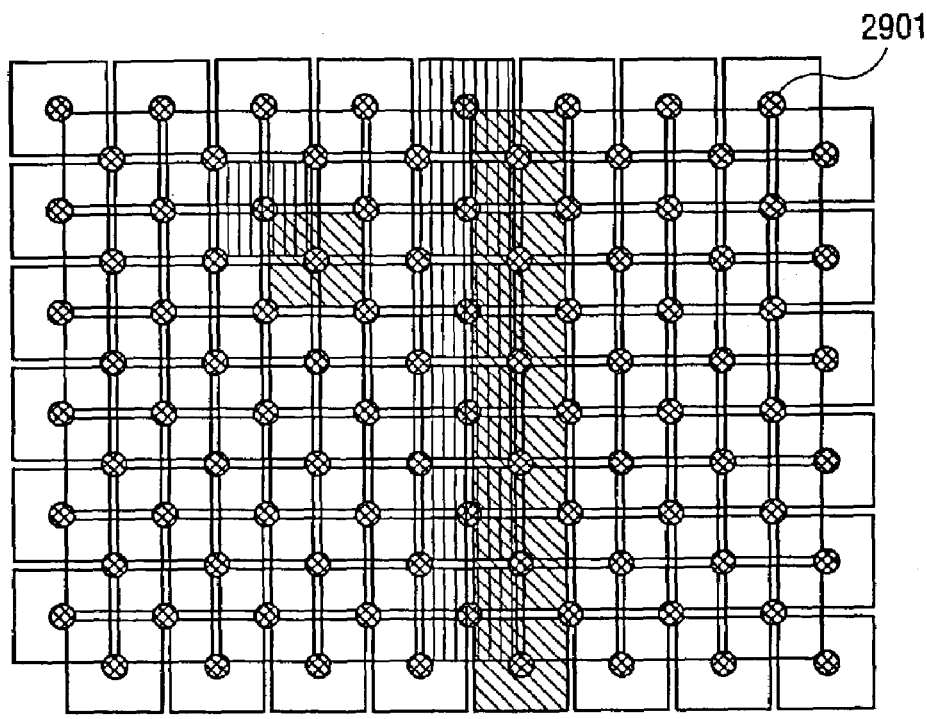
FIG. 29 illustrates the arrangement of emitters and reconstruction points of a novel twinned projector arrangement with coincident color planes.

One improvement of this system may be to displace the full color pixel images from one of the projectors by one-half pixel in the diagonal direction as shown in FIG. 29. This gives similar, and in some aspects superior, performance improvements as that of the displaced color planes of FIGS. 20, 21, 22, and 28. FIG. 28 shows the displaced color arrangement of FIGS. 20, 21, and 22, and the associated color plane reconstruction points 2801 and 2803. Comparing FIGS. 28 and 29 illustrate the differences. FIG. 29 has full color reconstruction points 2901 at each position where FIG. 28 has either a first color (e.g. red) 2801 or second color (e.g. green) 2803 reconstruction point. Thus, for monochrome images, the twinned projector arrangement of FIG. 29 is similar to the single projector arrangement of FIG. 28. However, for highly saturated color images, the increased addressability of the twinned projector arrangement of FIG. 29 allows a single color to have twice as many reconstruction points.

Figure 30:
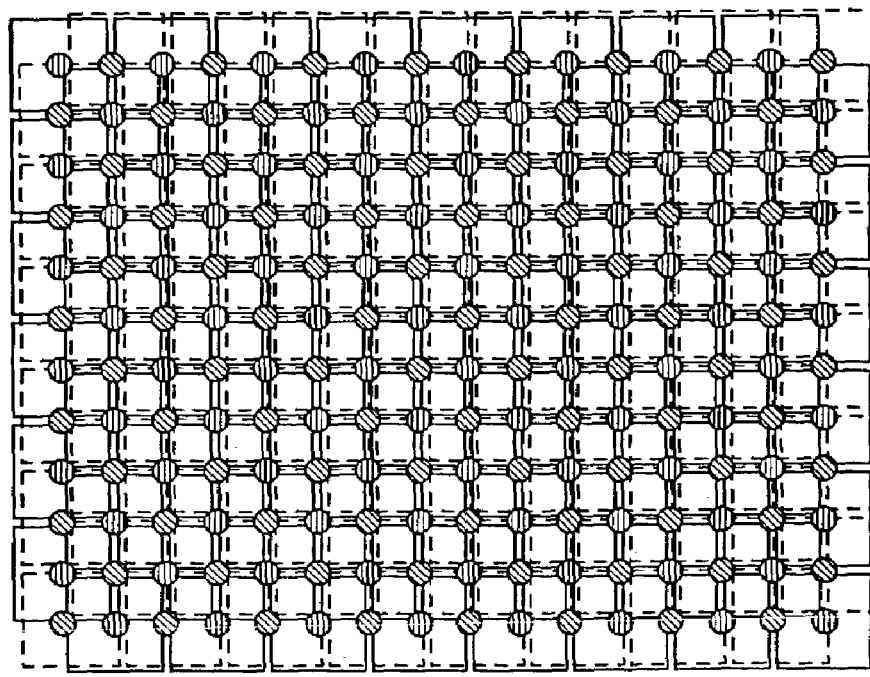
FIG. 30 illustrates the arrangement of emitters and reconstruction points of another novel twinned projector arrangement with displaced color planes.
Figure 32A:
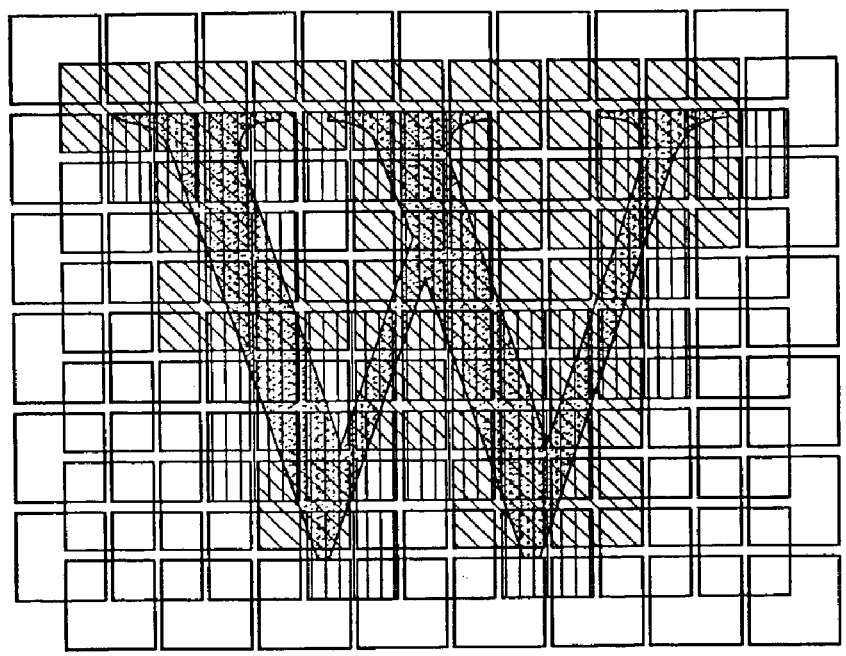
FIGS. 32A and 32B illustrate a novel arrangement of a multi-sensor chip camera in which two of the color plane sample areas are displaced, sampling an image and the resulting data set respectively.

A further improvement for twinned projectors is to displace the color planes of both projectors. One of the projectors has the arrangement shown in FIG. 28, while the other has the mirror arrangement, resulting in the overlapped and fully displaced four image planes of FIG. 30. This arrangement has the same saturated color image quality as that of FIG. 29, but has additional monochrome addressability, resulting in significantly improved overall image quality when suitably subpixel rendered.

Any system that traditionally uses converged, overlapped color and/or white pixels can take advantage of the concepts taught herein. Examples given above included a color CRT display used for computer monitor, video, or television display may also be improved by shifting the color components and applying appropriate subpixel rendering algorithms and filters. A simple and effective change for computer monitors is to shift the green electron spot as described above for FIG. 4B and FIG. 22. This deliberate misconvergence will seem counter-intuitive to those most knowledgeable in the CRT art, but the resulting improvement will be as described above. The displacement of the multi-color display imaging planes by a percentage of a pixel creates a display of higher resolution images by increasing the addressability of the system. Additionally, the MTF is increased to better match the design to human vision. A projector system using three separate panels can be optimized to better match the human vision system with respect to each of the primary colors. These results can be achieved in a single panel, field sequential color projector using an inclined plane chromodispersive lens element.

Film Scanners, Cameras, and Film Printers

The improvements and arrangements described herein may also help image capture and printer devices.

One embodiment may be an improved video or still camera. Some prior art cameras use multi-chip sensors, along with color filters or dichroic beam splitters. These may be considered to be the inverse operations of the projectors described herein, and may benefit from the same or similar arrangements of pixels. For example, FIG. 27 may represent the arrangement of fully converged color planes of a prior art multi-chip color camera. FIG. 28 may represent the offset color plane arrangement of a multi-chip color camera. Such an arrangement may be formed by offsetting one or more of the sensor chips such the image formed upon it is displaced by substantially one-half pixel. This would create a camera that directly and automatically captures and delivers a subpixel rendered data set. If the data set were delivered for display to a projector with the same resolution and arrangement, then the image data set would need no further processing, and yet provide a superior image than a conventional, fully converged, camera, image data set, and projector arrangement. Thus, the entire system, from image capture to display, is a matched, improved, system. Such a system performs as though it was a higher resolution system with perceptually encoded "lossless" compression.

Figure 31A:
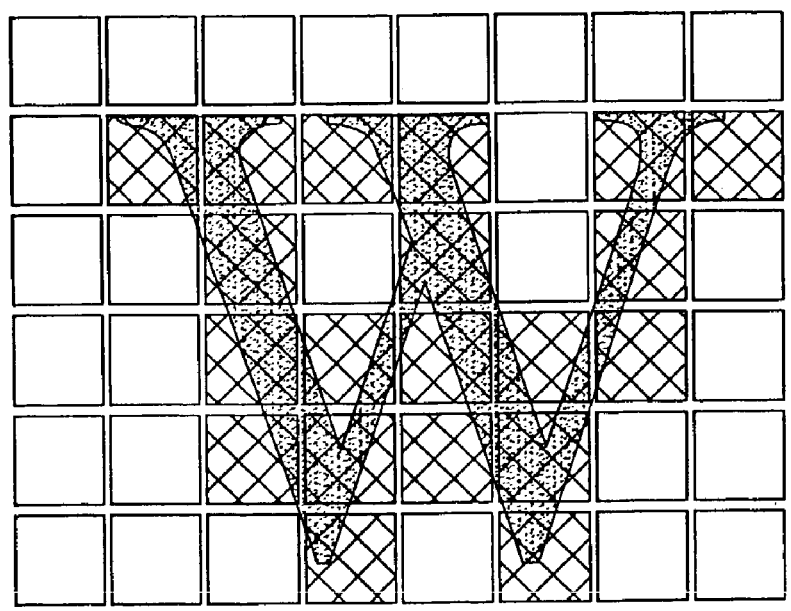
FIGS. 31A and 31B illustrate a prior art arrangement of a multi-sensor chip camera in which all of the color plane sample areas are coincident, sampling an image and the resulting data set respectively.
Figure 32B:
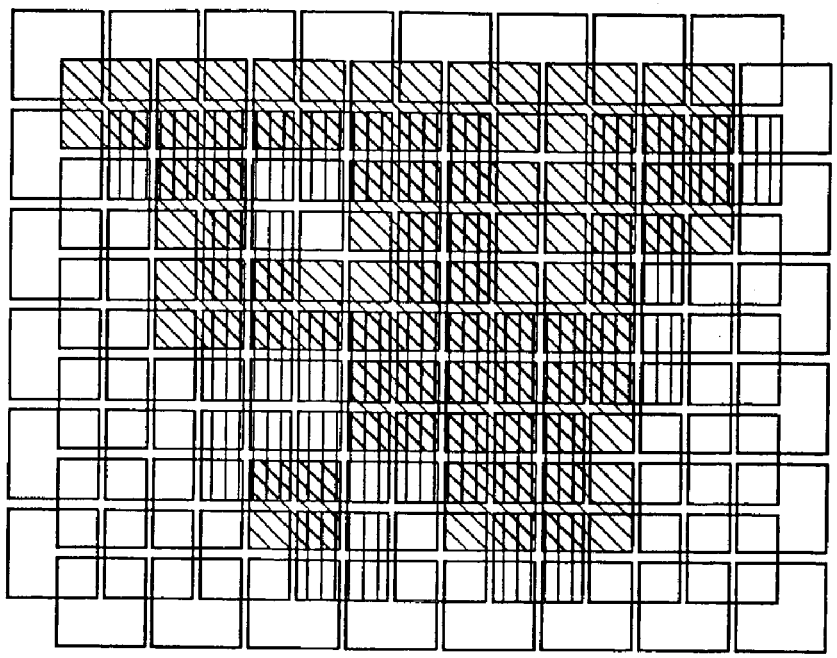
Figure 31B:
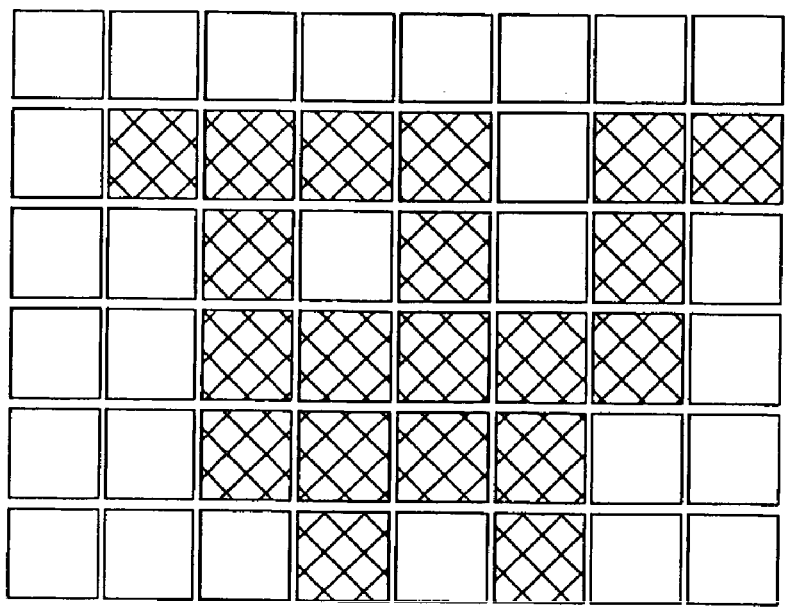
Figure 33A:
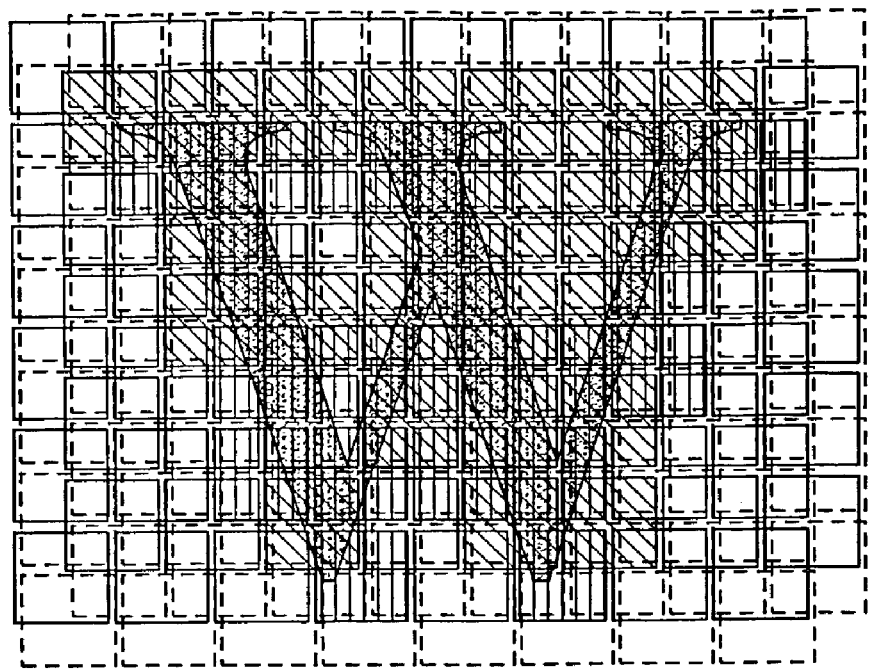
FIGS. 33A and 33B illustrate a novel arrangement of a multi-sensor chip camera in which three of the color plane sample areas are displaced, sampling an image and the resulting data set respectively.
Figure 33B:
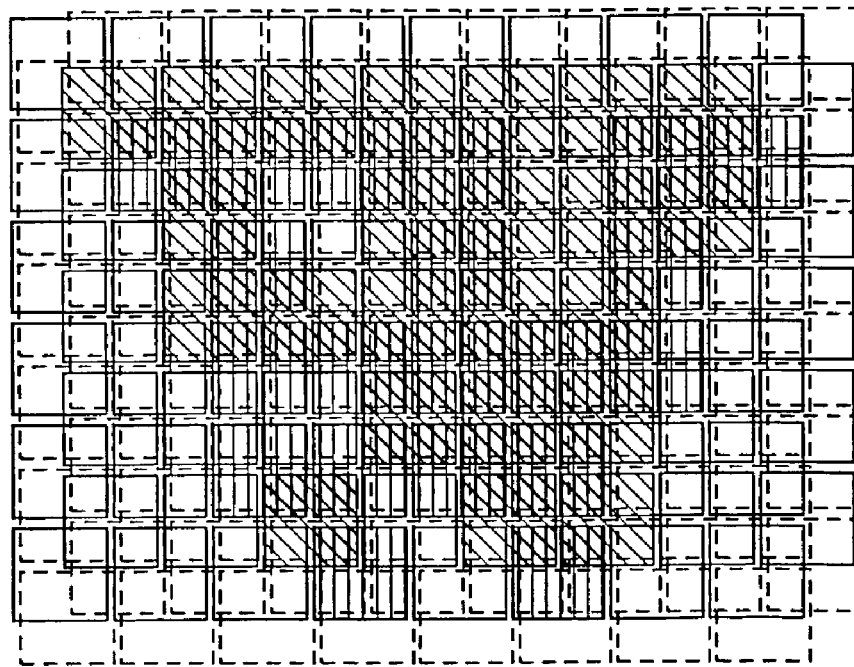

FIG. 31A shows a prior art arrangement of fully converged sensor elements sampling an exemplary image, in this case a "w" character, giving rise to the resulting image data set shown in FIG. 31B. It is to be understood that any natural image will behave in like manner. When the same exemplary image "w" is potentially sampled by a novel sensor arrangement (such as shown in FIG. 28), the resulting image data set is illustrated in FIG. 32B. FIGS. 31B and 32B may also be seen as representing the resulting images of projecting, displaying the resulting data sets on matching projector systems, a prior art projector in the case of FIG. 31B and the novel projector of one embodiment of the present invention in the case of FIG. 32B. Comparing the resulting image quality, the novel system represented by FIG. 32B would be an improvement over that of the prior art. If the system analysis is extended to three offset image capture planes and projector planes, as shown in FIGS. 33A and 33B respectively, the image quality continues to increase.

Similarly, the pixel arrangements of FIGS. 6, 7, and 8 may be used to capture images on a sampling plane that appears as that shown in FIG. 9. Again, when the resulting captured image data set is directly displayed on a matching projector or flat panel display, the image quality will be superior to that of the prior art systems.

With multi-chip image sensors, each having independent electronic shutter control, creating the image data set to be displayed on matching, or at least compatible, display means, another improvement is possible—namely, reduced jutter. Jutter occurs when objects that move across a scene are displayed in a series of still frames at a moderately low rate, such as the twenty-four (24) frames per second for film, or twenty-five (25) to thirty (30) frames per second for most television type video systems, the image appears to be jumping from frame image to frame image and smeared in the direction of motion as the eye smoothly tracts the average position of the moving image, but the image formed on the retina is lagging, then leading the average position for half of the frame period each. With the ability to stagger the shutter timing such that each color plane captures and represents a different point in time during the frame, i.e.

represents subframes or fields, the jutter will be reduced as, on average, more of the reconstructed image energy will be closer to the average position of the ideal smoothly moving image. The display means is similarly timed such that each color field is updated with the same relative timing as the original electronic shutters. This aspect of the present invention, of displaced timing for the color planes may be combined with the spatial displacement of the sample and reconstruction points, or it may be used in conventional fully converged systems to equal advantage.

Figure 33C:
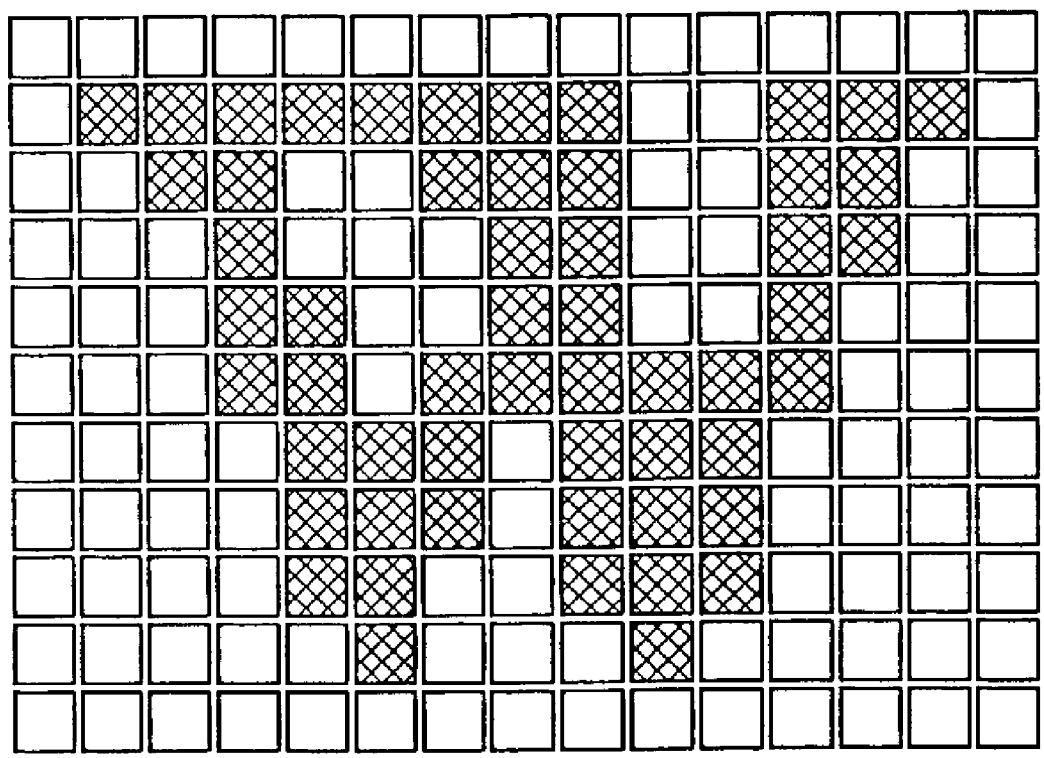
FIG. 33C is the illustrates displaying the processed image of FIG. 33B onto a higher resolution, conventional prior art display.

Note, that though the above examples used identical resolution camera sensor and projectors, such need not be the case and yet still gain improved performance of the total system. Images captured directly in a subpixel rendered format may be scaled up or down, to be shown on either subpixelated or fully converged displays, and potentially retain the performance benefit of the displaced image capture. For example, using the data set of FIG. 33B, the image may be processed, converted, and shown on a higher resolution conventional fully converged projector or other display as shown in FIG. 33C. Note that the image quality is higher than the image that would have been possible using the fully converged camera sensor arrangement of FIG. 31A.

Figure 34A:
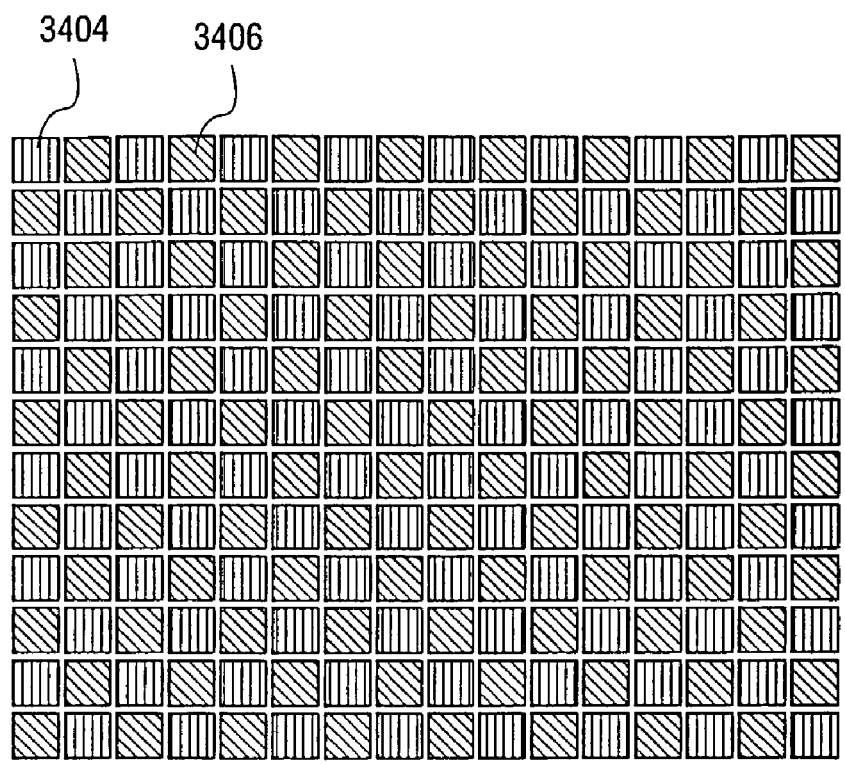
FIGS. 34A and 34B illustrate a novel arrangement of color filter array for a two chip color camera, one with a red/green checkerboard, the other a lower resolution sensor for imaging blue image component, respectively.
Figure 34B:
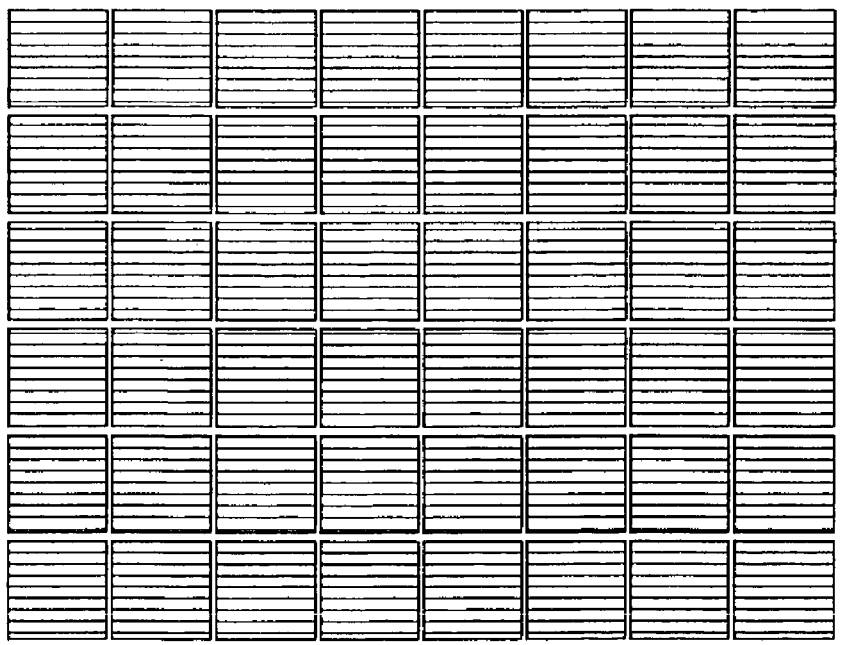

An alternative multi-chip image sensor may have one of more of the sensors include a color filter array. One such example is shown in FIGS. 34A and 34B. FIG. 34A shows an arrangement of square sensors with red 3404 and green 3406 color filters affixed thereupon. FIG. 34B illustrates the lower resolution blue sensor plane. This blue sensor may or may not have a blue filter depending upon on whether the image beam splitter in the camera assembly was a dichroic filter. If a dichroic filter that splits off the red and green colors from the blue is used, then the blue plane may not need an additional filter.

Other sensors with color filter arrays may be used to advantage to create subpixel rendered images that are directly displayed on suitable subpixelated display means. For example, the conventional prior art Bayer pattern, and its improved variants, may be used with minimal processing. Said processing comprising the interpolation of surrounding red samples to fill in the missing red samples where the blue samples interrupt the red sample grid.

Scanners, devices that are used to convert still images, or movie film frames, to a digital or analog video format will also benefit from the teaching herein. Offset scanning, either mechanically or electronically may provide a direct subpixel rendered image data set, similar to those described above, which may be used in like manner to improve total system image quality.

Another embodiment would be to offset, electronically, physically, magnetically, and/or electrostatically the raster scan of a multi-tube video camera. Likewise, if the resulting direct subpixel rendered data set were delivered to a suitably matched display, such as a CRT or subpixelated flat panel display, the image quality would be increased.

Conversely, color image printers, either photographic (film printer: CRT or laser scanning, spatial light modulator, etc.), xerographic (laser printer), or mechanical (ink jet, dye sublimation, dye transfer, etc.) may also benefit from the teaching herein, in which subpixel rendering of conventional high resolution image data sets or direct printing of previously subpixel rendered image data sets is used on a printer system with matching displaced color image planes.

One complete system that uses the teaching contained herein may comprise original image capture using conventional color film photography and color film print presentation, with subpixel rendered film digitization, editing and manipulation, followed by subpixel rendered film printing. Such a system potentially would use modified equipment and processes presently used in film production, have the same size image data files, etc., but due to the benefits of subpixel rendering techniques taught herein, exhibit significantly better image quality in the final product. The process may have the additional benefit that the digitized image is in a subpixel rendered format that may be used in matching electronic cinema projectors with minimal or no further processing, again exhibiting improved image quality.

Additional Color Planes

Figure 24A:
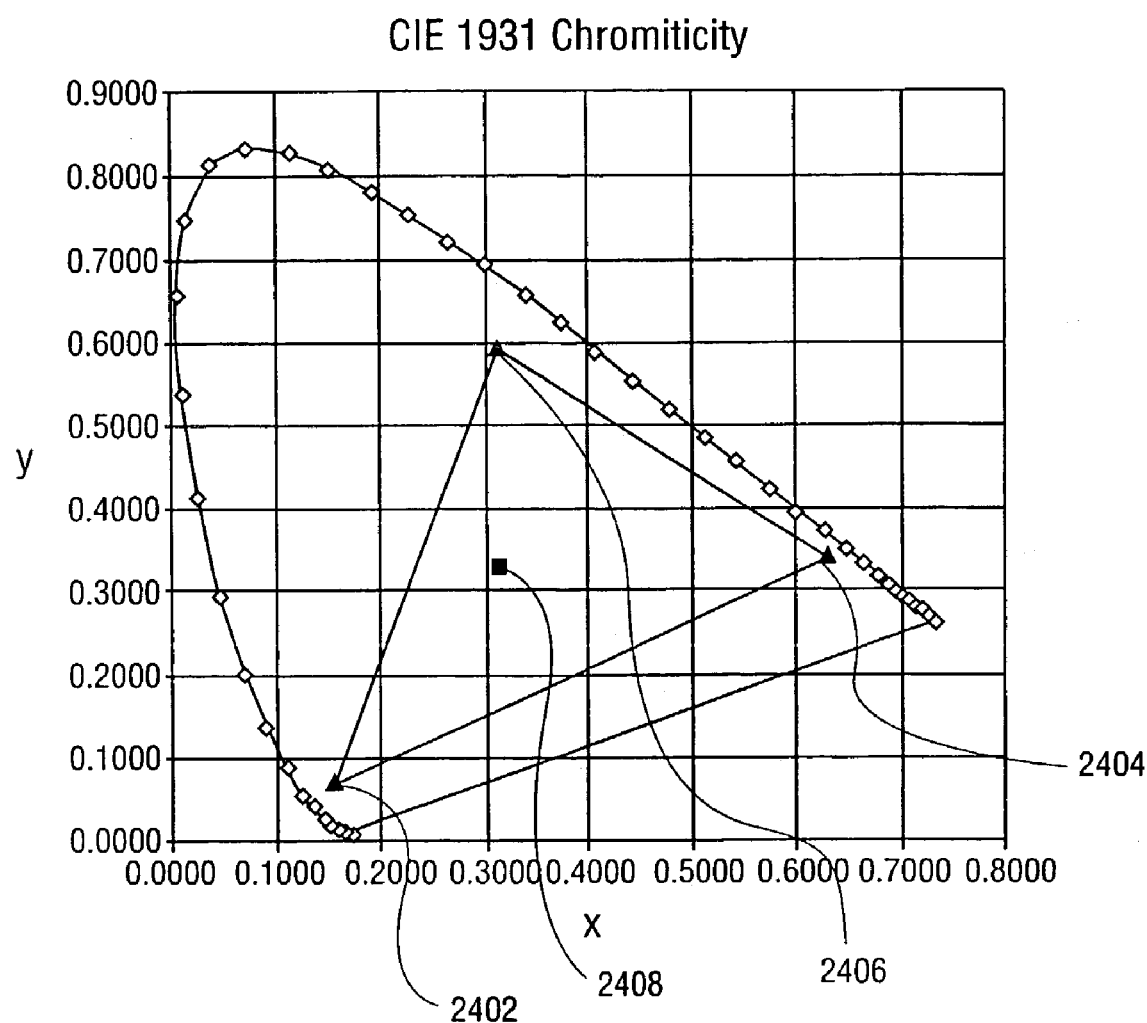
FIG. 24A is a chart showing the chromaticity coordinates of the emitters of a prior art three color display.

Most conventional projector displays utilize three emitter colors, providing a color gamut that includes the inside of a triangle when charted on the 1931 CIE Color Chart, an example of which is shown in FIG. 24A. These colors are typically substantially red 2404, green 2406, and blue 2402. The luminances of these color emitters are typically unequal. For several reasons, some projectors displays are constructed with a fourth color emitter. Prior art four color displays usually use white as the fourth color. This is typically done to increase the brightness of the display, as the colors are usually created using dichroic filters. The white is created by removing a color filter; the light of the lamp which, being white 2408 already, is allowed to pass to the spatial light modulator unobstructed or modified. The four colors collectively are grouped into a pixel that may show any color within the triangle defined by the saturated colors, with the added ability to show lower saturation colors at a higher brightness by the addition of the appropriate amount of white.

For displays that are to be driven using subpixel rendering, the choice of a non-filtered white color plane or field creates a serious problem. Subpixel rendering depends on the ability to shift the apparent center of luminance by varying the brightness of the subpixels. This works best when each of the colors has the same perceptual brightness. Blue subpixels are perceived as substantially darker than the red and green, thus do not significantly contribute to the perception of increased resolution with subpixel rendering, leaving the task to the red and green subpixels. With the addition of an unfiltered white, the white color plane or field, being significantly brighter than both the red and green subpixels, the red and green lose much of their effectiveness in subpixel rendering.

In an ideal display, the luminance of each of the subpixels would be equal, such that for low saturation image rendering, each subpixel has the same luminance weight. However, the human eye does not see each wavelength of light as equally bright. The ends of the spectrum are seen as darker than the middle. That is to say that a given energy intensity of a green wavelength is perceived to be brighter than that same energy intensity of either red or blue. Further, due to the fact that the short wavelength sensitive cones, the "S-cones", those giving rise to the sensation of 'blue', do not feed the Human Vision System's luminance channel, blue colors appear even darker.

In most prior art projector systems, the splitting of the white spectrum is usually done so that the red 2404 and the blue 2402 color points have the greatest color saturation as possible, while the green 2406 point is formed from the middle of the spectrum, having both more energy and brightness than the red 2404 and blue 2402 combined.

Figure 24B:
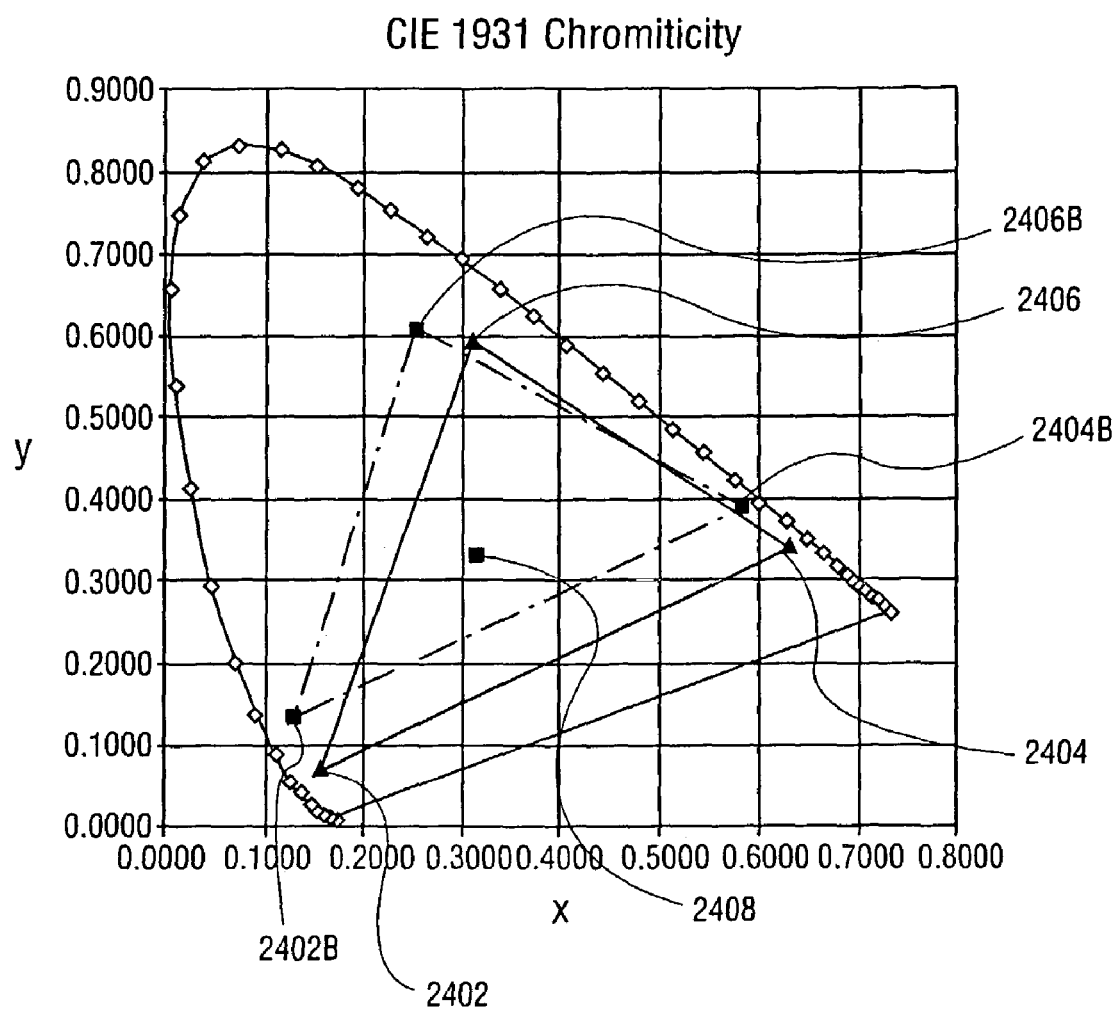
FIG. 24B is a chart showing the chromaticity coordinates of the emitters of an improved three color display, compared to the chromaticity coordinates of FIG. 24A.

One embodiment for a three color system shown in FIG. 24B entails using wider bands for red 2404 and blue 2402, pushing them up the chart towards the apex slightly to create new red 2404*b* and blue 2402*b* color points, while the green 2406*b*, being narrower, also is pushed toward the apex. This increases the energy of the red 2404*b* and blue 2402*b*, while reducing the energy of the green 2406*b*. The white point 2408 remains in the same place. This remapping of the spectrum to the color triangle improves the subpixel rendering performance, but shifts the color gamut. For many applications, this improvement may be quite satisfactory and economical.

Figure 25:
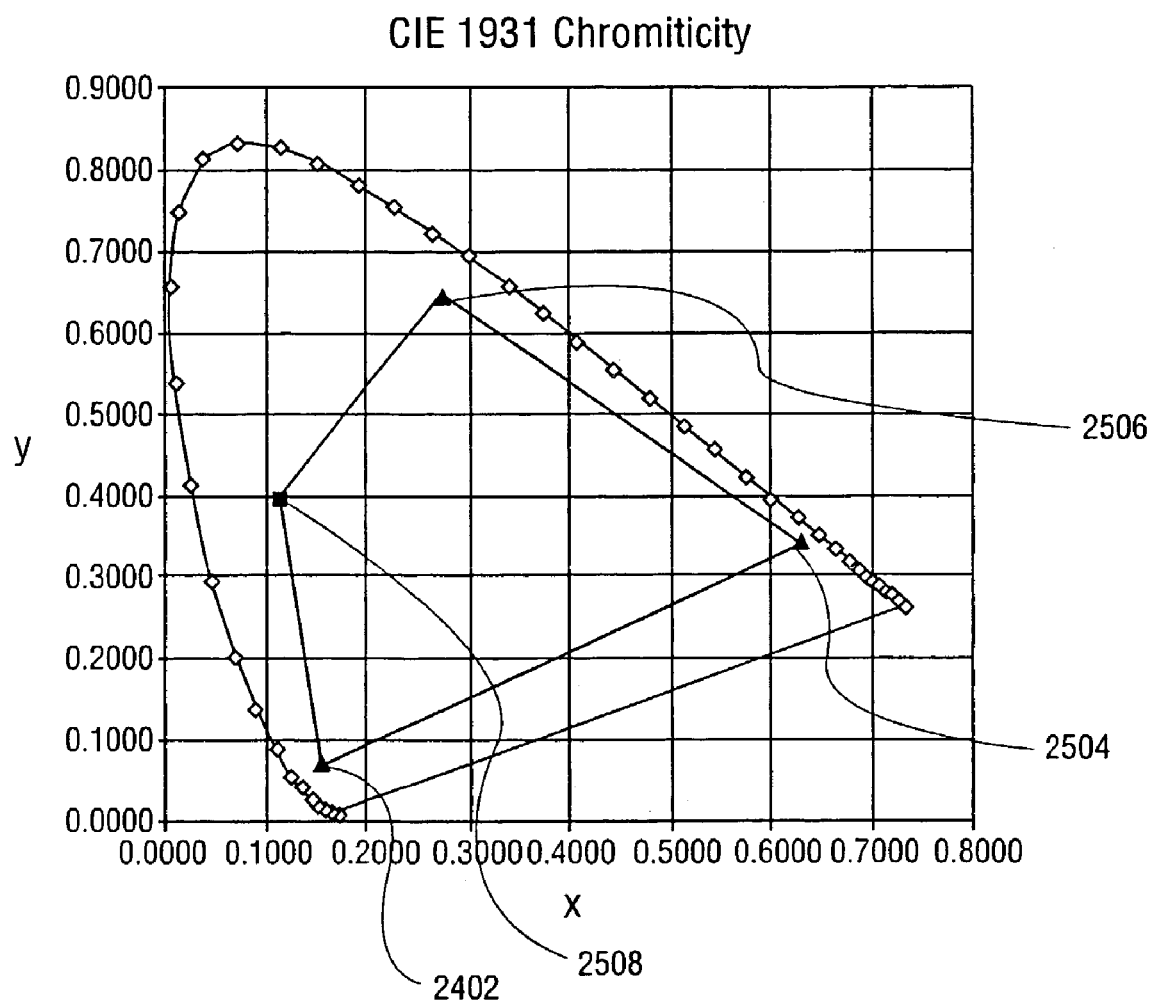
FIG. 25 is a chart showing the chromaticity coordinates of the emitters of a novel four color display.

One embodiment that reduces the above problem adds a fourth color that substantially takes its energy from the shorter wavelength green part of the spectrum. In a system of dichroic beam splitters or regenerating color wheel assembly, this will reduce the energy being used on the "green" color plane, splitting it between a yellowish green 2506 and a cyan 2508 color as shown in FIG. 25. The total brightness and light efficiency remains the same, but the red 2504, yellowish-green 2506, and cyan 2508 beams have the substantially the same brightness. A further advantage is that the color gamut thus formed from the four color system is wider than the prior art three color system. Yet a further advantage of this invention is that the additional color beam may be independently modulated as a displaced subpixelated image, thus increasing the image quality of the resulting subpixel rendered image, with three color planes with near equal perceived brightness.

With three planes of near equal perceived brightness, the arrangement of subpixelated color planes of FIG. 23 may be used to full benefit. FIG. 23 illustrates three images of the array of pixels shown in FIG. 8 overlaid with a shift of one third of a pixel each. A logical pixel 128 is illustrated on the resulting image 126 in FIG. 23. The red pixel 130, green pixel 132, and "blue" (now possibly cyan) pixel 134 overlap to form a smaller triangular area 136 that is at the center of the logical pixel. This overlap area is brightest, followed by the three areas where there are only two pixels overlapping, while the areas with no overlap have the lowest brightness.

Figure 26:
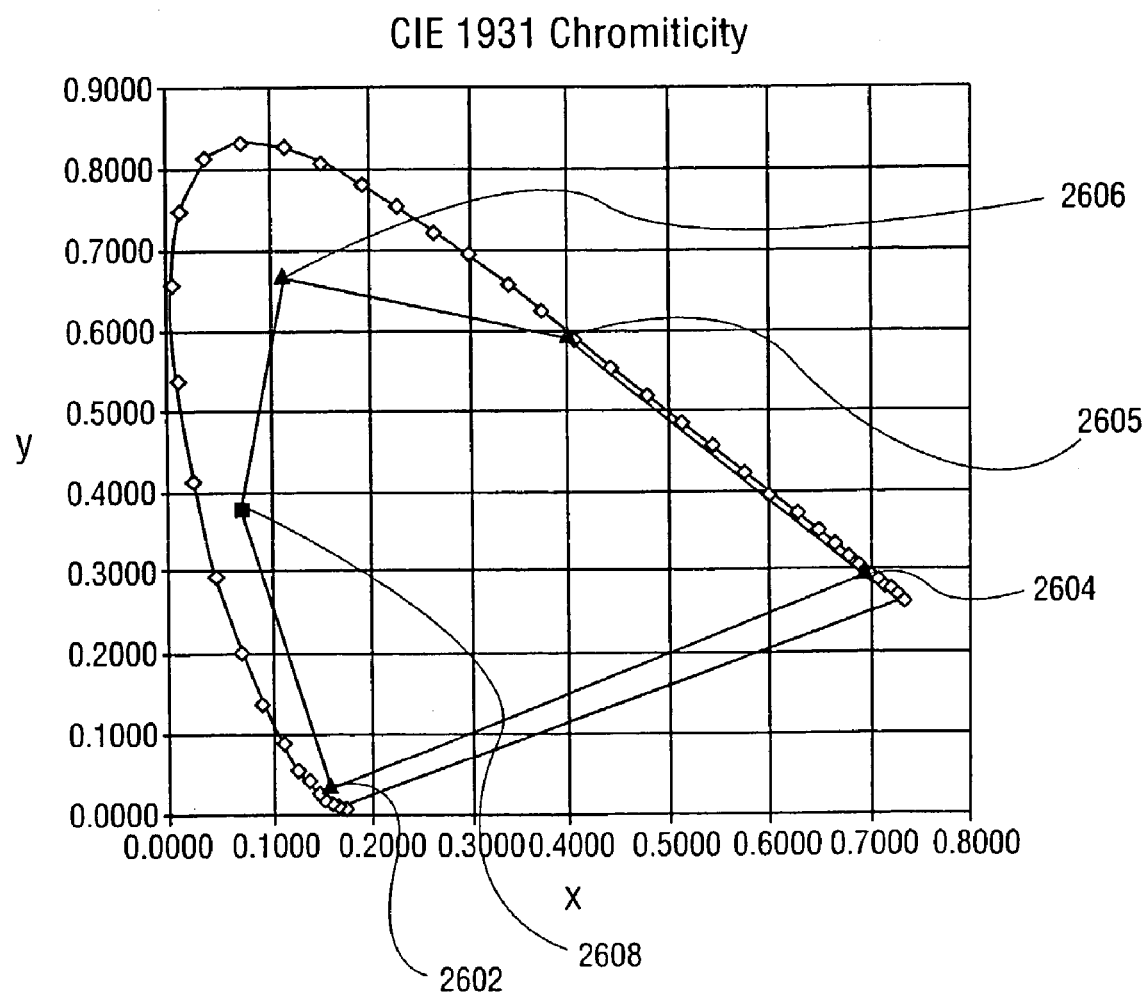
FIG. 26 is a chart showing the chromaticity coordinates of the emitters of a novel five color display.

This process of increasing the number of color points and displaced color plane images can be performed again to yield a five color system as shown in FIG. 26. Here, the red 2604 and blue 2602 may be further pushed into their respective 'corners' by restricting their bandpasses at the edges of the visible spectrum, increasing the color gamut. The mid-spectrum is divided into three equally, perceptually, bright color points; greenish-yellow 2605, deep-green 2606, and deep-cyan 2608. This, along with the red 2604, gives four planes of effective subpixel rendered image. For good measure, the blue plane may be made coincident, fully converged, with the red to add to its brightness, giving a magenta color plane. These four colors may be used with arrangement of pixels of FIG. 30 to advantage.

In yet another embodiment, there is a possibility for integrating a "front-to-back" system (i.e. from image capture and/or generation to image render) using five colors. Each of the colors is subpixel rendered, from the camera to the projector. The color points are chosen carefully to both cover a wide gamut and be approximately the same luminance. Each color comes from narrow spectral band defined by dichroic filter-beam splitters. When the projector recombines the light, save for random loss, all of the light from the lamp is used to recreate the same white light.

Several color arrangements are possible. For example, here are two that use the colors R=red; Y=yellow; C=cyan; G=green and B=blue—in either a diamond or square matrix layout:

| C Y C Y | RYRY |
|---------|------|
| G R G   | CGCG |
| Y C Y C | RYRY |
| R G R   | CGCG |

Of course, other matrices are possible—with other colors also selected. It should also be possible to use the blue plane at a lower resolution.

As well as separating the sample points of each color in space, by subpixel rendering, the color plane samples are displaced in time as well. Not only will this reduce temporal aliasing of moving objects, but it will significantly reduce jutter. The four longer wavelength colors are shuttered on a rotating basis, 90 degrees from the preceding and following color plane. That means there is also a color shuttered at 180 degrees from each color. The blue plane may be shuttered at any point since it will not greatly add to brightness. But if one of the other colors is the dimmest, the blue may be shuttered with it to keep its transition roughly the same amplitude as the others to eliminate flicker. With four major colors to work with, the addressability is increased by a factor of four and the MTF is doubled in each axis.

This process of breaking up the spectrum and increasing the number of subpixel rendering planes may be performed up to any arbitrary number, N.

Flicker Reduction in Field Sequential Color Systems

The perception of flicker in Field Sequential Color (FSC) systems is primarily caused by the unequal luminances of the color components that are time sequentially flashed onto the screen or to the viewer's eyes. The largest luminance difference in prior art three color systems is between the green color and the blue color, the blue color having comparatively little or no perceived luminance. Prior art methods of reducing the perception of flicker have included increasing the temporal frequency at which the three or more colors fields are presented. However, for some spatial light modulators, this is impractical either due to the bandwidth limits being less than that required to transfer the image of each field or to the time required for the spatial light modulator to present a high contrast image of the field (e.g. Liquid Crystal response time) being too long for the desired field rate.

A novel method of reducing the perception of flicker comprises the reduction of the total time that the dark, low luminance, color, such as blue, is presented to the viewer. Another novel method is to increase only the dark, low luminance, color frequency. Additionally, the two methods listed above may be combined to advantage.

For direct view applications, Light Emitting Diodes (LEDs) may be used as the illuminants. In this case, the practice is to use very brief flashes of monochromatic light for each color field. Thus, the set-up time for the spatial light modulator is often the limiting factor for the field and frame rates. As described above one method to reduce flicker perception is to increase the blue flash rate. In this case, instead of the prior art order of color flashes, which is typically something like: . . . red, green, blue, red, green, blue, red, green, blue . . . , the following order of color flashes may be substituted: . . . red, blue, green, blue, red, blue, green, blue . . . , etc. Note this will slow the frame rate if the field rate is kept constant. This will however, increase the frequency of the blue flashes, countered by the higher luminance flashes, namely red and green in the above example, reducing the perception of flicker. If the time for setting up the blue field image on the spatial light modulator may be reduced by a suitable method, the time between the red or green fields and the blue field flash may be reduced to maintain the same frame rate as the prior art field order. In each of the above, the total illumination intensity of each color component, averaged over the frame, is adjusted to maintain the desired white point; Specifically, the intensity of the doubled blue flashes may be reduced in half, or one may be one fourth (¼) and the other flash may be three fourths (¾) of the single flash intensity.

Figure 37:
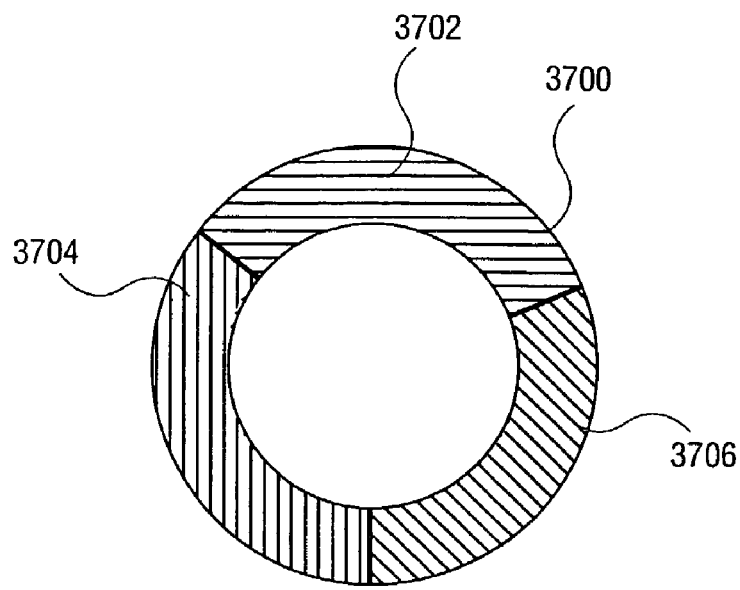
FIG. 37 illustrates a prior art color wheel filter of three colors.

For projectors that use color filter wheels, the color wheel may be modified to provide the same or similar novel arrangement of color flashes as above. In FIG. 37, a prior art color wheel arrangement 3700 is illustrated. In this color wheel 3700 there are three color filter regions blue 3702, red 3704, and green 3706. The color wheel spins at the same rate as the frame rate of the display system, illuminating the spatial light modulator: . . . red, green, blue, red, green, blue, red, green, blue . . . , etc. FIGS. 38A, 38B, 38C, and 38D illustrate novel color wheels, with various combinations of reduced low luminance color component (e.g. blue) time or doubled low luminance color component frequency, or combinations of the two.

Figure 38A:
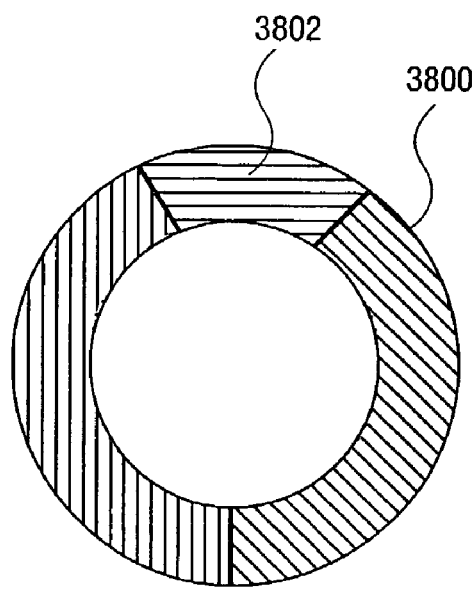
FIGS. 38A, 38B, 38C, and 38D illustrate novel color wheel filters of three colors.

FIG. 38A illustrates a novel color filter wheel 3800 that reduces the size of the low luminance color (e.g. blue) filter region 3802. Reducing the time that the blue illumination is the only light being viewed reduces the strength of the Fourier signal energy from the luminance variation. Reduced Fourier signal energy reduces the visibility of the perceived flicker.

Figure 38B:
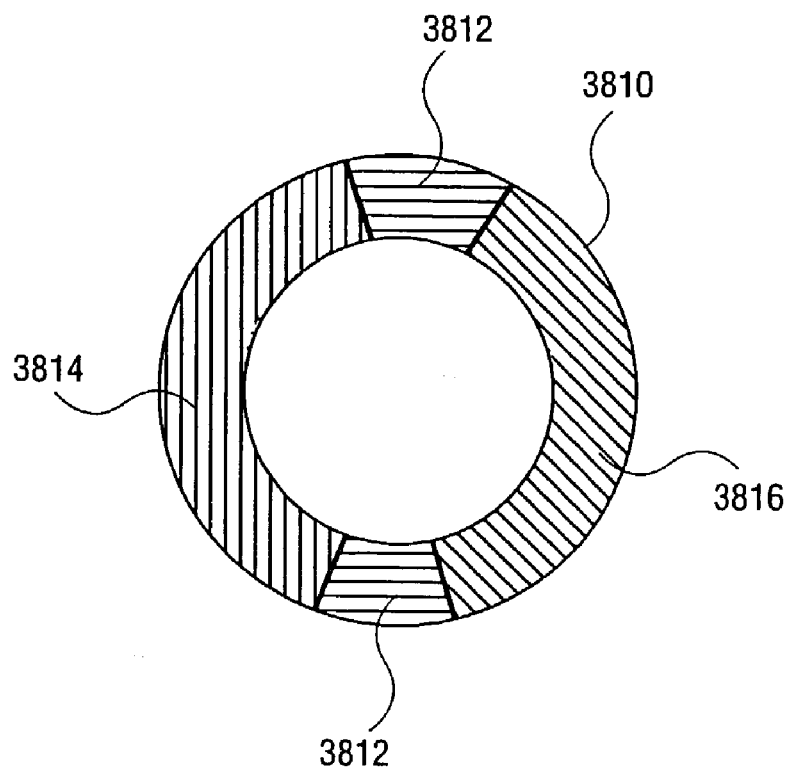
Figure 38C:
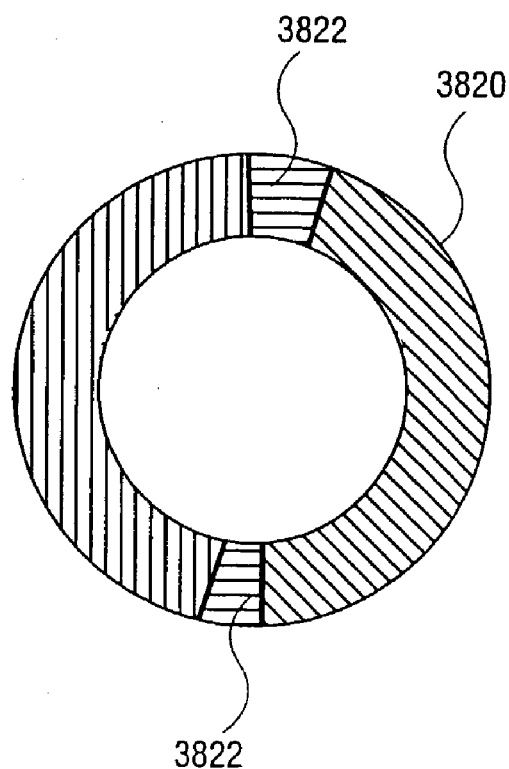
Figure 38D:
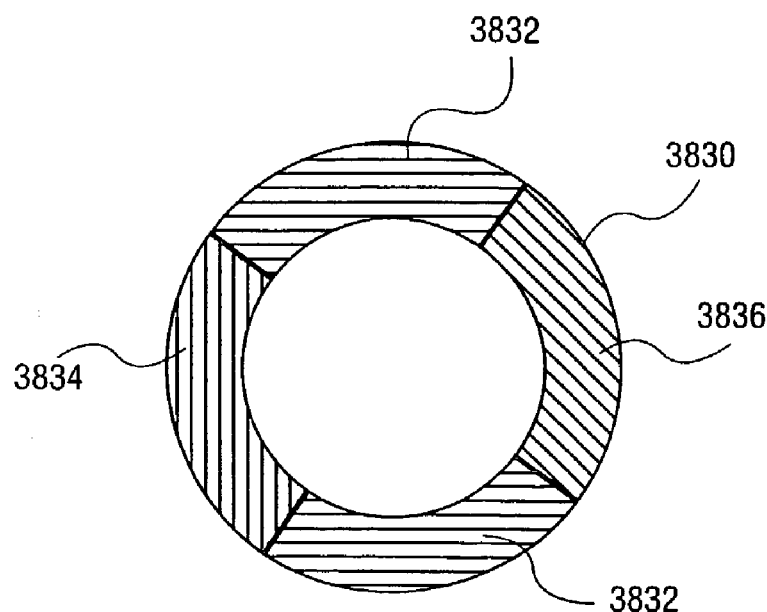

FIG. 38D illustrates a novel color filter wheel 3830 that has four color regions, two of which are low luminance (e.g. blue) color 3832, while the two are higher luminance colors. These may be red 3834 and green 3836. Thus, this may provide the following color field sequence: . . . red, blue, green, blue, red, blue, green, blue . . . , etc. Note this will slow the frame rate if the field rate is kept constant. This will however, increase the frequency of the blue flashes, countered by the higher luminance flashes, namely red and green in the above example, reducing the perception of flicker.

If the time for setting up the blue field image on the spatial light modulator may be reduced by a suitable method, the field time may be reduced to maintain the same frame rate as the prior art field order. FIGS. 38B and 38C illustrate examples where both the blue time period is reduced and the frequency increased. The color filter wheel 3810 of FIG. 38B has the property that the combined angular area and/or angular distance of the two blue regions 3812 is the same of that of either of the other two colors, red 3814 or green 3816. This gives the advantage that the illumination balance is identical to the prior art color filter wheel 3700 of FIG. 37. FIG. 38C illustrates a color filter wheel 3820 that has both doubled and reduced angular area and/or angular distance blue filter regions 3822. This doubles the blue dark frequency and reduces the total time at that lower luminance, reducing the perception of flicker.

Figure 39A:
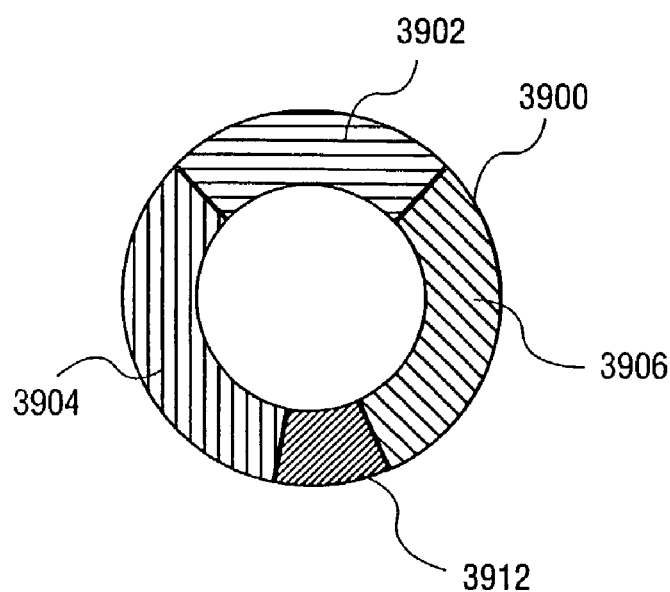
FIGS. 39A and 39B illustrates novel color wheel filters of three colors and black.
Figure 39B:
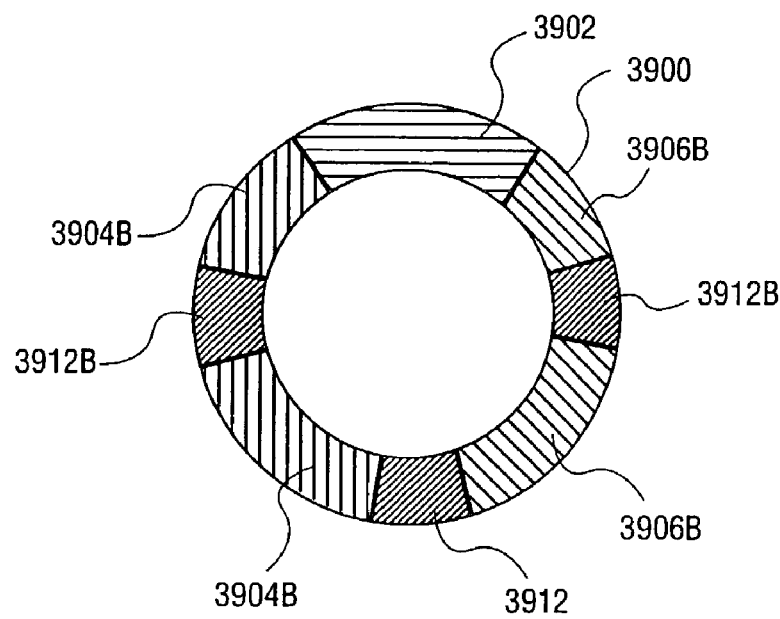

FIG. 39A illustrates a novel color filter wheel 3900 that places a very low luminance and low radiance (e.g. black) filter region 3912 opposite the low luminance color (e.g. blue) filter region 3902. The opposition of black and blue doubles the temporal frequency of low luminance, reducing the perception of flicker. FIG. 39B illustrates the same color filter wheel 3900 with the addition of two additional very low luminance color (e.g. black) filter regions 3912b and 3912b that break up the red filter region 3904 and green filter region 3906 of FIG. 39A into two red filter regions 3904b and 3904b and two green filter regions 3906b and 3906b. The spatial light modulator may remain displaying the same red or green color field information during the black time intervals created by the superimposed black filter region 3912b or 3912b. The presence of the two additional black filter regions 3912b and 3912b further increases the temporal frequency of the low luminance signal, reducing the perception of flicker.

Figure 40:
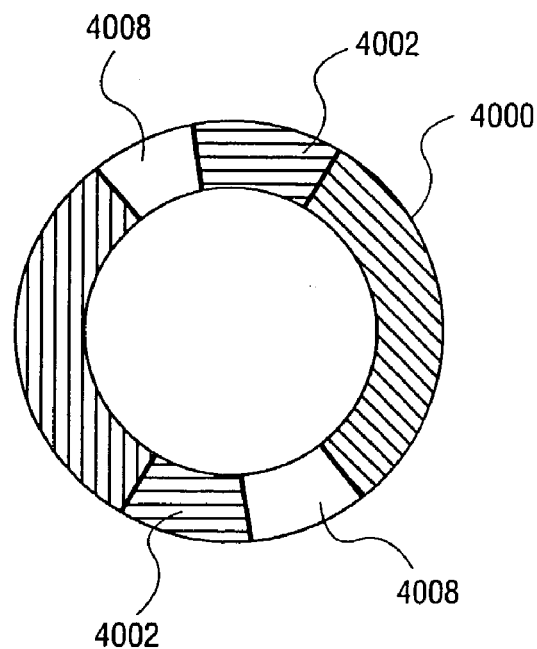
FIG. 40 illustrates a novel color wheel filter of four colors, one of which is white.

FIG. 40 illustrates a novel color filter wheel 4000 of four colors. The fourth color may be comprised of high transmissive, and therefore, high luminance (e.g. white or clear) regions 4008. These clear regions 4008 may be placed in opposition, such that their higher luminance temporal frequency is doubled, reducing perception of flicker. The low luminance color (e.g. blue) regions 4002 may be placed in opposition, such that their lower luminance temporal frequency is doubled, reducing the perception of flicker. Further, the high luminance and low luminance regions may be placed next to each other such that one leads or follows the other. This juxtaposition creates higher temporal frequency Fourier signal components than if they were not so juxtaposed, reducing the perception of flicker.

In addition to using the timing of Light Emitting Diodes and the transmission sequence of color filter wheels, other color timing methods may be similarly modified. For example, the use of Liquid Crystal based PI cell color modulators, colored fluorescent backlights, or electrically controlled, color selecting, holograms may be modified such that the timing follows the above examples.

Bandwidth Reduction

Bandwidth reduction, to allow faster transfer of data to the spatial light modulator, or to allow greater image compression for transmission or storage, may be facilitated by another embodiment. This bandwidth reduction may enable the reduced time to form the image on the spatial light modulator, which in turn may enable reduced time and/or divided low luminance color field display as disclosed above. This bandwidth reduction may be implemented with spatio-temporally displaced filtering and reconstruction to maintain addressability and Modulation Transfer Function, maintaining image quality.

Figure 41:
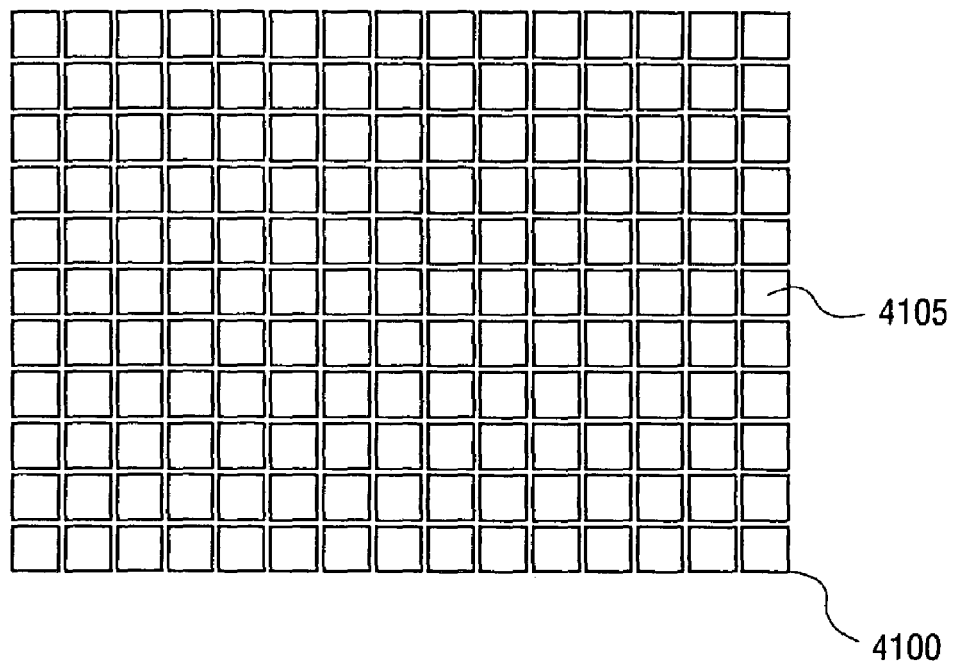
FIGS. 41, 42A, 42B, 42C, and 42D illustrate a spatial light modulator and a method of reducing data bandwidth, image size, while maintaining image quality using spatio-temporally displaced filtering and reconstruction.
Figure 42A:
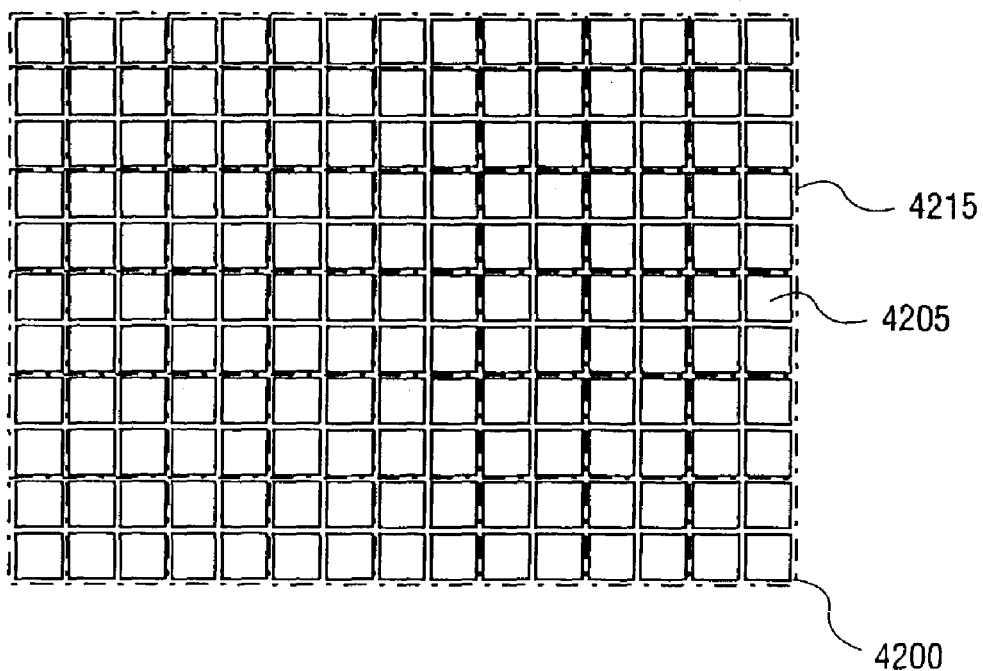
Figure 42B:
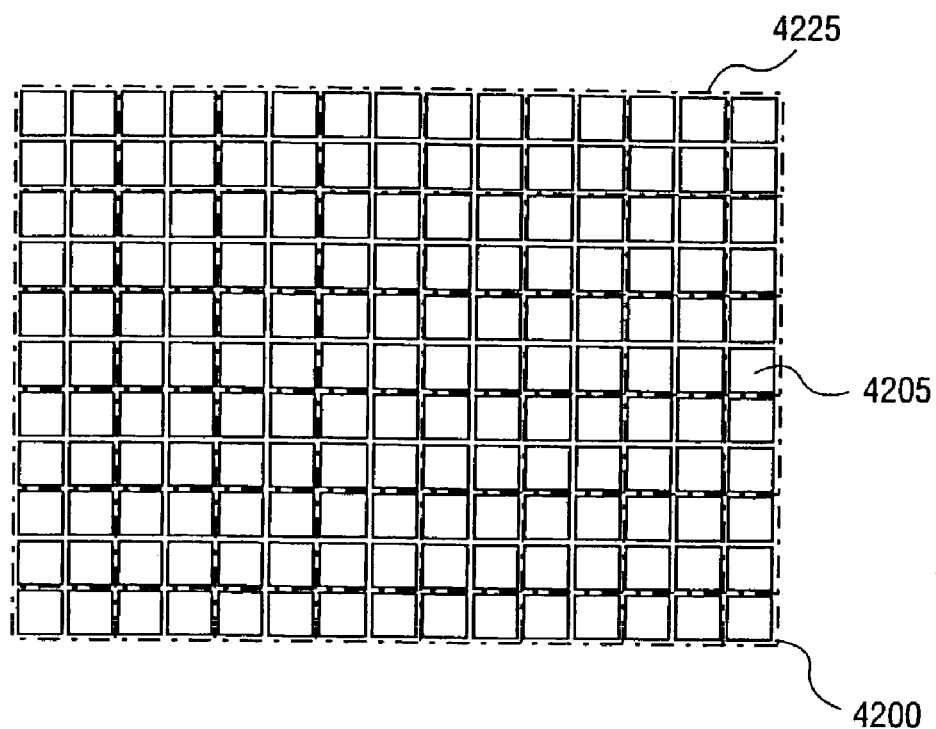
Figure 42C:
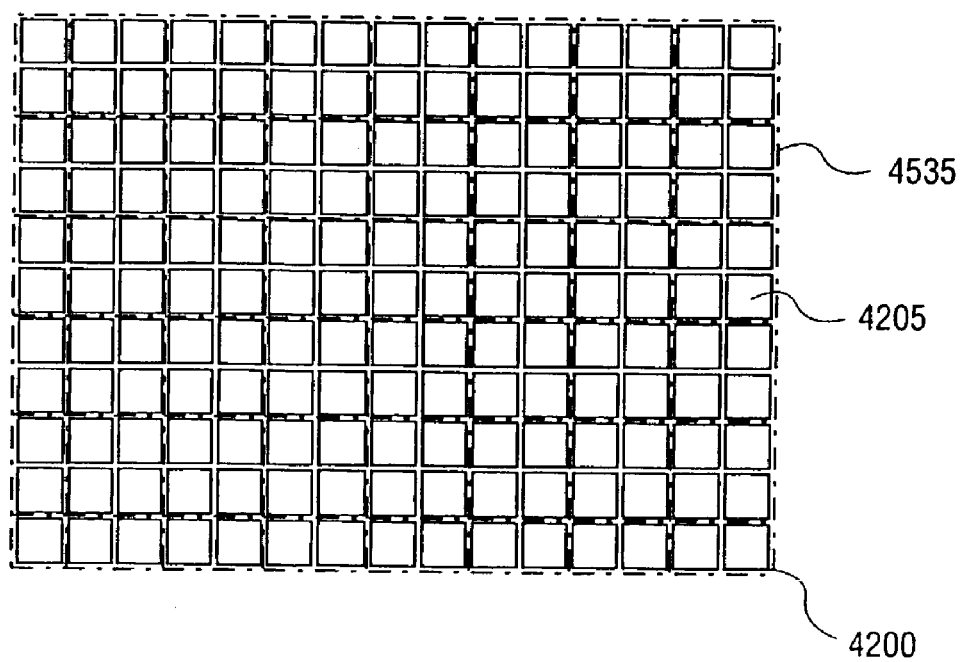
Figure 42D:
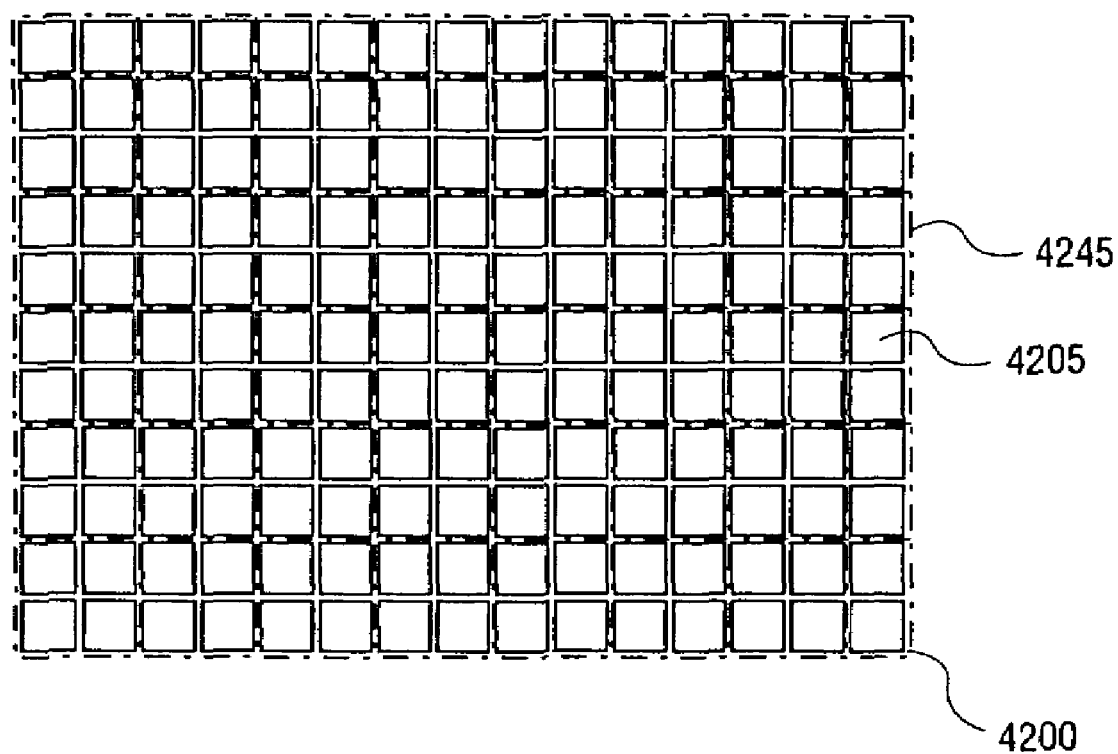

FIGS. 41, 42A, 42B, 42C, and 42D illustrate a data set that is spatio-temporally displaced filtered and reconstructed. FIG. 41 illustrates the original data set 4100. It may also represent a matching prior art spatial light modulator 4100 which is to be used to reconstruct the spatio-temporally displaced filtered data set. Examining FIG. 42A, data points 4205 are grouped together into larger data points 4215, applying a suitable filter to the original data points 4205, perhaps a simple box filter. This creates a lower resolution image data set, with less data points, thus reducing the bandwidth required to transmit the image. Turning to FIG. 42B, again, data points 4205 are grouped together into larger data points 4225. Note that these larger data points 4225 comprise a different grouping of original data points 4205, than does the first larger data points 4215. The groupings 4215 and 4225 are displaced diagonally by one half. This is functionally similar to the displaced filtered and reconstructed image of FIG. 20. When these two data sets are sequentially displayed, one after another, each time that color field is displayed, the temporal integration of the human eye composites the two lower resolution images as a higher resolution image, in a manner very similar to that described above for images that are simultaneously presented. Examining FIGS. 42C and 42D, note that each groups original data points 4205 into larger data points 4235 and 4245 respectively. Again, note that the larger groupings are displaced from one another, and from both of the previously discussed groups 4215 and 4225. When all four are presented sequentially, each time for that color field, the temporal integration of the human eye composites the four lower resolution images as a higher resolution image, in a manner very similar to that described above for images that simultaneously presented. This is functionally similar to the displaced filtered and reconstructed image of FIG. 30.

While the above example used square grid data samples, box filters, of two by two original data points 4205 going to each output data resample 4215, 4225, 4235, and 4245, it will be appreciated that other combinations of input samples (e.g. 3×3, 4×5, etc), filters (e.g. tent, Gaussian, Difference-Of-Gaussians, etc), and output resample grid (e.g. FIGS. 6, 7, and 8, etc.) will also function in a similar manner. All such variations are contemplated.+

While the invention has been described with reference to exemplary implementations and embodiments, it will be understood that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An image system comprising:
   an output unit; and
   means for displaying a plurality of color frames on the output unit, wherein each color frame is subpixelated and displayed over time, one of the color fields is a color field of a low luminance color, and the low luminance color field is displayed with greater frequency over time than the other displayed color fields, wherein the means for displaying comprise a set of color filters placed upon a color wheel such that the regions of low luminance color filter upon said color wheel is greater in number than the other color filters.

2. The image display system of claim 1, wherein the means for displaying further comprises:
   a set of monochromatic light emitting diodes for a direct view output unit.

3. The image display system of claim 1, wherein the low luminance color field is substantially blue and the blue color field is displayed twice as often as other color fields.

4. The image display system of claim 3, wherein the blue color field is displayed with approximately half of the intensity of the other color fields.

5. The image display system of claim 3, wherein the blue color field is displayed at a first intensity at a first time and the blue color field is displayed at a second intensity at a second time interspersed by a non-blue color field.

6. The image display system of claim 3, further comprising:
   at least one high luminance color filter placed upon said color wheel such that the at least one high luminance color filter is placed opposite said low luminance color filter upon the color wheel.

7. The image display system of claim 6, wherein the at least one high luminance color filters one of a group comprising either white or clear filter.

8. An image system comprising:
   an output unit;
   a means for displaying each of a plurality of color frames, each color frame is subpixelated and displayed over time, one of the color fields is a color field of a low luminance color and the low luminance color is displayed for a time period less than other displayed color, wherein the means for displaying each of a plurality of color frames further comprises a set of color filters placed upon a color wheel such that a total angular distance of a low luminance color filter upon the color wheel is smaller in length than the other color filters on the color wheel wherein the low luminance color filter is divided into separate angular regions upon the color wheel.

9. A color wheel for display system comprising:
   A set of color filters including at least one low luminance color filter such that a total angular distance of the low luminance color filter is smaller in length than the other color filters, wherein the set of color filters includes at least one high luminance color filter such that at least one high luminance color filter is placed opposite the low luminance color filter upon the color wheel wherein the at least one high luminance color filter is one of a group comprising either white or clear color filter.

10. The color wheel of claim 9, wherein the low luminance color filter is divided into separate angular regions.

11. The color wheel of claim 9, wherein the set of color filters includes at least one low radiance color filter such that at least one low radiance color filter is placed opposite the low luminance color filter upon the color wheel.

12. The color wheel of claim 9, wherein the at least one low radiance color filter is a black color filter.

13. The color wheel of claim 9, wherein the set of color filter includes at least one low radiance color filter such that one of at least one low radiance color filter is placed in opposition to the low luminance color filter and a least one separate low radiance color filter is placed in opposition to higher luminance color filters.

* * * * *